(12) United States Patent
Lee

(10) Patent No.: US 12,435,471 B2
(45) Date of Patent: Oct. 7, 2025

(54) WALLPAPER COMPOSITION AND WALLPAPER RELEASING FLAVORANT COMPONENT BY HEAT

(71) Applicant: KT&G CORPORATION, Daejeon (KR)

(72) Inventor: Changgook Lee, Daejeon (KR)

(73) Assignee: KT&G CORPORATION, Daejeon (KR)

( * ) Notice: Subject to any disclaimer, the term of this patent is extended or adjusted under 35 U.S.C. 154(b) by 0 days.

(21) Appl. No.: 18/034,805

(22) PCT Filed: Nov. 11, 2022

(86) PCT No.: PCT/KR2022/017743
§ 371 (c)(1),
(2) Date: May 1, 2023

(87) PCT Pub. No.: WO2023/090764
PCT Pub. Date: May 25, 2023

(65) Prior Publication Data
US 2024/0352673 A1    Oct. 24, 2024

(30) Foreign Application Priority Data

Nov. 18, 2021  (KR) .......... 10-2021-0159818
May 16, 2022   (KR) .......... 10-2022-0059743

(51) Int. Cl.
*D21H 17/15*    (2006.01)
*D21H 27/20*    (2006.01)

(52) U.S. Cl.
CPC ......... *D21H 17/15* (2013.01); *D21H 27/20* (2013.01)

(58) Field of Classification Search
CPC ........ D21H 27/20; D21H 17/12; D21H 17/15; D21H 19/28; D21H 21/14; D21H 19/00; D21H 19/46; D21H 19/60; C09D 5/00; C09D 7/63; C07H 13/06; Y10T 428/3189; C08K 5/01
See application file for complete search history.

(56) References Cited

U.S. PATENT DOCUMENTS

| | | | | |
|---|---|---|---|---|
| 4,863,987 A * | 9/1989 | Hoshino | ............. | C09D 5/00 |
| | | | | 524/320 |
| 4,931,360 A * | 6/1990 | Hoshino | ............. | C08K 3/015 |
| | | | | 426/118 |
| 5,139,034 A | 8/1992 | Chan | | |
| 9,156,928 B2 * | 10/2015 | Nii | ............. | D21H 19/60 |
| 2002/0193269 A1 | 12/2002 | Anderson et al. | | |
| 2014/0275506 A1 | 9/2014 | Littich et al. | | |
| 2024/0341335 A1 * | 10/2024 | Lee | ............. | A23L 27/202 |
| 2024/0349776 A1 * | 10/2024 | Lee | ............. | A24D 1/02 |
| 2024/0352673 A1 * | 10/2024 | Lee | ............. | C09D 7/63 |
| 2024/0365845 A1 * | 11/2024 | Lee | ............. | A24B 15/34 |
| 2024/0368840 A1 * | 11/2024 | Lee | ............. | D21H 17/12 |
| 2025/0098733 A1 * | 3/2025 | Song | ............. | A24B 15/12 |

FOREIGN PATENT DOCUMENTS

| | | | | |
|---|---|---|---|---|
| CN | 110408299 A | 11/2019 | | |
| EP | 4230684 A1 * | 8/2023 | ............. | C08J 5/045 |
| JP | 08-81455 A | 3/1996 | | |
| JP | 2015-134931 A | 7/2015 | | |
| JP | 7563671 B2 * | 10/2024 | ............. | C07H 13/06 |
| JP | 7572018 B2 * | 10/2024 | ............. | C07C 69/96 |
| KR | 1994-0005539 A | 3/1994 | | |
| KR | 10-2013-0029062 A | 3/2013 | | |
| KR | 10-2189631 B1 | 12/2020 | | |
| RU | 2 268 281 C2 | 1/2006 | | |
| WO | 2016/011430 A1 | 1/2016 | | |

OTHER PUBLICATIONS

Chinese Office Action dated Mar. 26, 2025 in Application No. 202280008232.4.
International Search Report for PCT/KR2022/017743 dated Feb. 21, 2023 (PCT/ISA/210).
Xiao, et al., "Preparation of micro-encapsulated strawberry fragrance and its application in the aromatic wallpaper", Polish Journal of Chemical Technology, 2017, vol. 19, No. 1, pp. 89-94 (6 pages).
Communication dated May 19, 2025 in Russian Application No. 2023111031.

* cited by examiner

*Primary Examiner* — Jose A Fortuna
(74) *Attorney, Agent, or Firm* — Sughrue Mion, PLLC

(57) ABSTRACT

A wallpaper composition and a wallpaper releases a flavorant component by heat. The wallpaper composition and the wallpaper includes a sugar compound-derived moiety and a flavoring compound-derived moiety in a basic skeleton, and a base material, and includes a compound decomposed into a lactone compound, a sugar compound, and a flavoring compound upon pyrolysis.

16 Claims, 27 Drawing Sheets

WALLPAPER COMPOSITION AND WALLPAPER RELEASING FLAVORANT COMPONENT BY HEAT

CROSS REFERENCE TO RELATED APPLICATIONS

This application is a National Stage of International Application No. PCT/KR2022/017743 filed Nov. 11, 2022, claiming priority based on Korean Patent Application No. 10-2021-0159818 filed Nov. 18, 2021 and Korean Patent Application No. 10-2022-0059743 filed May 16, 2022.

TECHNICAL FIELD

The present disclosure relates to a wallpaper composition and a wallpaper releasing a flavorant component by heat.

BACKGROUND ART

Various fire detection devices (e.g., a fire alarm) that detect fire in facilities or buildings and provide an alarm have been published and used in real life. Usually, when the fire occurs, the fire alarm operates to reduce the damage, but if there is no fire alarm or the fire alarm does not work, when the fire occurs and interior objects such as furniture or wallpaper are burned at a high temperature by the flame, it is general to recognize that the fire has occurred due to the spread of burned products such as smoke, burnt smell, and soot. As a result, since people in spaces far from a point of ignition (e.g., flame) may have delayed the perception of the fire, in large buildings and high-rise apartments, evacuation time may be insufficient and property and human damage may occur.

Accordingly, the present disclosure provides a new fire detection system or material capable of rapidly recognizing the fire, in which when heat from the fire is transferred, volatile flavor components (e.g., lactone and/or menthol flavor) rapidly diffuse from areas close to the flames of a burning building to the entire building through a pyrolysis process and then even people far away from the fire smell distinctive flavor components (e.g., lactone and/or menthol flavor).

DISCLOSURE OF THE INVENTION

Technical Goals

Existing compounds having a flavoring agent function have low chemical and structural stability at room temperature (rt) or a temperature close thereto, so that structural transformation or decomposition may occur to volatilize flavorant components. As a result, there is a problem that a flavor development function is below a perceptible level or is not exhibited in the occurrence of fire. In order to solve the problem, an object of the present disclosure is to provide a wallpaper composition including a novel compound having excellent chemical and structural stability at room temperature or near temperature and releasing a volatile and/or flavorant component by pyrolysis when heated and capable of rapidly recognizing the fire by such a volatile and/or flavorant component.

Another object of the present disclosure is to provide a wallpaper which is prepared with a wallpaper composition of the present disclosure, releases a volatile and/or flavorant component by pyrolysis when heated, and can rapidly recognize the fire by the volatile and/or flavorant component.

Yet another object of the present disclosure is to provide a wallpaper which is prepared with a wallpaper composition of the present disclosure.

Still another object of the present disclosure is to provide a paint composition including a wallpaper composition according to the present disclosure or a novel compound represented by Formula 1 according to the present disclosure.

However, technical objects of the present disclosure are not limited to the aforementioned purpose and other objects which are not mentioned may be clearly understood to those skilled in the art from the following description.

Technical Solutions

According to an embodiment of the present disclosure, there is provided a wallpaper composition including a base material; and a compound represented by Formula 1 below.

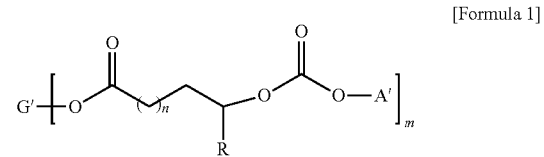

[Formula 1]

(in Formula 1, n is an integer of 1 or 2,

R is a straight-chain or branched-chain alkyl group having 1 to 30 carbon atoms, a moiety A' is a moiety derived from a flavoring compound having at least one of an aromatic ring, an aliphatic ring and an aliphatic chain having a hydroxyl group (—OH), in which the hydroxyl group participates in a carbonate linkage

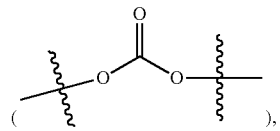

and the moiety A' corresponds to a flavoring compound excluding the hydroxyl group participating in the carbonate linkage, and a moiety G' is a moiety derived from a sugar compound, in which at least one of hydroxyl groups (—OH) linked to a ring of the sugar compound participates in an ester linkage

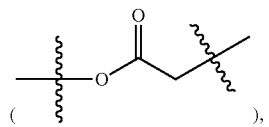

G' corresponds to a sugar compound excluding the hydroxyl group participating in the ester linkage, and m is the number of

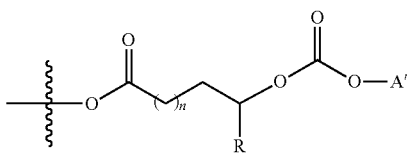

linked to the moiety G' by the ester linkage, and an integer of 1 to 8.)

According to another embodiment of the present disclosure, there is provided a wallpaper or paint prepared with the composition according to the present disclosure.

Effects

According to the embodiments of the present disclosure, the wallpaper composition according to the present disclosure is molded into a wallpaper by itself or easily applied to wallpaper base paper, architectural structures, interior products, etc., and is pyrolyzed when directly heated and/or affected by the temperature of an ignition point to develop highly volatile lactones and/or flavorant components. Since these pyrolyzed components spread throughout the building, even people close to or far from the ignition point can rapidly recognize the fire.

BEST MODE FOR CARRYING OUT THE INVENTION

Figure 1:
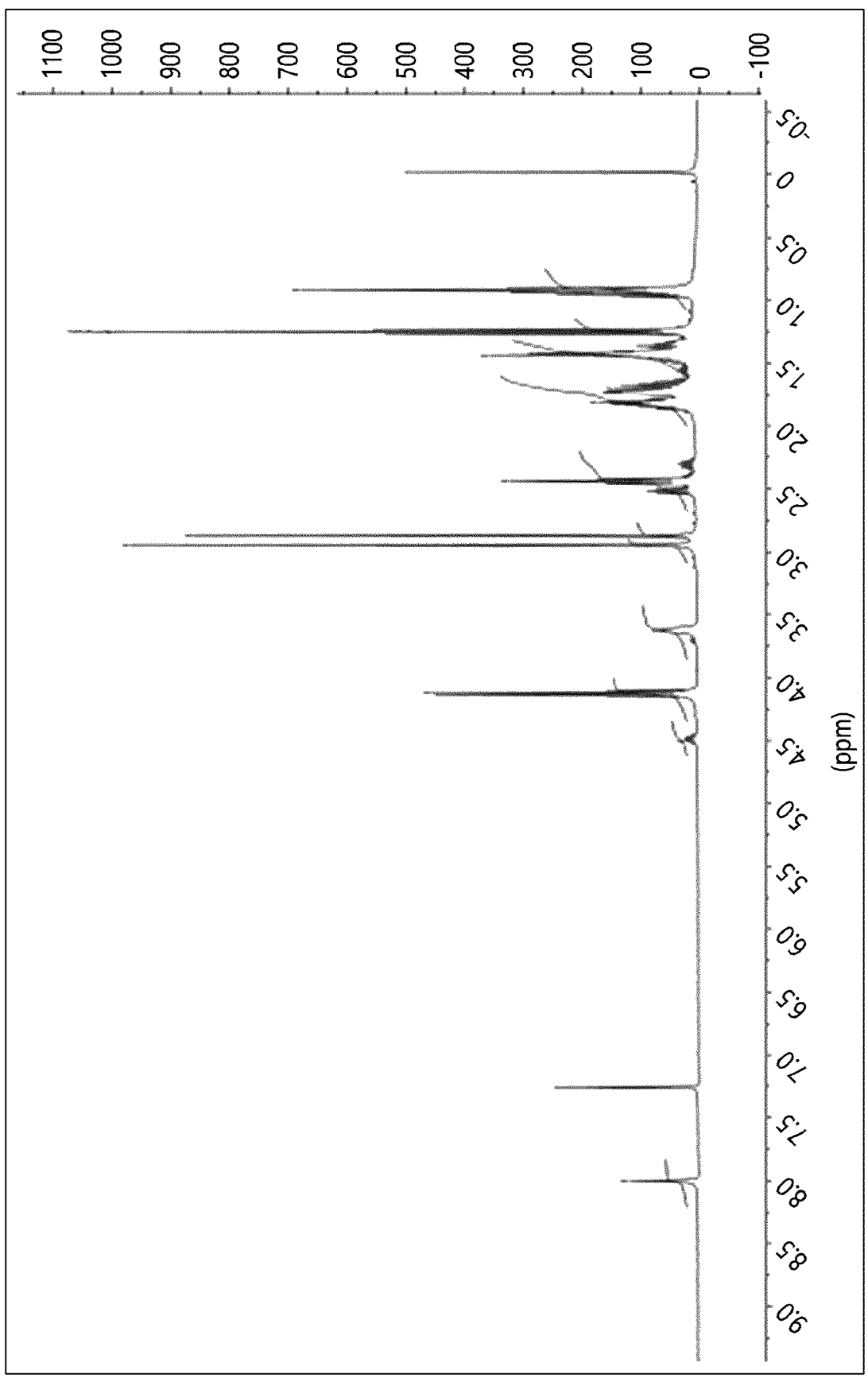
FIG. 1 illustrates results of NMR analysis of ethyl 4-hydroxyheptanoate (2a) prepared in examples, according to an embodiment of the present disclosure.
Figure 2:
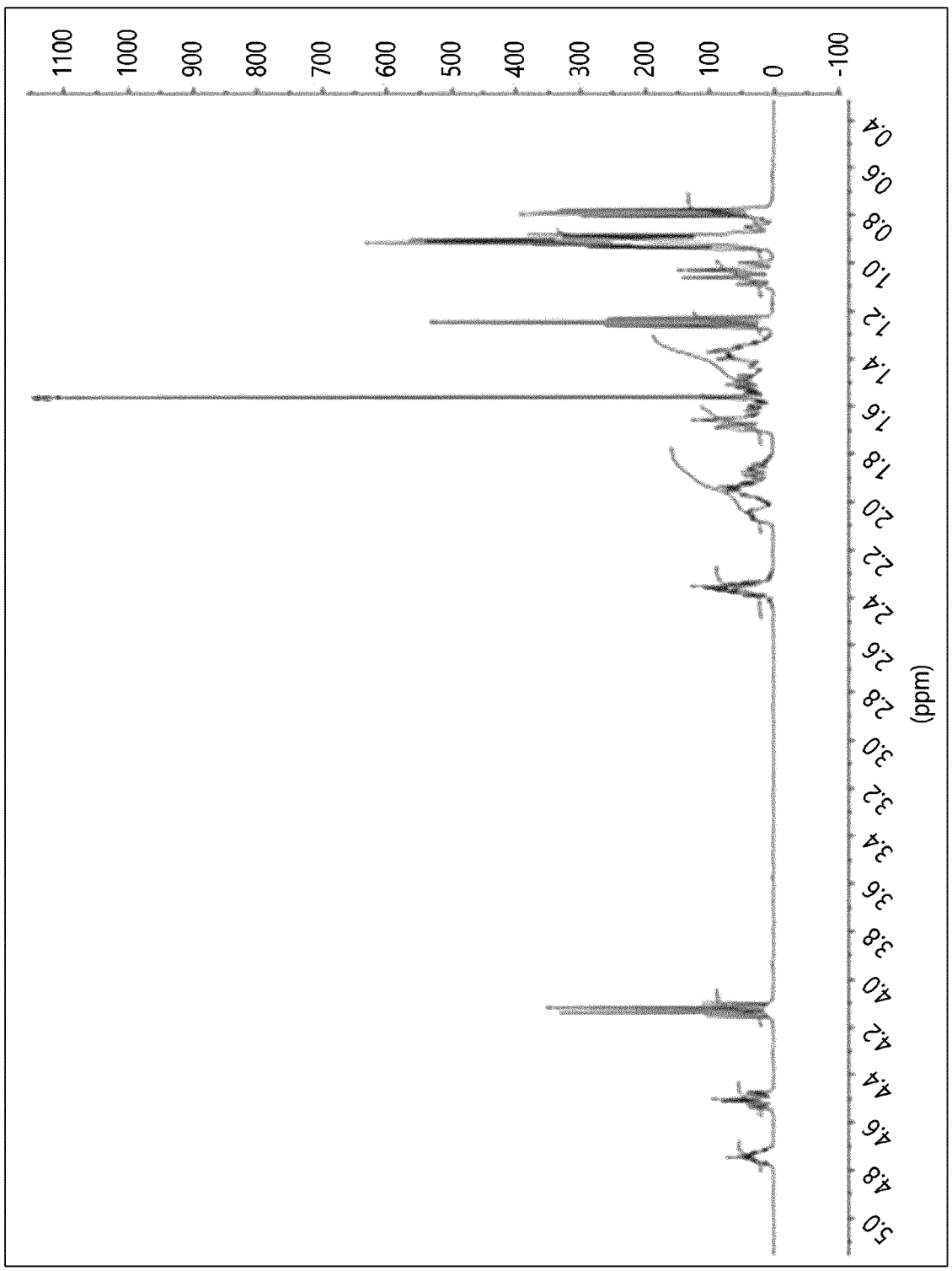
FIG. 2 illustrates results of NMR analysis of ethyl 4-(mentylcarbonyloxy) heptanoate (3a) prepared in examples, according to an embodiment of the present disclosure.
Figure 3:
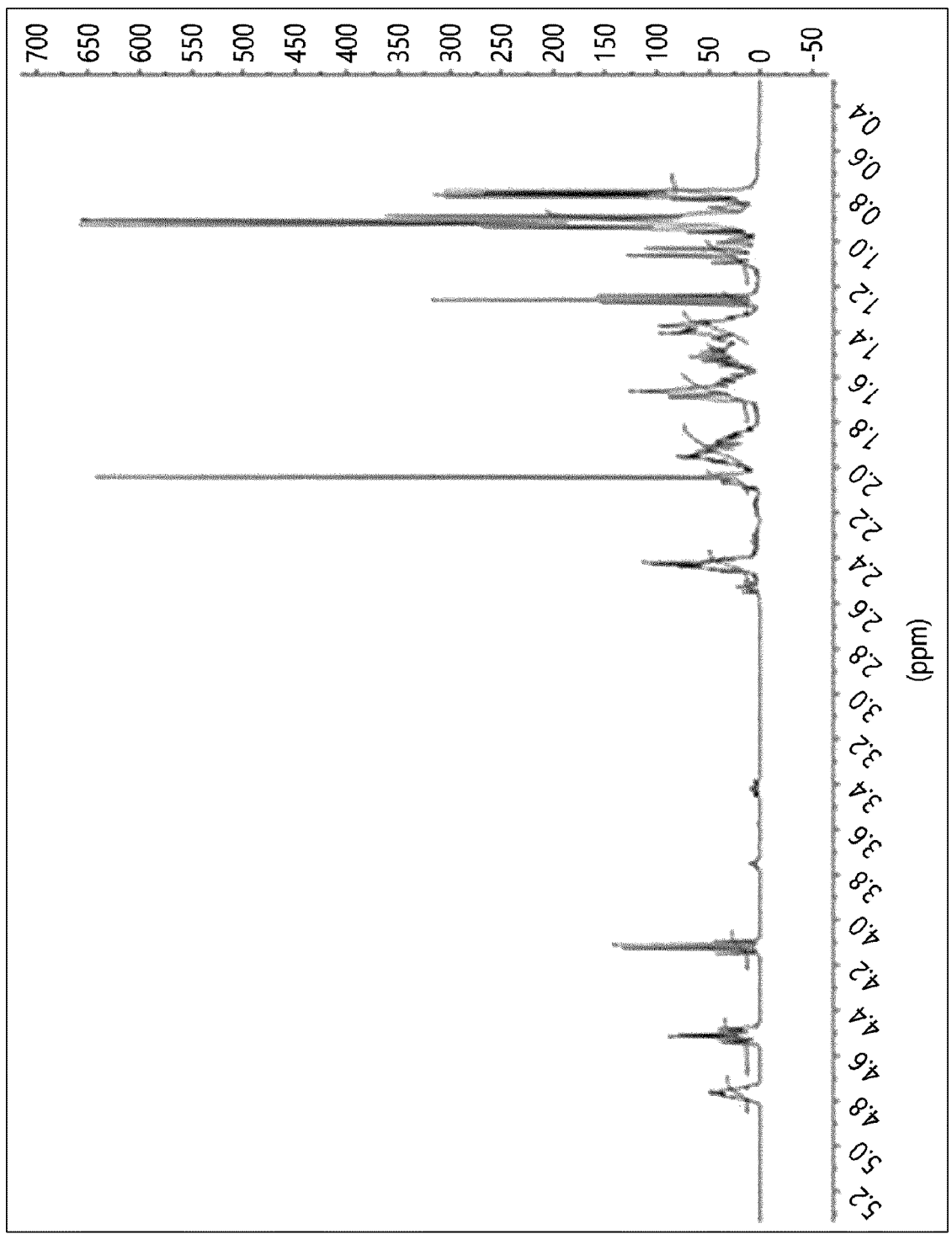
FIG. 3 illustrates results of NMR analysis of 4-(mentylcarbonyloxy) heptanoic acid (4a).
Figure 4:
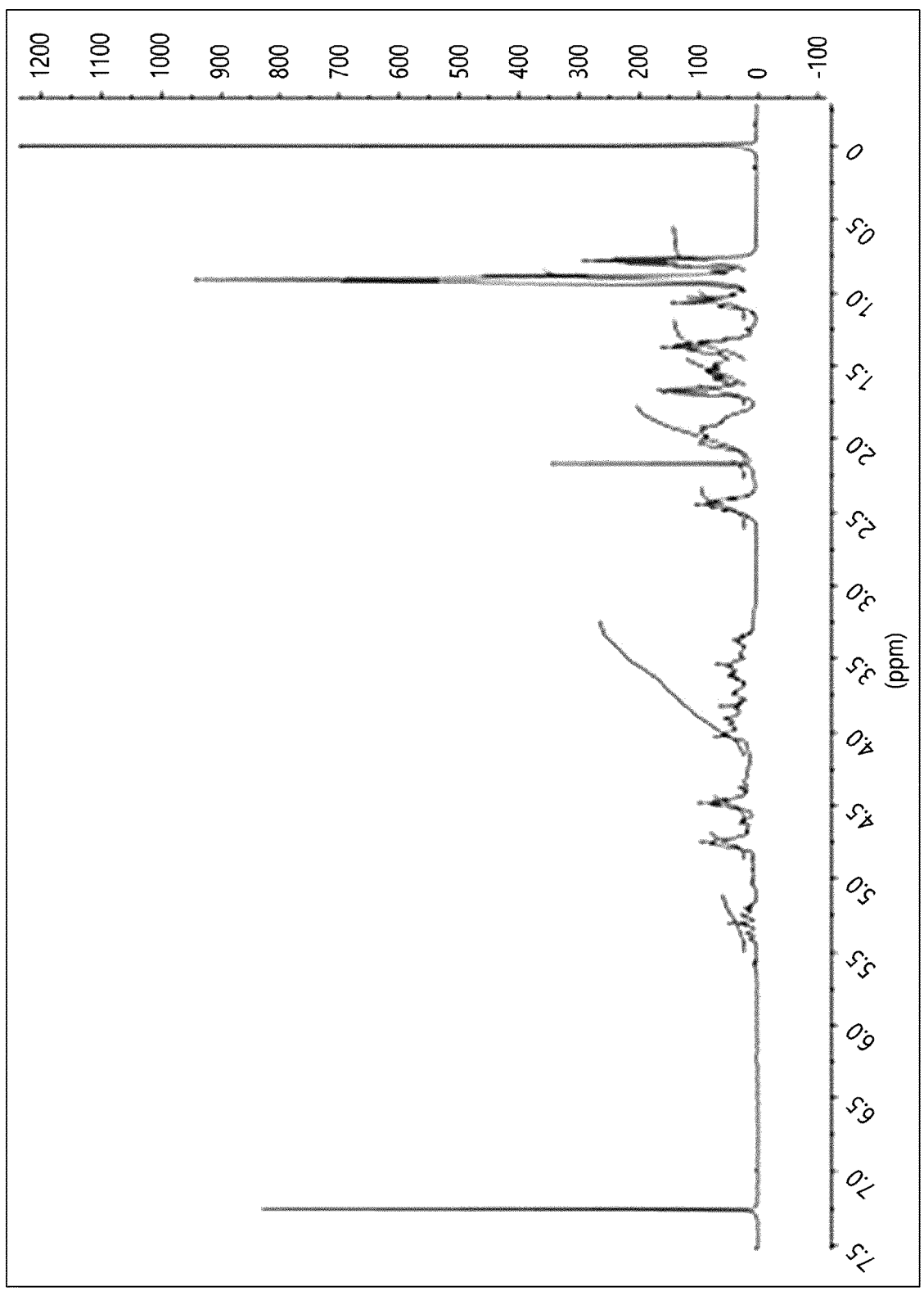
FIG. 4 illustrates results of NMR analysis of glucosyl-(4-mentylcarbonyloxy) heptanoate (5a) prepared in examples, according to an embodiment of the present disclosure.
Figure 5:
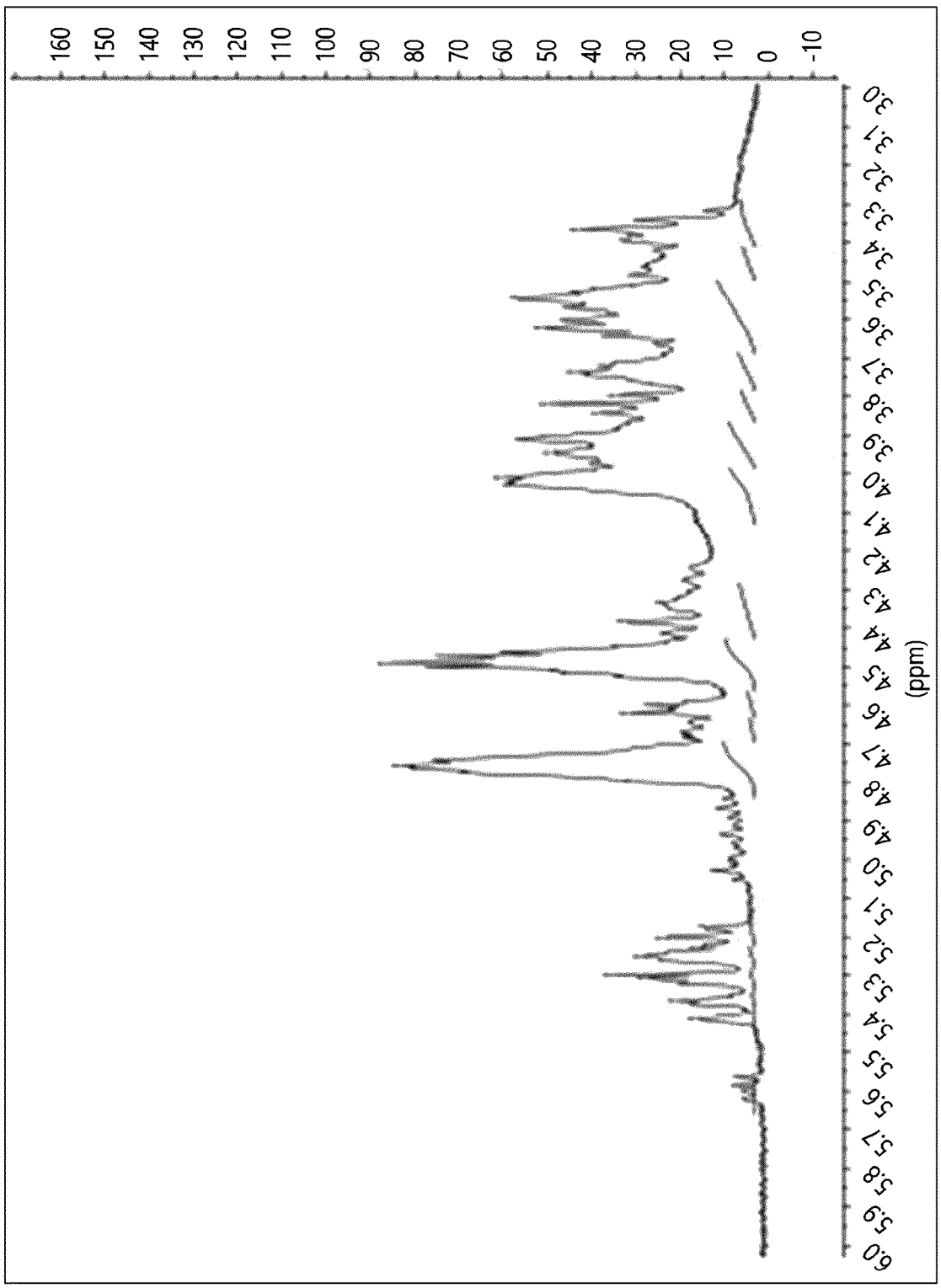
FIG. 5 illustrates results of NMR analysis of glucosyl-(4-mentylcarbonyloxy) heptanoate (5a) prepared in examples, according to an embodiment of the present disclosure.
Figure 6:
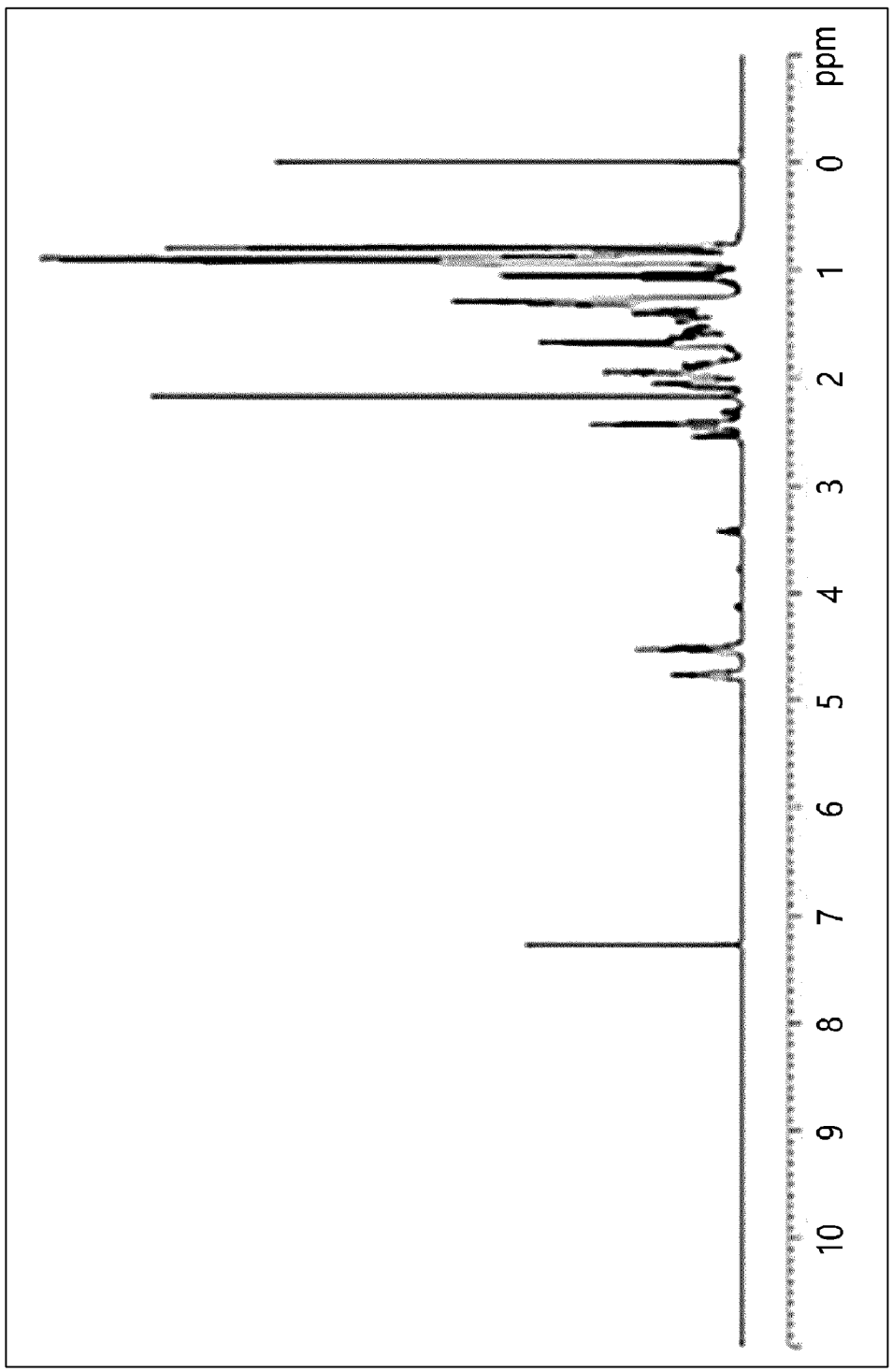
FIG. 6 illustrates results of NMR analysis of 4-(mentylcarbonyloxy) nonanoic acid (4b) prepared in examples, according to an embodiment of the present disclosure.
Figure 7:
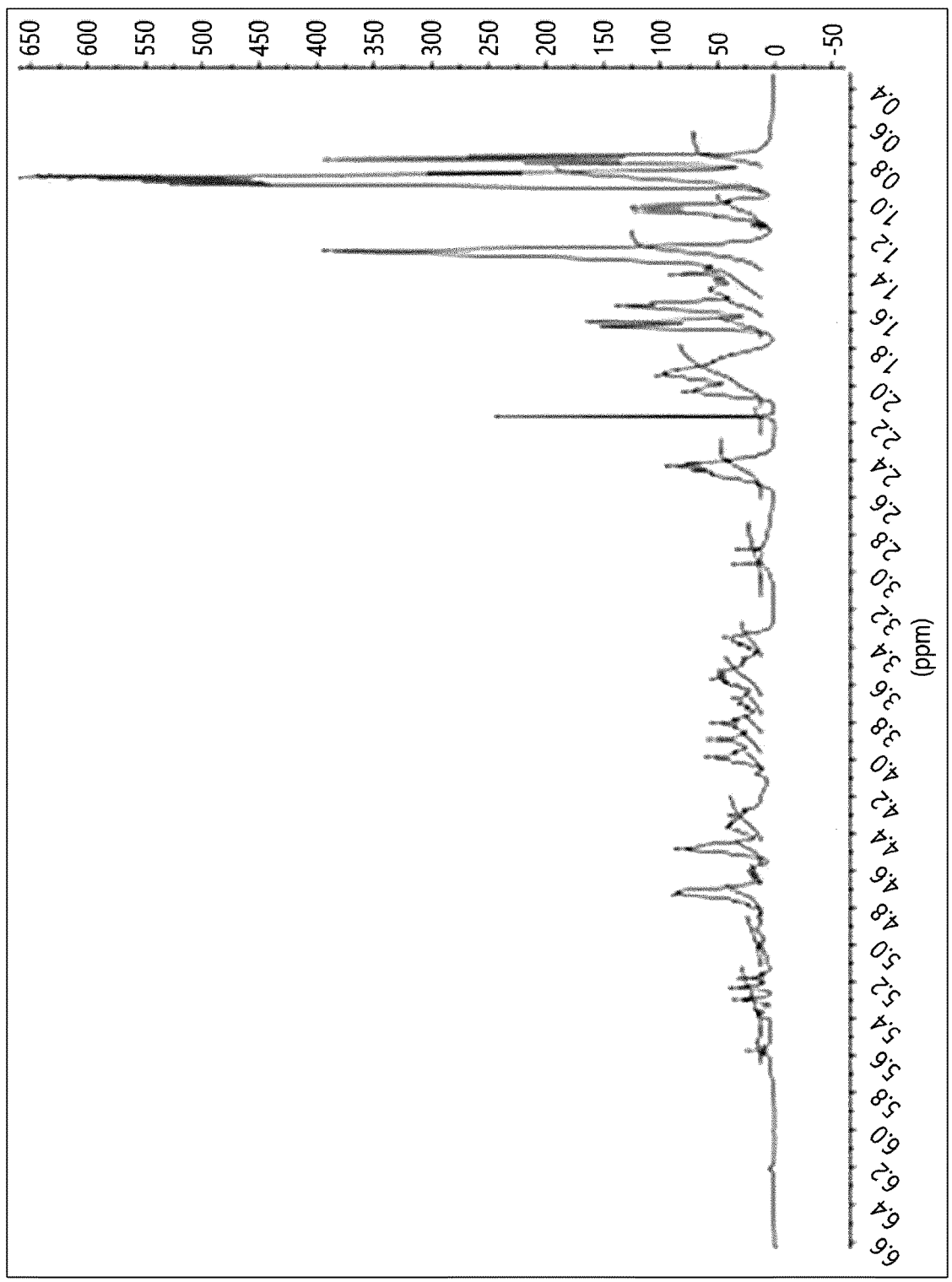
FIG. 7 illustrates results of NMR analysis of glucosyl-(4-mentylcarbonyloxy) nonanoate (5b) prepared in examples, according to an embodiment of the present disclosure.
Figure 8:
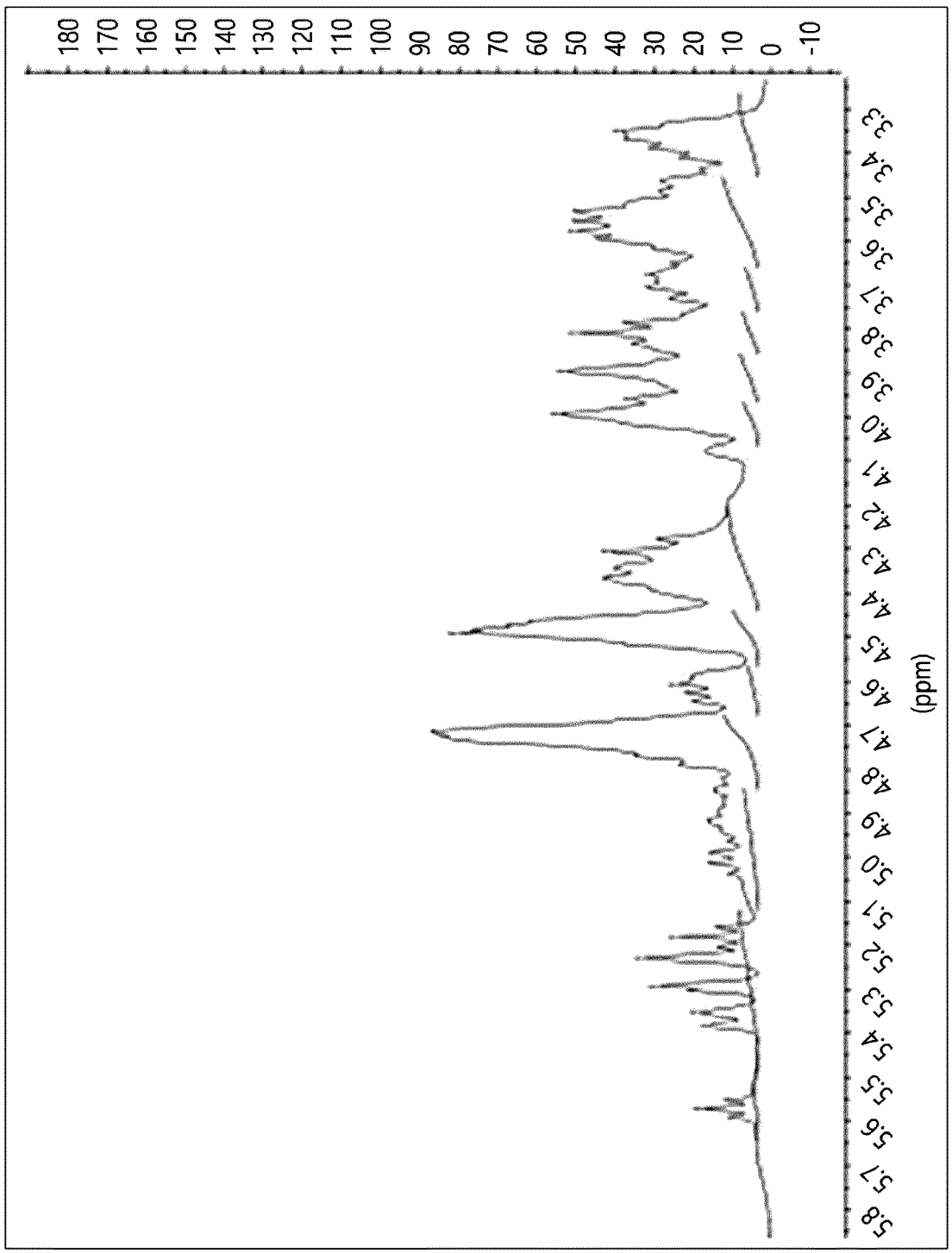
FIG. 8 illustrates results of NMR analysis of glucosyl-(4-mentylcarbonyloxy) nonanoate (5b) prepared in examples, according to an embodiment of the present disclosure.
Figure 9:
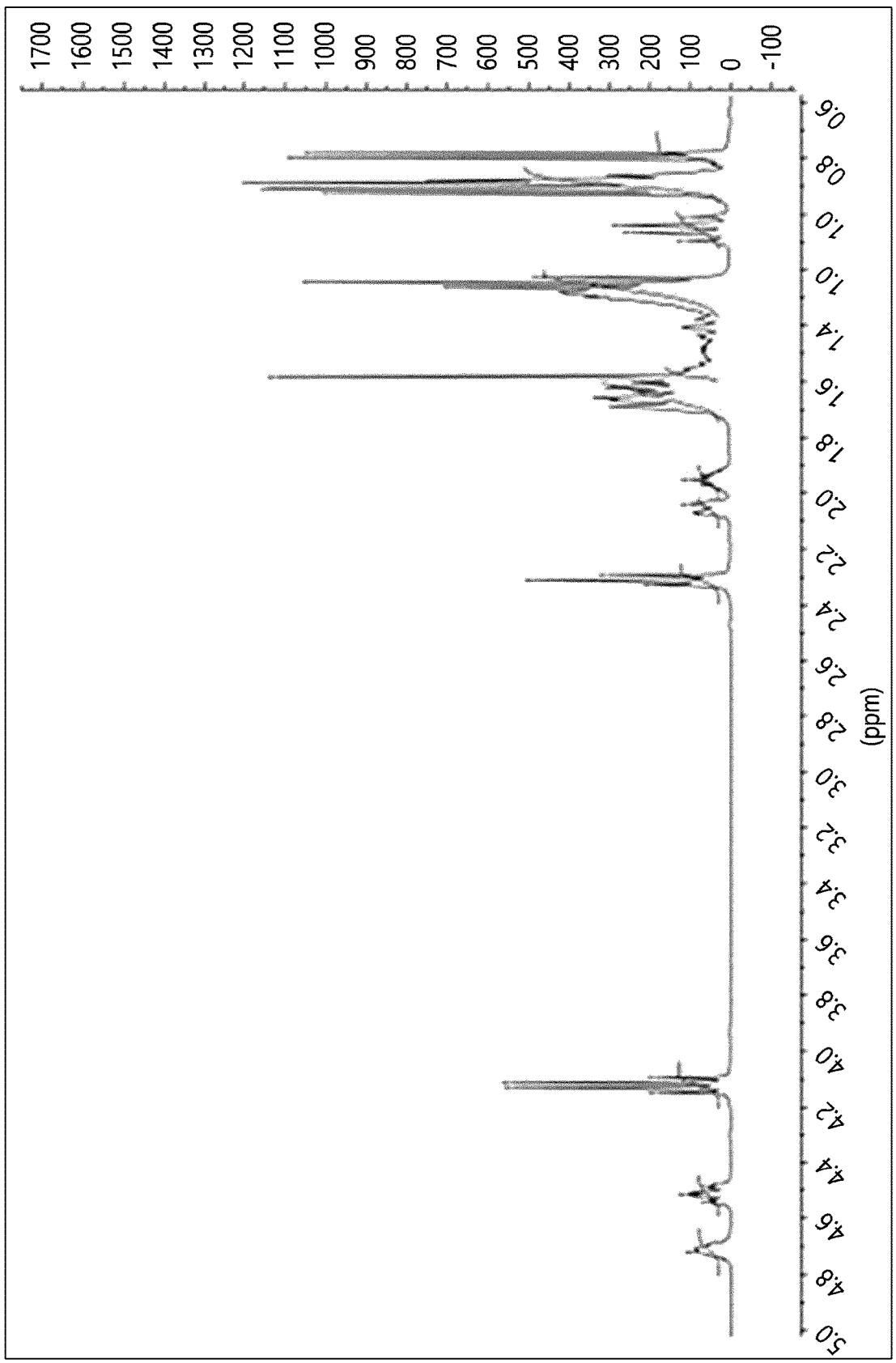
FIG. 9 illustrates results of NMR analysis of ethyl 5-(mentylcarbonyloxy) decanoate (3c) prepared in examples, according to an embodiment of the present disclosure.
Figure 10:
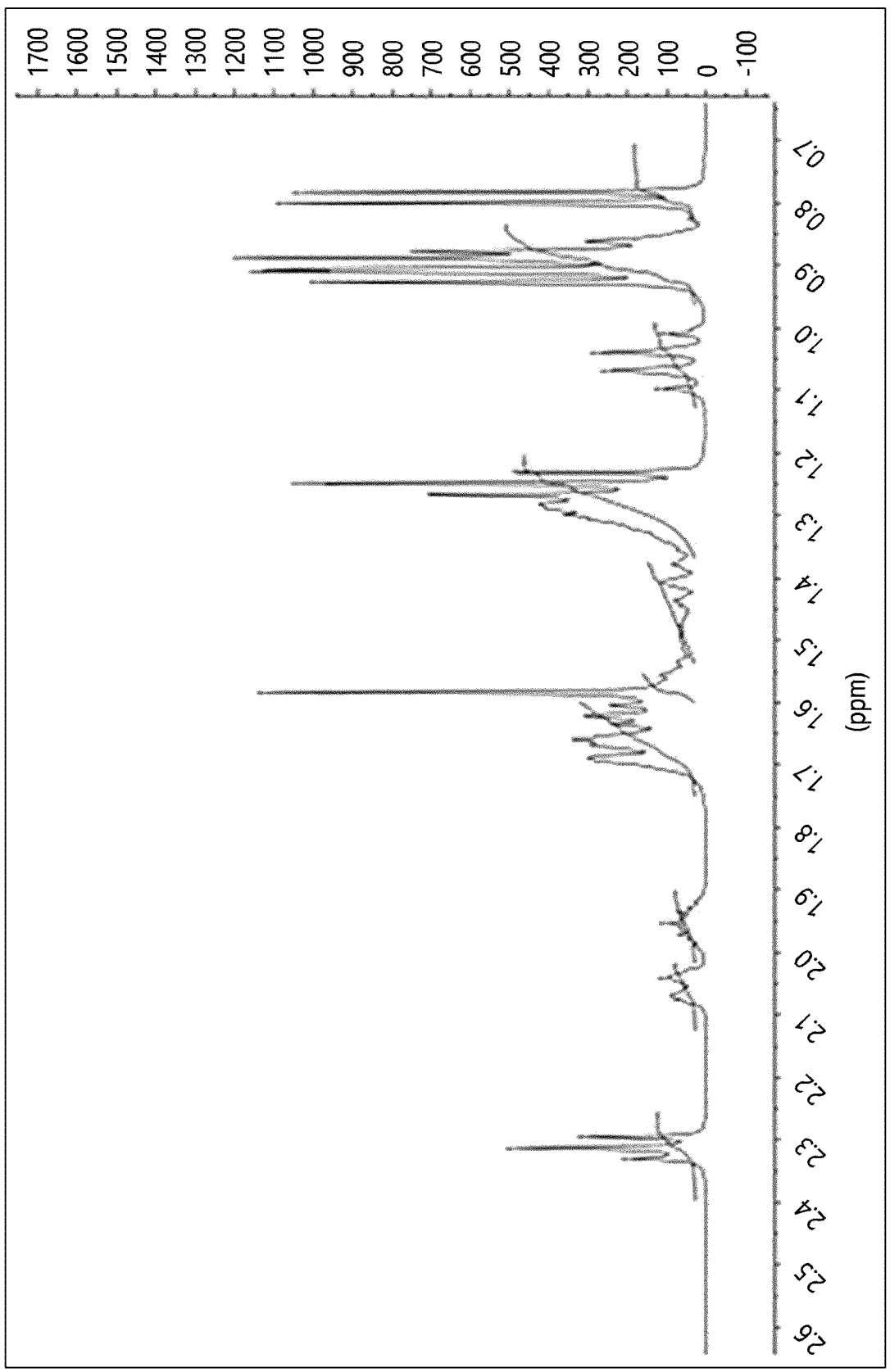
FIG. 10 illustrates results of NMR analysis of ethyl 5-(mentylcarbonyloxy) decanoate (3c) prepared in examples, according to an embodiment of the present disclosure.
Figure 11:
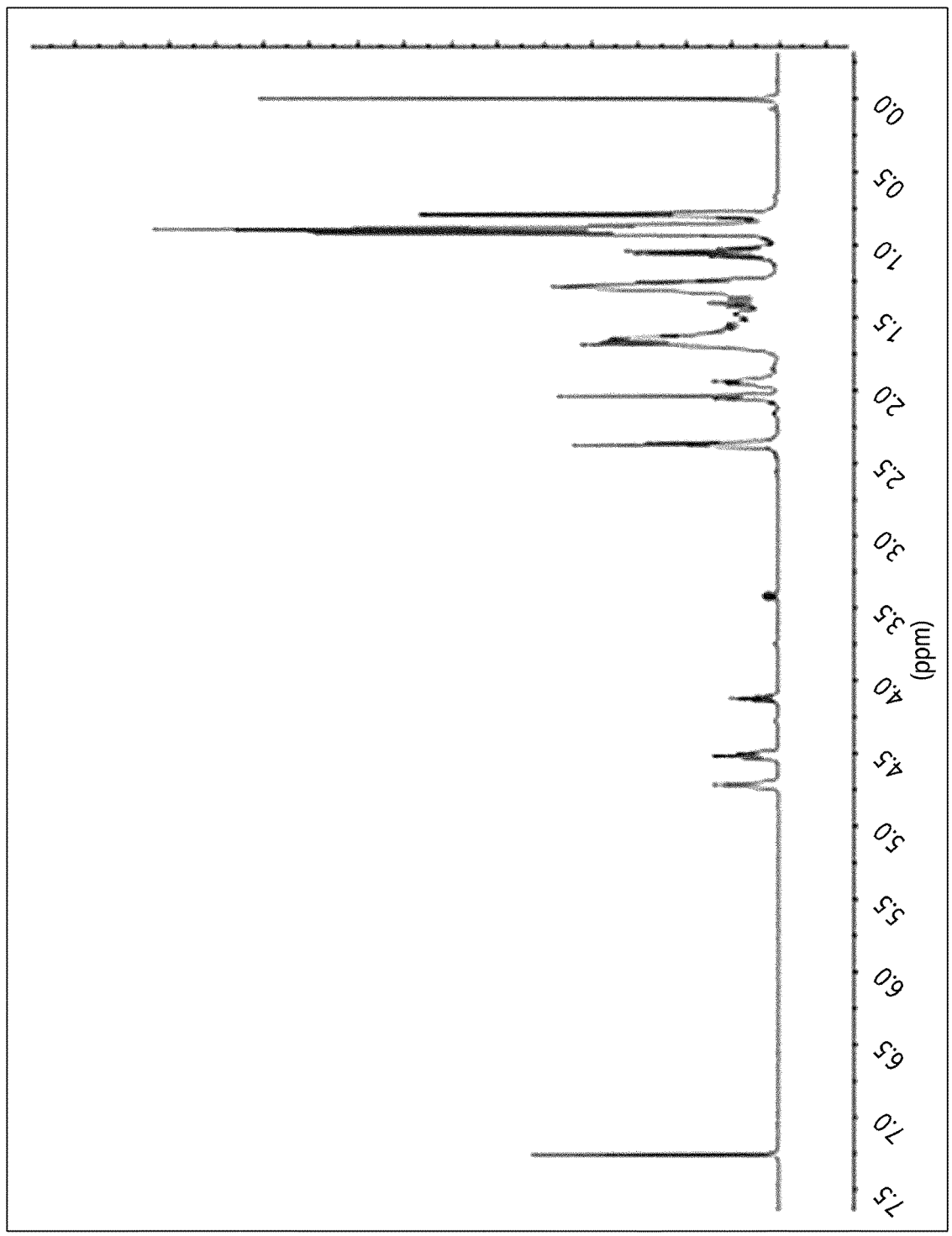
FIG. 11 illustrates results of NMR analysis of 5-(mentylcarbonyloxy) decanoic acid (4c) prepared in examples, according to an embodiment of the present disclosure.
Figure 12:
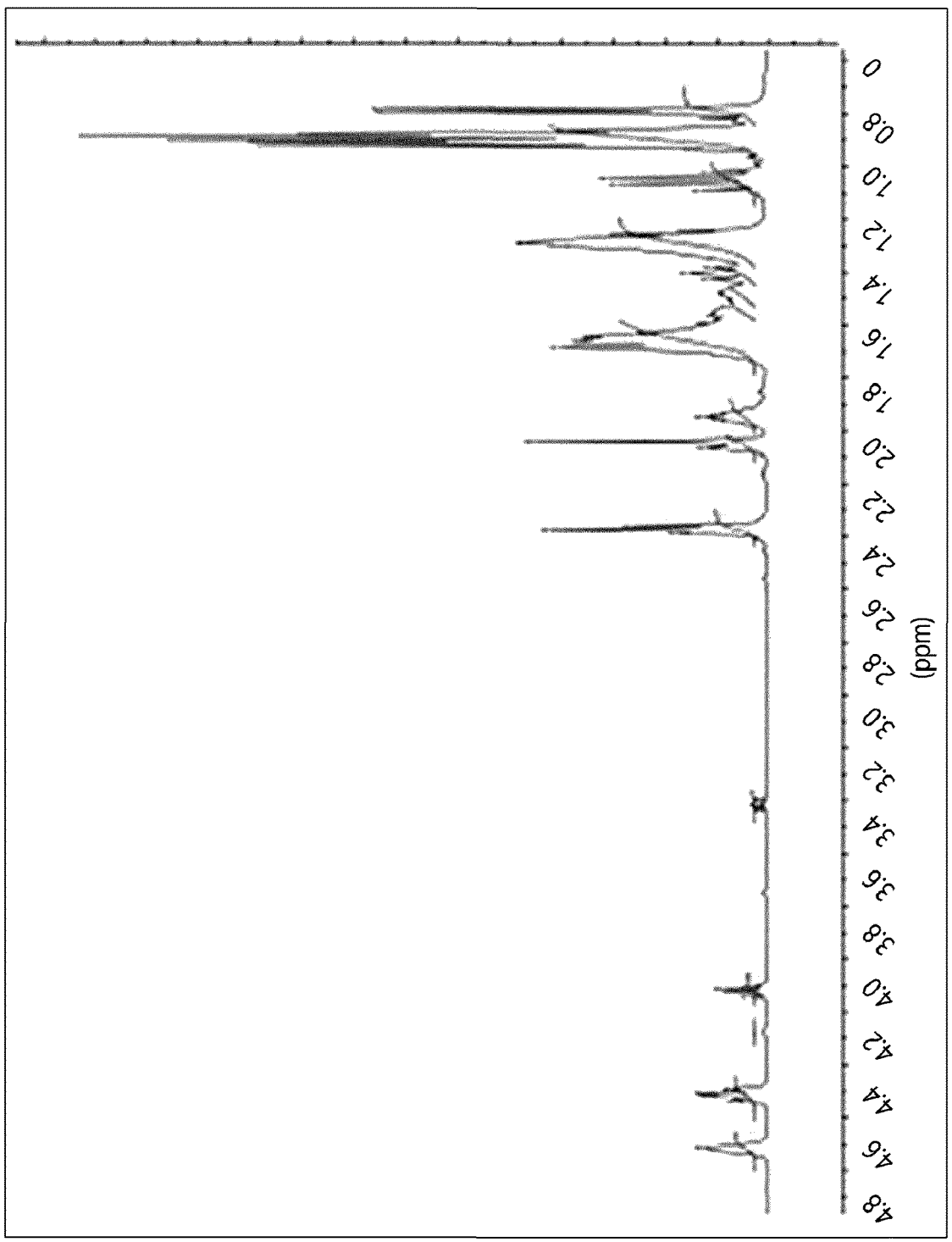
FIG. 12 illustrates results of NMR analysis of 5-(mentylcarbonyloxy) decanoic acid (4c) prepared in examples, according to an embodiment of the present disclosure.
Figure 13:
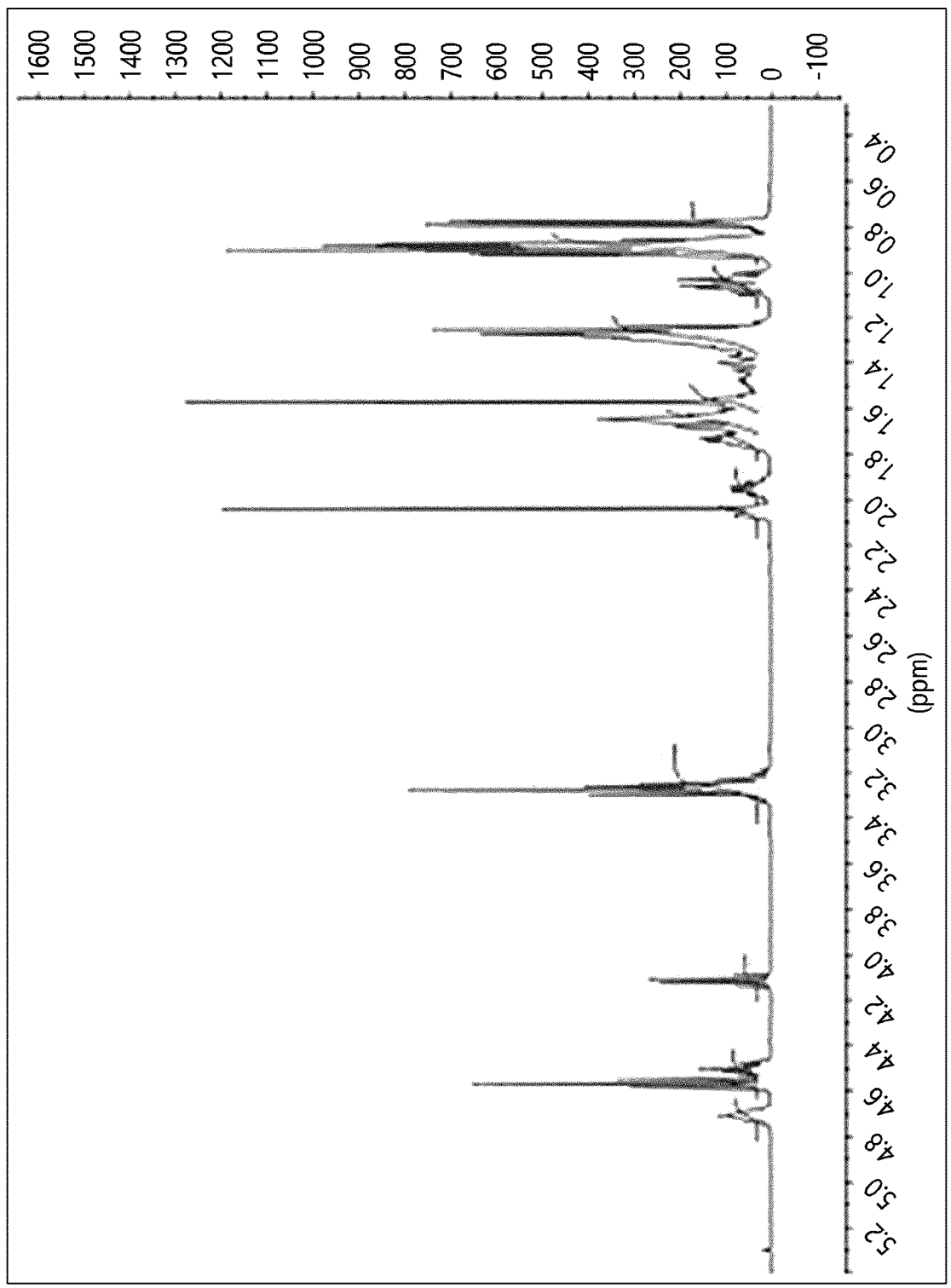
FIG. 13 illustrates results of NMR analysis of 5-isopropyl-2-methylcycloexyl-(1-oxo-1-(2-thioxothiazolidin-3-yl) decan-5-yl) carbonate (5c) prepared in examples, according to an embodiment of the present disclosure.
Figure 14:
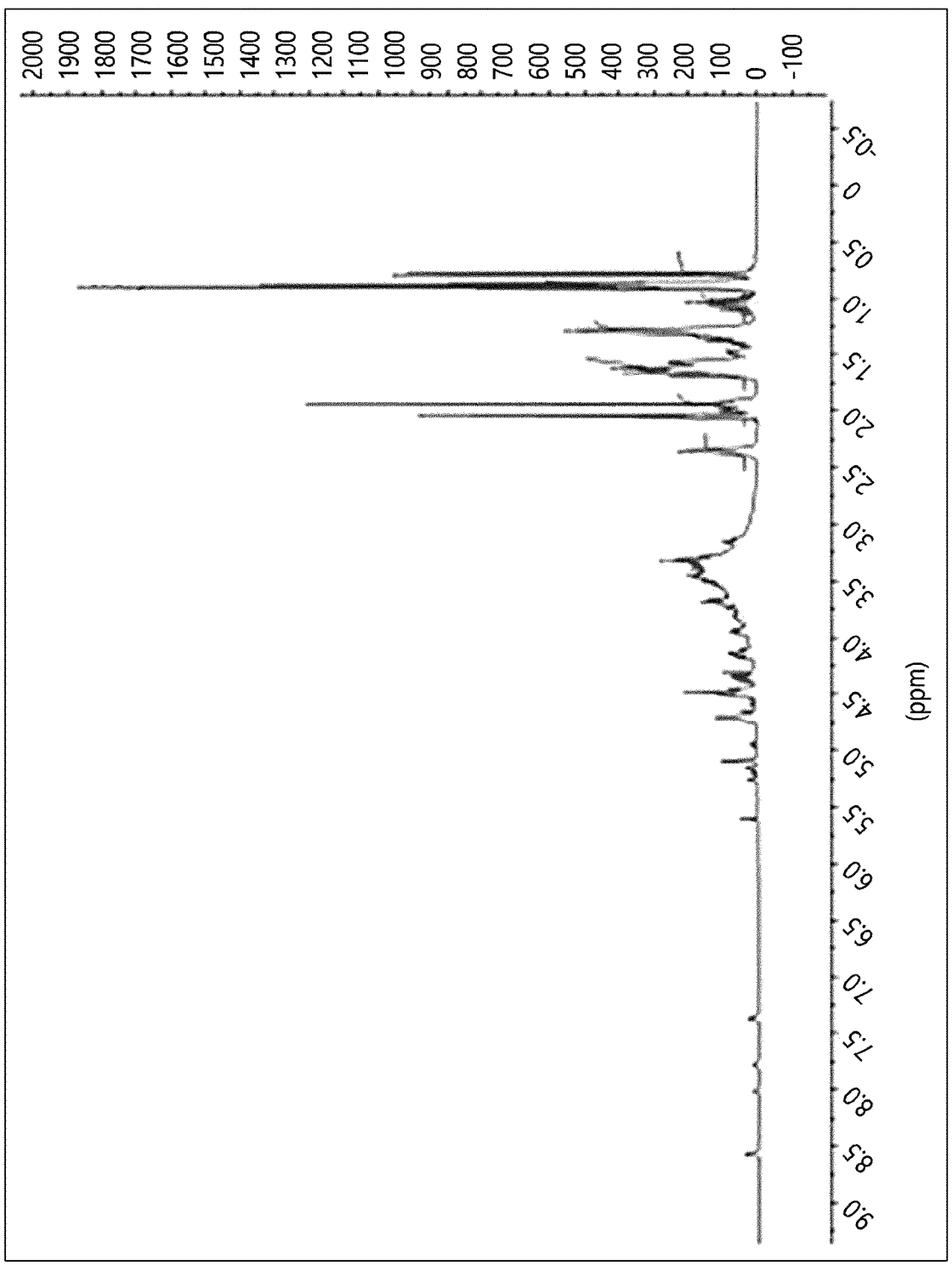
FIG. 14 illustrates results of NMR analysis of glucosyl-(5-mentylcarbonyloxy) decanoate (6c) prepared in examples, according to an embodiment of the present disclosure.
Figure 15:
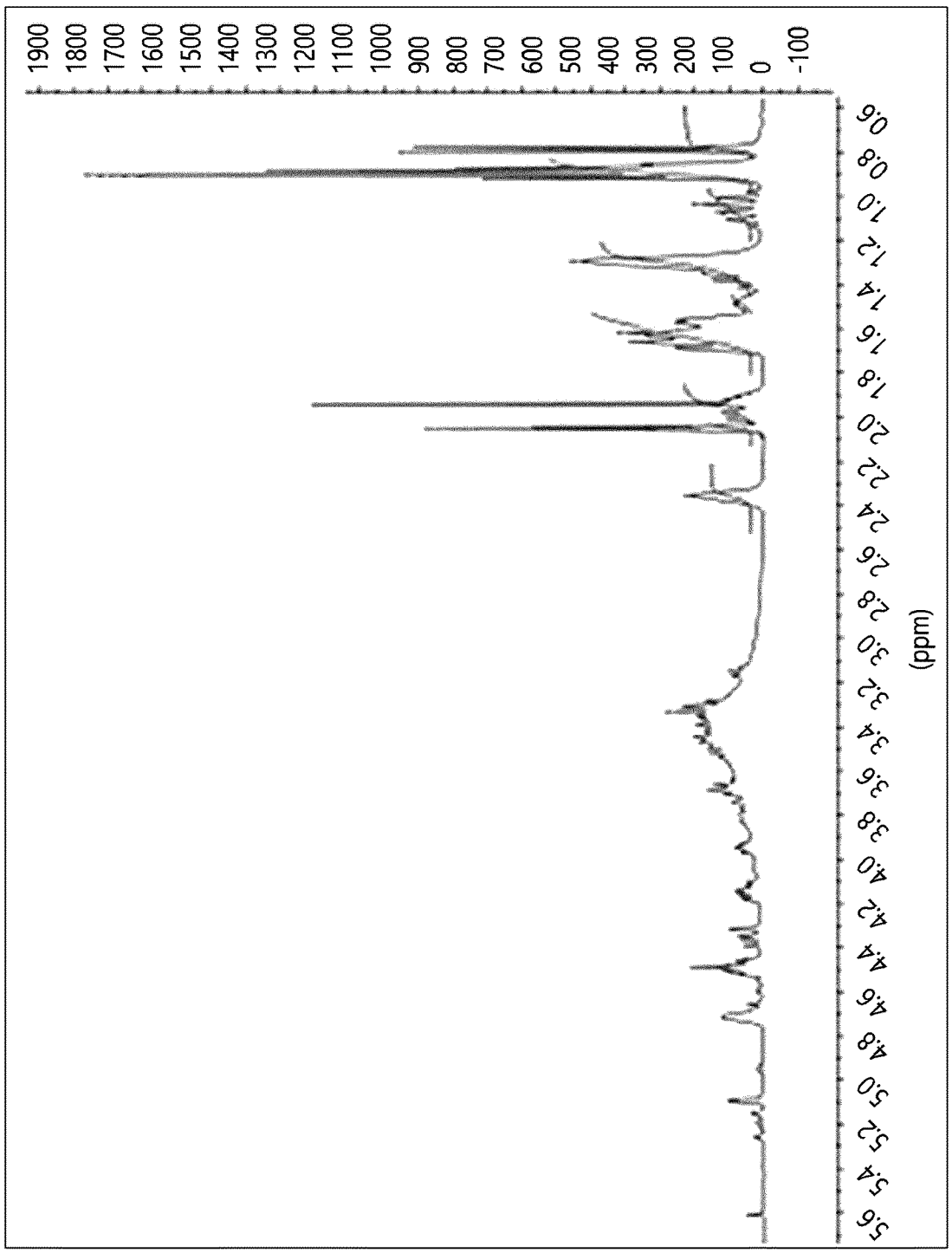
FIG. 15 illustrates results of NMR analysis of glucosyl-(5-mentylcarbonyloxy) decanoate (6c) prepared in examples, according to an embodiment of the present disclosure.
Figure 16:
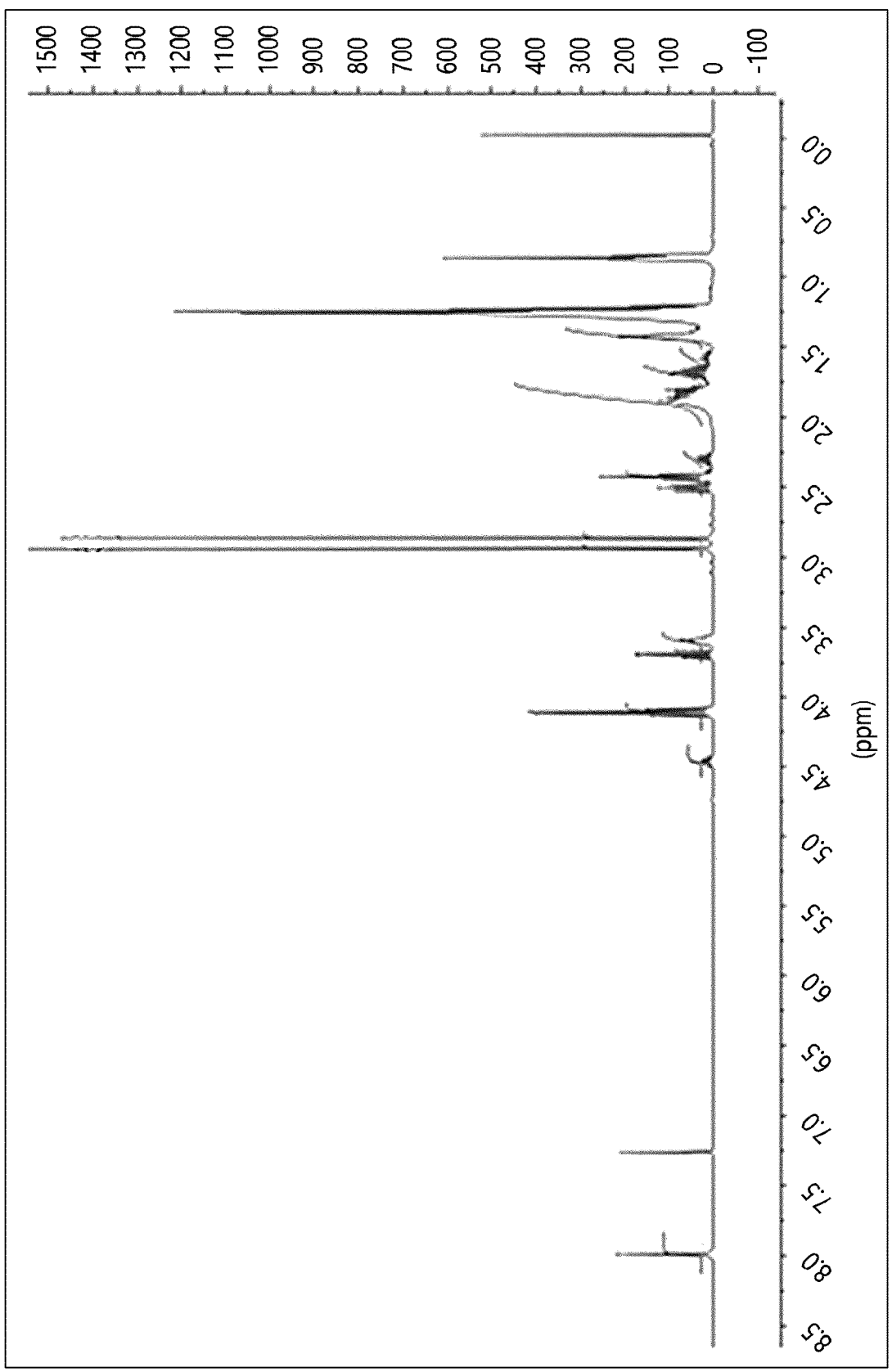
FIG. 16 illustrates results of NMR analysis of ethyl 4-hydroxyundecanoate (2d) prepared in examples, according to an embodiment of the present disclosure.
Figure 17:
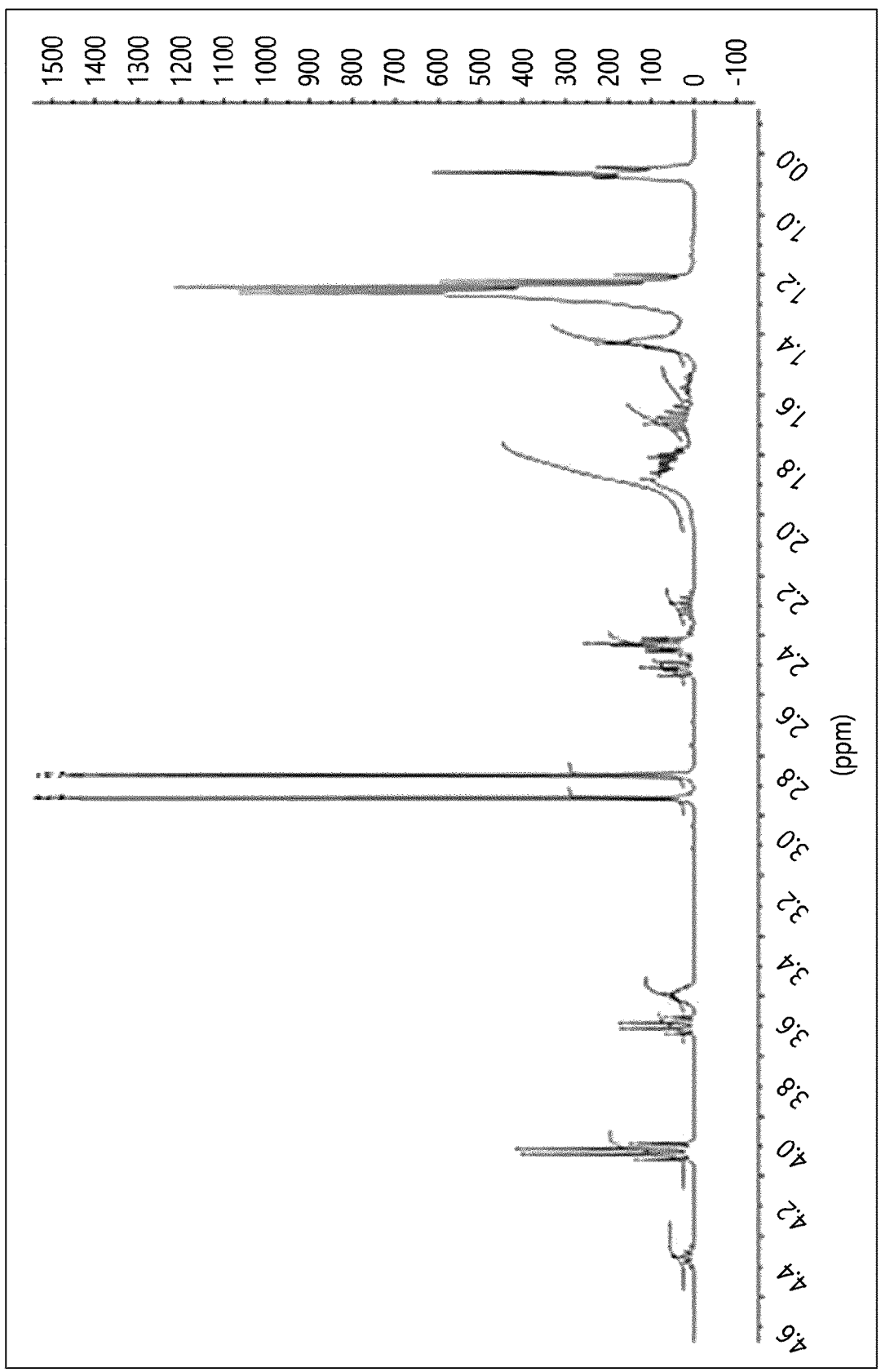
FIG. 17 illustrates results of NMR analysis of ethyl 4-hydroxyundecanoate (2d) prepared in examples, according to an embodiment of the present disclosure.
Figure 18:
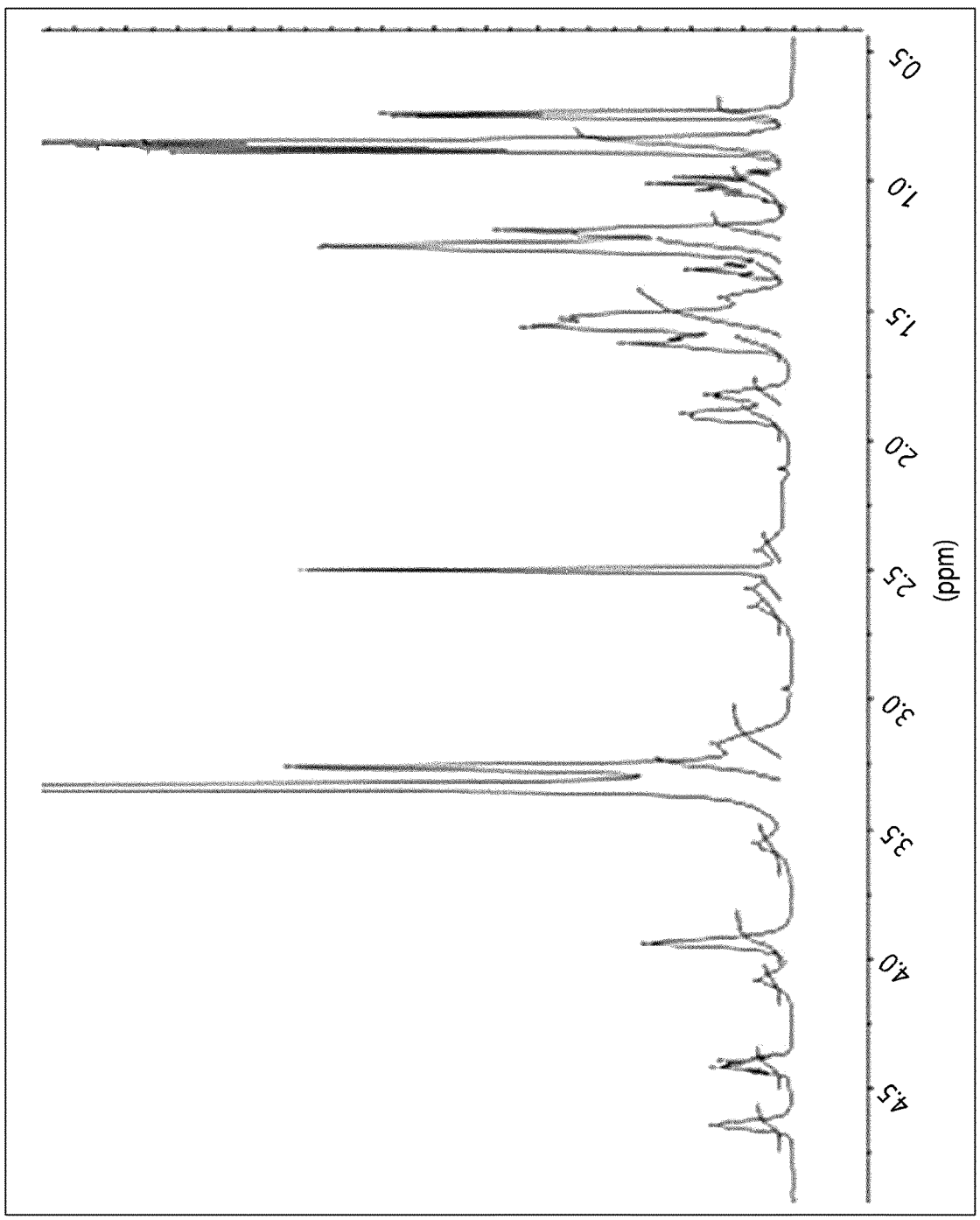
FIG. 18 illustrates results of NMR analysis of ethyl 4-(mentylcarbonyloxy) undecanoate (3d) prepared in examples, according to an embodiment of the present disclosure.
Figure 19:
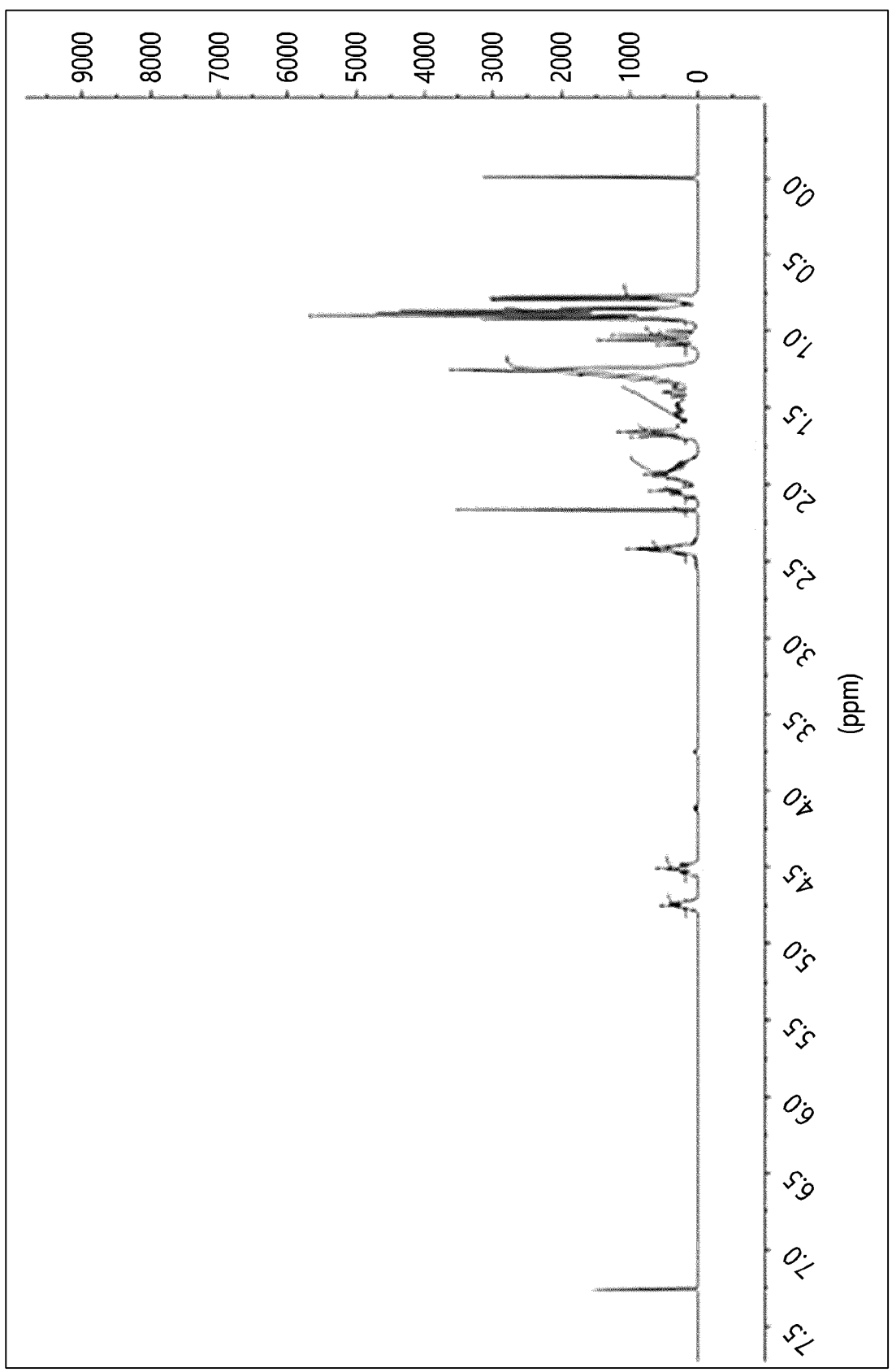
FIG. 19 illustrates results of NMR analysis of 4-(mentylcarbonyloxy) undecanoic acid (4d) prepared in examples, according to an embodiment of the present disclosure.
Figure 20:
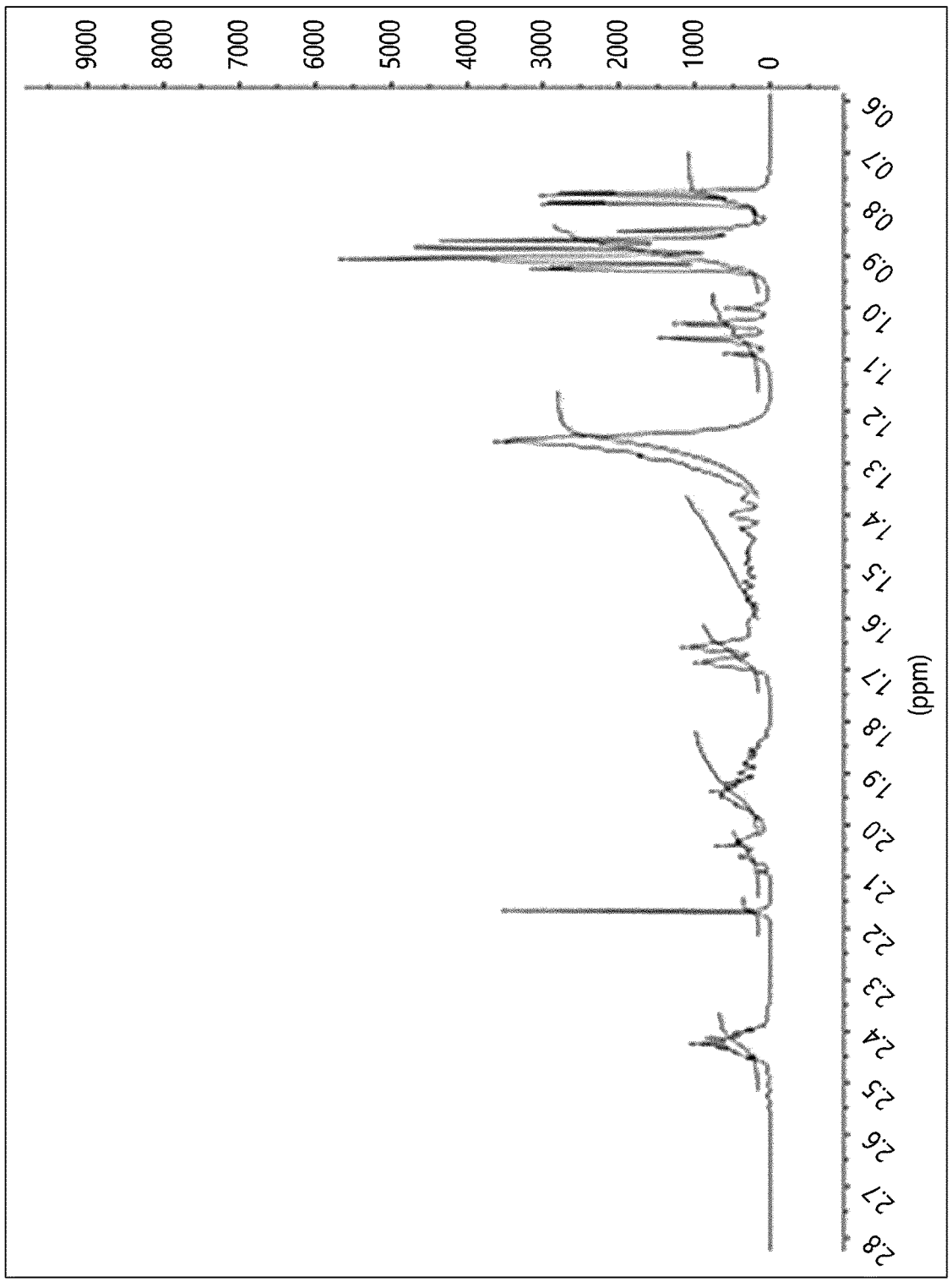
FIG. 20 illustrates results of NMR analysis of 4-(mentylcarbonyloxy) undecanoic acid (4d) prepared in examples, according to an embodiment of the present disclosure.
Figure 21:
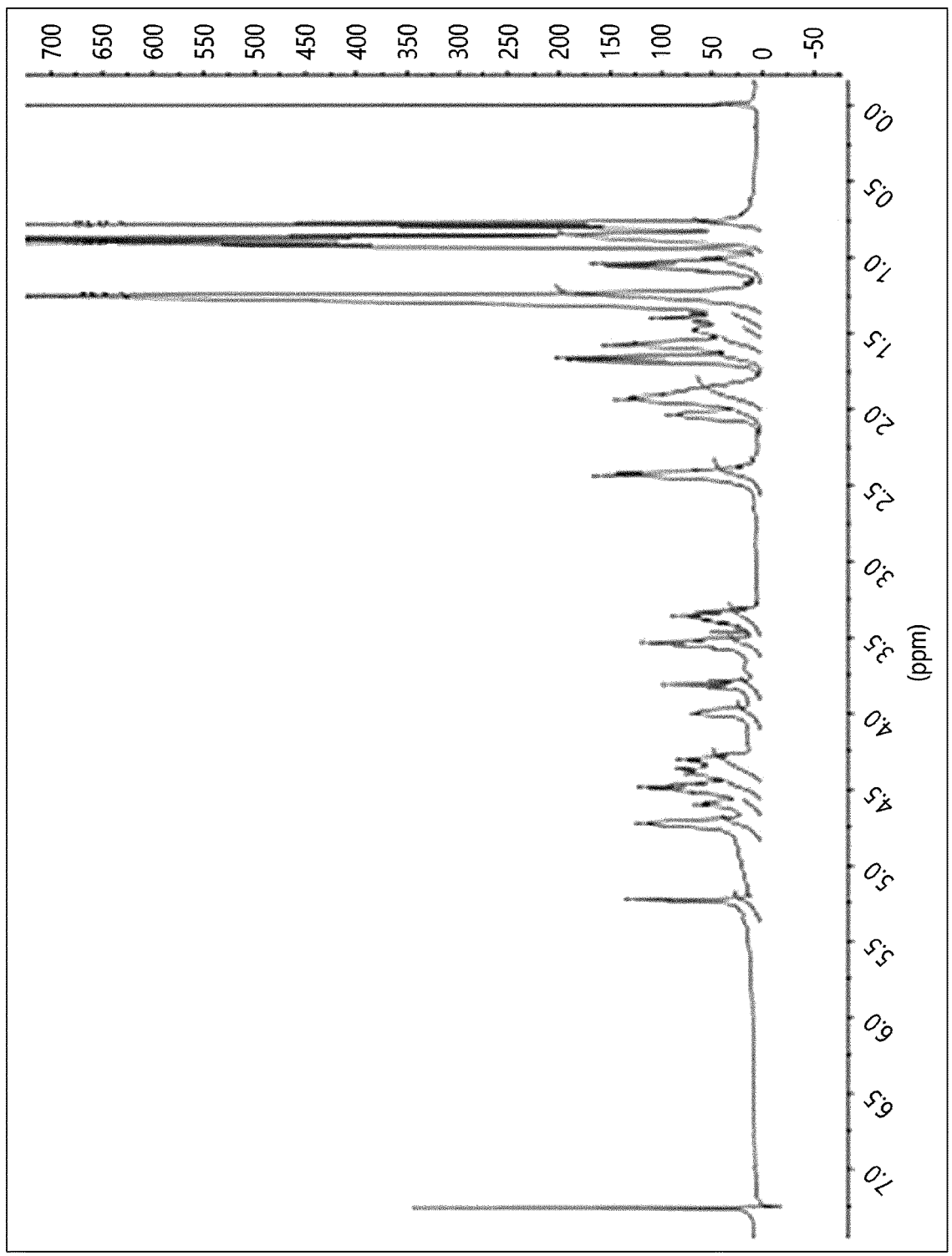
FIG. 21 illustrates results of NMR analysis of glucosyl-(4-mentylcarbonyloxy) undecanoate (6d) prepared in examples, according to an embodiment of the present disclosure.
Figure 22:
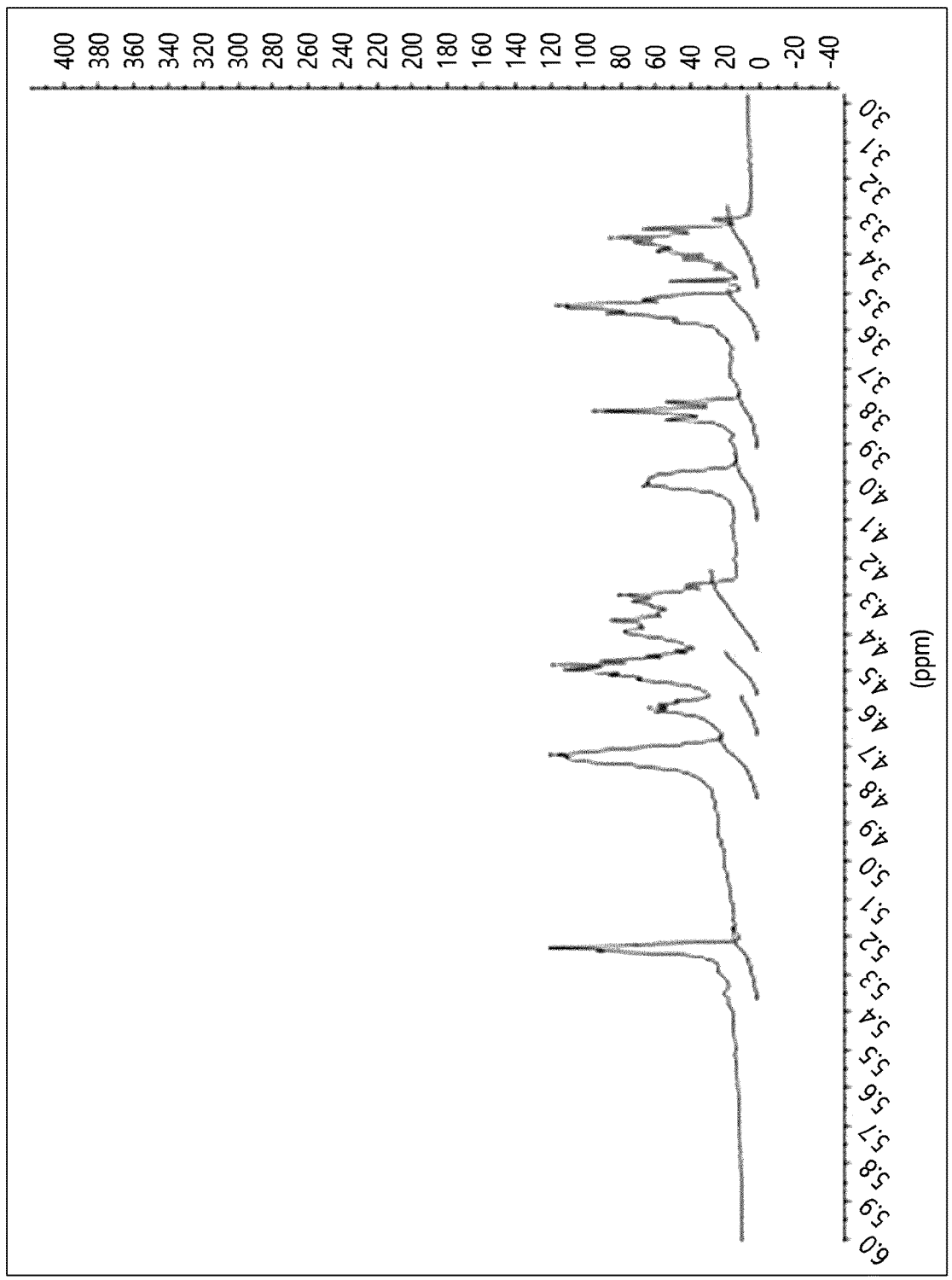
FIG. 22 illustrates results of NMR analysis of glucosyl-(4-mentylcarbonyloxy) undecanoate (6d) prepared in examples, according to an embodiment of the present disclosure.
Figure 23:
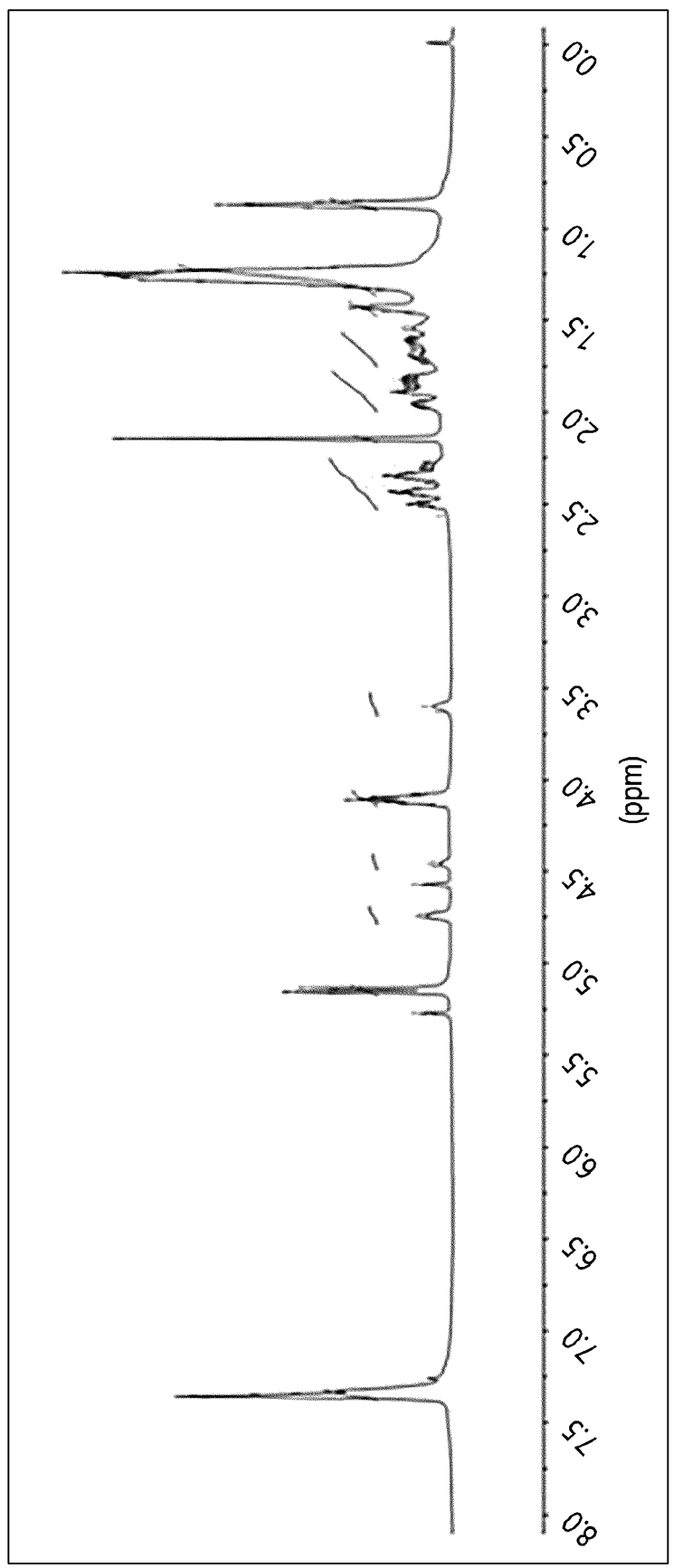
FIG. 23 illustrates results of NMR analysis of ethyl 4-(benzyloxycarbonyloxy) undecanoate (3e) prepared in examples, according to an embodiment of the present disclosure.

Hereinafter, embodiments of the present disclosure will be described in detail with reference to the accompanying drawings. In describing the embodiment of the present disclosure, a detailed description of known functions or constitutions will be omitted if it is determined that they unnecessarily make the gist of the present disclosure unclear. Terminologies used herein are a terminology used to properly express embodiments of the present disclosure, which may vary according to a user, an operator's intention, or customs in the art to which the present disclosure pertains. Terminologies used herein are a terminology used to properly express embodiments of the present disclosure, which may vary according to a user, an operator's intention, or customs in the art to which the present disclosure pertains. Like reference numerals presented in each drawing indicate like elements.

Throughout this specification, it will be understood that when a member is referred to as being "on" another member, it can be directly on the other member or intervening members may also be present.

Throughout the specification, when a certain part "comprises" a certain component, it will be understood to imply the inclusion of stated elements but not the exclusion of any other elements.

Hereinafter, a composition including a compound according to the present disclosure and a use thereof will be described in detail with reference to embodiments and drawings. However, the present disclosure is not limited to these embodiments and drawings.

The present disclosure relates to a composition including a compound according to the present disclosure, and according to an embodiment of the present disclosure, the composition includes a compound represented by Formula 1 below, and the compound may be a flavoring compound that releases a flavor or flavorant component upon pyrolysis.

According to an embodiment of the present disclosure, the composition may include at least one or more of a base material (or base matrix), a solvent, and an additive; and the compound represented by Formula 1 above. As an example of the present disclosure, the composition may be a wallpaper composition and/or a paint composition.

According to an embodiment of the present disclosure, for example, when applied to the wallpaper or paint, the composition may be developed into flavorant components (e.g., lactones or menthols) according to pyrolysis by combustion heat in the event of the fire to spread rapidly in buildings (e.g., houses, apartments, factories, etc.) and may provide a flavor signal which allows people to recognize the fire. In normal cases, only when wallpaper, furniture, etc. are burned at a high temperature by the fire, soot and burned products along with smoke spread, but if there is a condition where there are components to be pyrolyzed, the fire can be recognized earlier, and rapid evacuation can be possible. For example, when exposed to or close to an ignition point (heat source), a part to which the composition according to the present disclosure is applied receives high heat as closer to the ignition point, and a synthetic compound to be pyrolyzed by heat is pyrolyzed to develop a lactone compound and spreads into a building space. These volatile lactone compounds may be rapidly recognized by people in a room far away from the flame.

According to an embodiment of the present disclosure, the compound represented by Formula 1 below may develop a volatile flavorant component by pyrolysis when heat is applied.

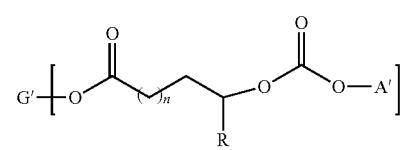

[Formula 1]

As an example of the present disclosure, Formula 1 above includes a sugar compound-derived moiety G' and a flavoring compound-derived moiety A', and in Formula 1, the flavoring compound is covalently bound with a carbonate linkage, and the sugar compound may be bound with an ester linkage

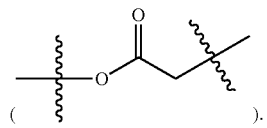 [SMILES: *CC(=O)O*]

When the heat is applied, the compound of Formula 1 is pyrolyzed to be decomposed and released into flavorant components of the sugar compound, the flavoring compound and the lactone compound. For example, the compound of Formula 1 may be synthesized by reacting with a hydroxyl group (—OH) of the sugar compound to be linked to an ester linkage, and reacting with a hydroxyl group of the flavoring compound to be linked to a carbonate linkage

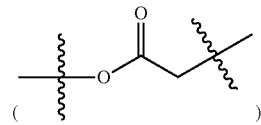 [SMILES: *CC(=O)O*]

by a ring opening mechanism of the lactone compound. That is, the compound of Formula 1 has structural stability at approximately room temperature or near temperature and low volatility, and is decomposed into the sugar compound G, the lactone compound, and the flavoring compound A because the carbonate linkage and the ester linkage are broken by a ring closing mechanism when the heat is applied, so that the flavor is released and carbon dioxide harmless to the human body may be generated during the decomposition process. Since the carbonate linkage is broken by heat, the compound of Formula 1 is decomposed into the flavoring compound to generate carbon dioxide, and then since the ester linkage is broken by closing the ring, the compound of Formula 1 is decomposed into the sugar compound and the lactone compound to develop the flavor.

According to an embodiment of the present disclosure, the moiety A' in Formula 1 may be a moiety derived from a flavoring compound having at least one of an aromatic ring having a hydroxyl group, an aliphatic ring having a hydroxyl group, and an aliphatic chain having a hydroxyl group. The hydroxyl group includes a ring, a chain, or at least one (e.g., one or two) of both, and may correspond to a substituent, a basic backbone, and/or a moiety having a hydroxyl group. The hydroxyl group participates in a covalent bond of the carbonate linkage in Formula 1, and the moiety A' may correspond to a flavoring compound excluding the hydroxyl group. That is, since the hydroxyl group of the flavoring compound in the moiety A' is protected with the carbonate linkage, a decomposition reaction due to ring-closing at room temperature may be prevented.

According to an embodiment of the present disclosure, the flavoring compound may be selected from a cyclic monoterpene-based compound having a hydroxyl group, an acyclic monoterpene-based compound having a hydroxyl group, an aromatic compound of 6 to 10 carbon atoms having a hydroxyl group, and non-aromatic rings of 5 to 10 carbon atoms; or 5 to 6 carbon atoms having a hydroxyl group and isomers thereof. For example, the flavoring compound may be a compound which is selected from the following compounds, and produced when the carbonate linkage of Formula 1 is broken during pyrolysis.

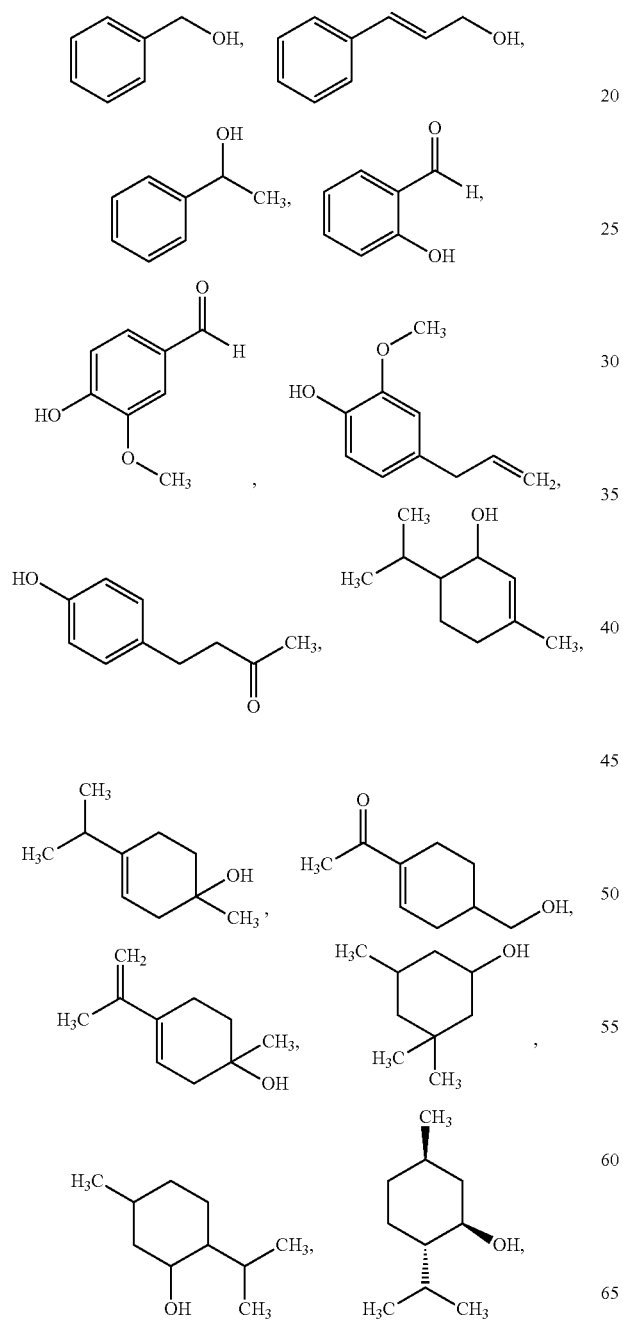

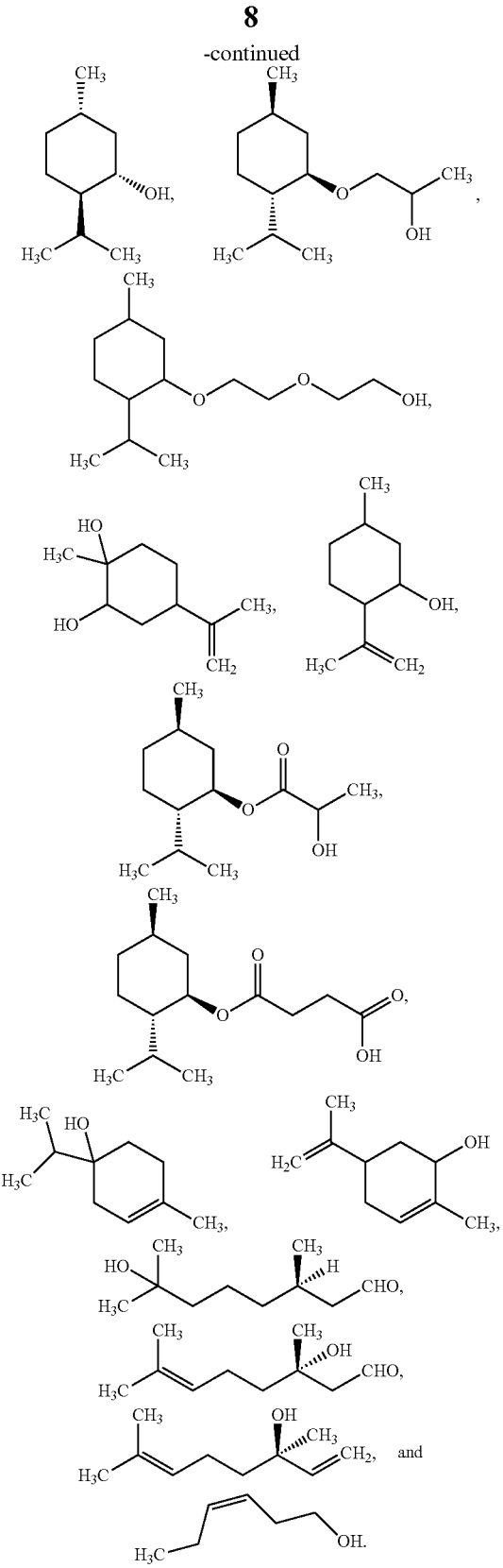

According to an embodiment of the present disclosure, the moiety A' may be selected from the following Formulas. Here, * corresponds to an oxygen site in the carbonate linkage.

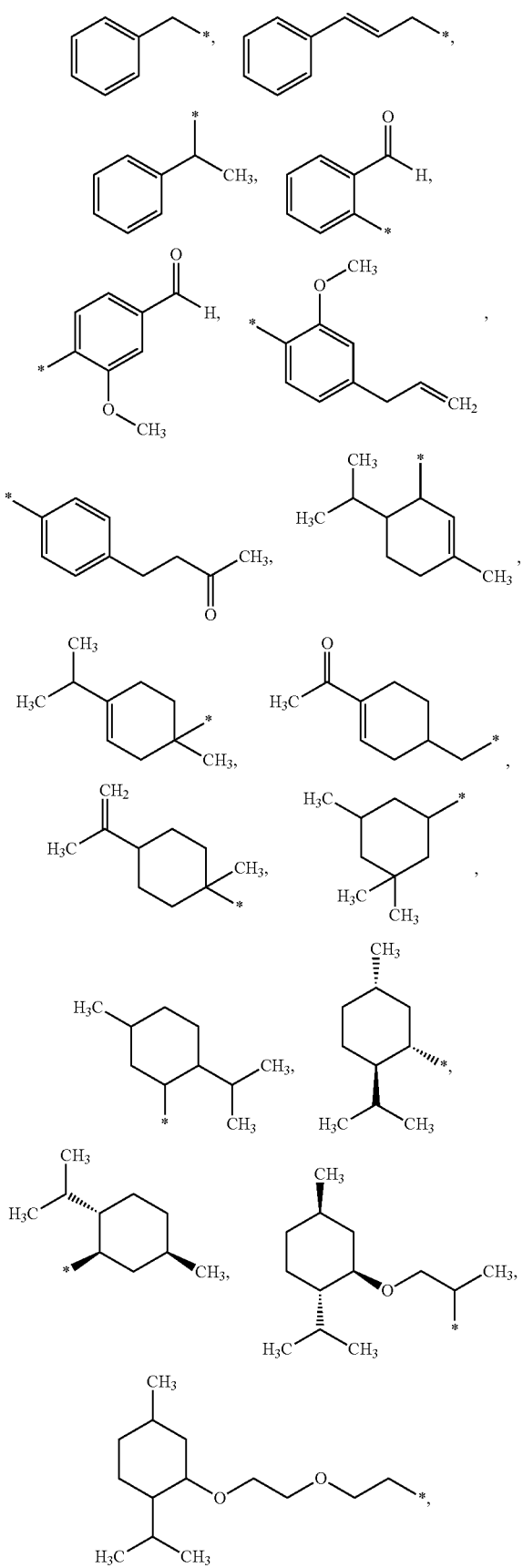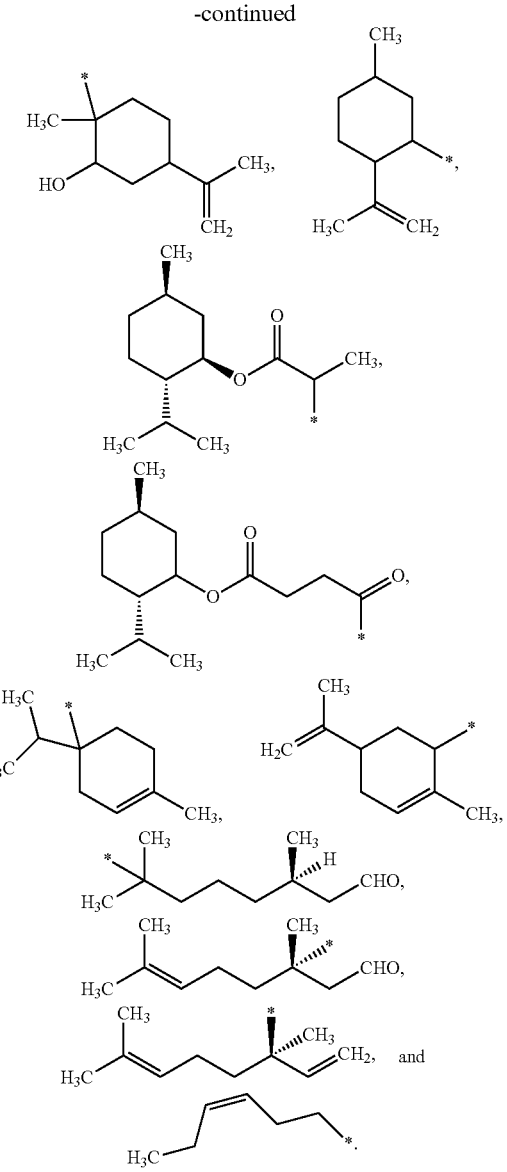

According to an embodiment of the present disclosure, the moiety G' is a moiety derived from the sugar compound, and generated when the hydroxyl group linked to the ring of the sugar compound participates in the ester linkage

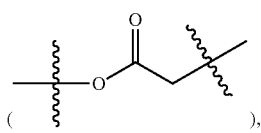

and the moiety G' may correspond to the sugar compound excluding the hydroxyl group. The compound of Formula 1 may maintain the structural stability by lowering volatility at room temperature by linkage of the sugar compound and increase solubility in organic solvents. The compound of Formula 1 may increase the compatibility and/or processability in various matrices (or substrates), and expand its application fields to foods, smoking articles, wallpaper, paints, etc.

According to an embodiment of the present disclosure, the sugar compound includes a 6-membered ring, a 5-membered ring, or both, and at least one; at least two; at least three; or the whole of hydroxyl groups linked to a ring constituting the sugar compound may participate in the ester linkage of Formula 1. For example, the ester linkage by a single or a plurality of hydroxyl groups may be formed so that a "[ ]" part in Formula 1, that is, a single or a plurality of

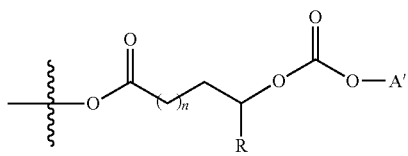

may be linked to the moiety G'.

According to an embodiment of the present disclosure, the m is the number of "[ ]" parts, that is,

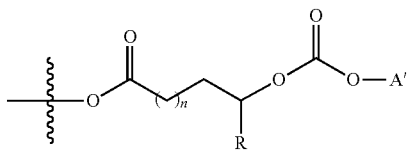

linked to moiety G' by the ester linkage, and may be an integer of 1 to 8; 1 to 7; 1 to 6; 1 to 5; 1 to 4; 1 to 3; or 1 to 2.

According to an embodiment of the present disclosure, the sugar compound may be selected from, for example, tagatose, trehalose, galactose, rhamnose, cyclodextrin, maltodextrin, dextran, sucrose, glucose, ribulose, fructose, threose, arabinose, xylose, lyxose, allose, altrose, mannose, idose, lactose, maltose, invert sugar, isotrehalose, neotrehalose, palatinose or isomaltulose, erythrose, deoxyribose, glucose, idose, talose, erythrurose, xylulose, psicose, turanose, cellobiose, amylopectin, glucosamine, mannosamine, fucose, glucuronic acid, glucosan, gluco-lactone, abequose, galactosamine, isomalto-oligosaccharide, xylo-oligosaccharide, gentio-oligosaccharide, sorbose, nigero-oligosaccharide, palatinose oligosaccharide, fructooligosaccharide, maltotetraol, maltotriol, malto-oligosaccharide, lactulose, melibiose, raffinose, rhamnose and ribose. Preferably, the sugar compound may be glucose, lactose, maltose, galactose, sucrose, D-fructose, gulose, talose and idose.

According to an embodiment of the present disclosure, the flavoring agent may be selected from Formulas 1-1 to 1-9 below.

[Formula 1-1]

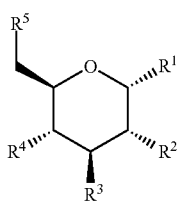

[Formula 1-2]

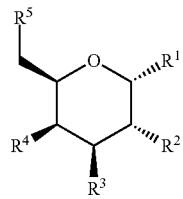

[Formula 1-3]

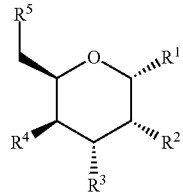

[Formula 1-4]

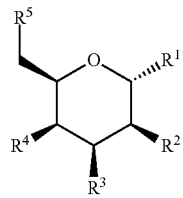

[Formula 1-5]

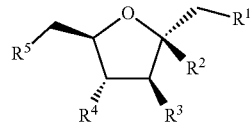

As an example of the present disclosure, in Formulas 1-1 to 1-5, $R^1$ to $R^5$ may be each selected from a hydroxyl group (—OH) and

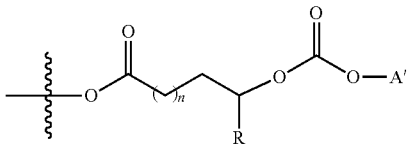

(n, R and A' are as defined in Formula 1.).

Preferably,

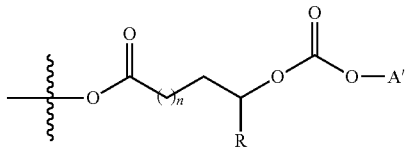

may correspond to at least one; at least two; at least three; at least four; or the whole of $R^1$ to $R^5$, more preferably at least one of $R^1$ and $R^5$; at least one of $R^1$ and $R^4$; and/or at least one of $R^3$ and $R^4$.

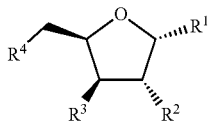
[Formula 1-6]

As an example of the present disclosure, in Formula 1-6, $R^1$ to $R^4$ may be each selected from a hydroxyl group (—OH) and

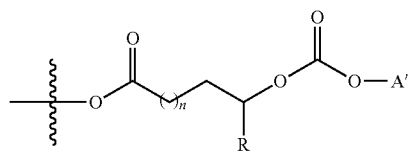

(n, R and A' are as defined in Formula 1.).
Preferably,

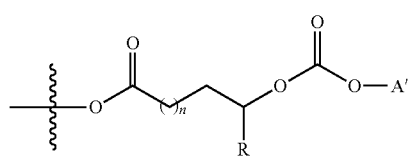

may correspond to at least one; at least two; at least three; or the whole of $R^1$ to $R^4$, more preferably at least one of $R^1$ and $R^4$; at least one of $R^2$ and $R^3$; and/or at least one of $R^1$ and $R^3$.

[Formula 1-7]
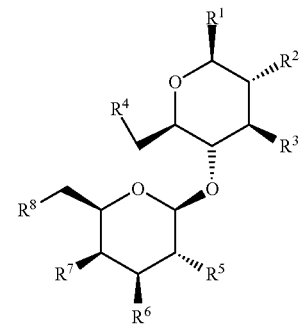

[Formula 1-8]
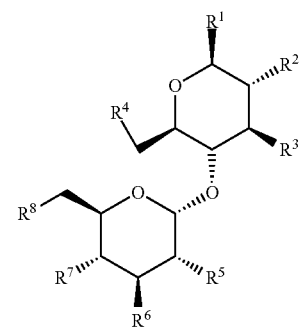

[Formula 1-9]
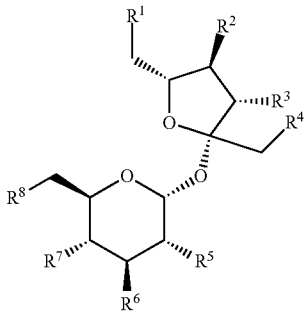

As an example of the present disclosure, in Formulas 1-7 to 1-9, $R^1$ to $R^8$ may be each selected from a hydroxyl group (—OH) and

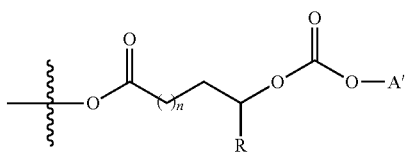

(n, R and A' are as defined in Formula 1.).
Preferably,

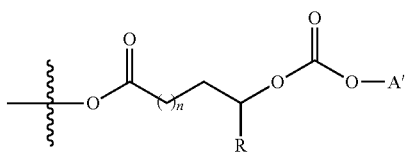

may correspond to at least one; at least two; at least three; at least four; or the whole of $R^1$ to $R^8$, more preferably at least one of $R^1$ to $R^3$; and/or at least one of $R^5$ and $R^8$, much more preferably at least one of $R^1$ and $R^2$; at least one of $R^1$ and $R^3$; at least one of $R^6$ and $R^8$; and/or at least one of $R^7$ and $R^5$.

According to an embodiment of the present disclosure, the flavoring agent may be selected from Formulas 1-1-a to 1-9-a below.

[Formula 1-1-a]
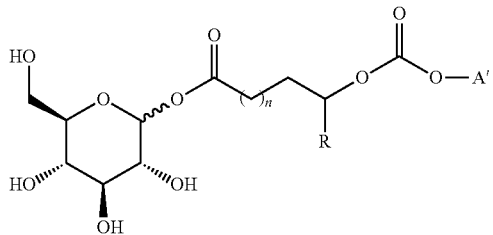

[Formula 1-2-a]

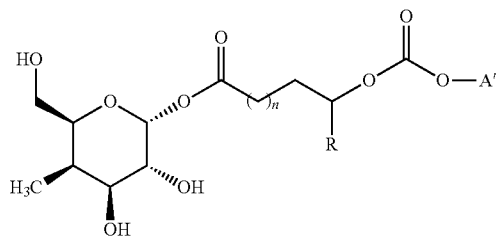

[Formula 1-3-a]

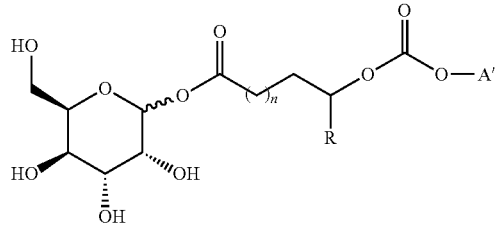

[Formula 1-4-a]

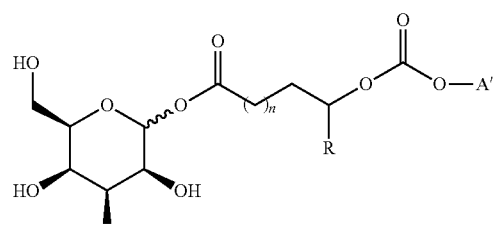

[Formula 1-5-a]

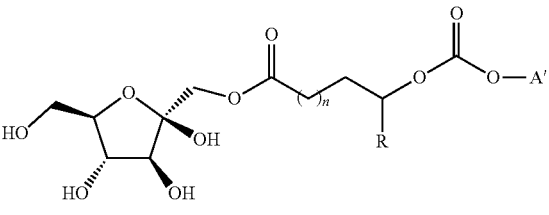

[Formula 1-6-a]

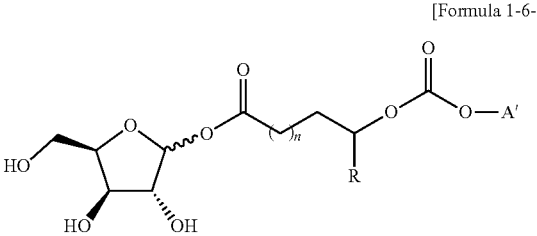

[Formula 1-7-a]

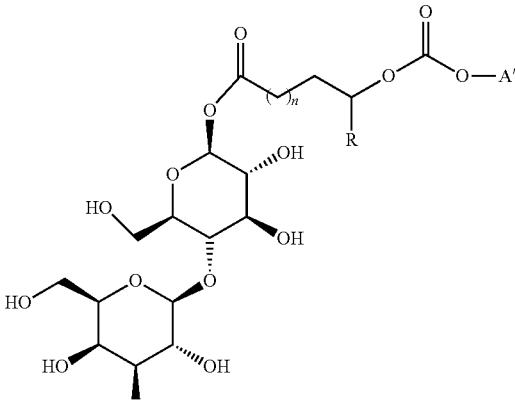

[Formula 1-8-a]

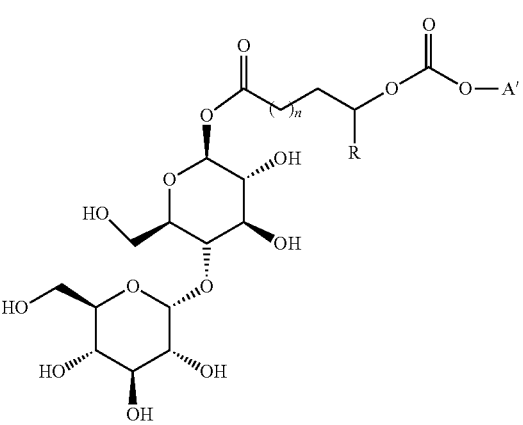

[Formula 1-9-a]

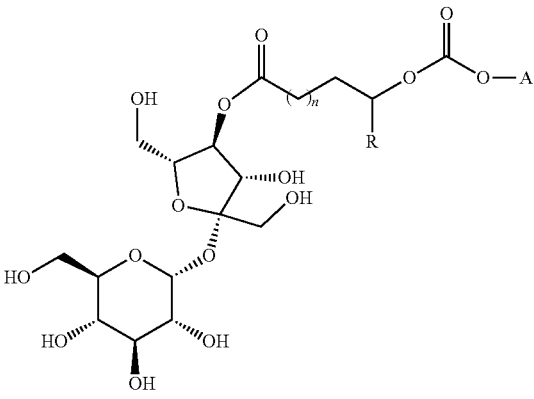

(In which, n, R and A' are as defined in Formula 1 above.)

According to an embodiment of the present disclosure, in Formula 1, n may be an integer of 1 or 2. R may be a straight-chain or branched-chain alkyl group having 1 to 30 carbon atoms; preferably a straight-chain or branched-chain alkyl group having 2 to 10 carbon atoms.

According to an embodiment of the present disclosure, the lactone compound may be gamma lactone of Formula 2 below or delta lactone of Formula 3 below.

[Formula 2]

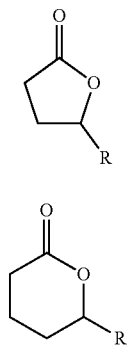

[Formula 3]

As an example of the present disclosure, in Formulas 1 and 2, R may be a straight-chain or branched-chain alkyl group having 1 to 30 carbon atoms, preferably a straight-chain or branched-chain alkyl group having 2 to 10 carbon atoms.

For example, the lactone compound may be selected from Formulas below.

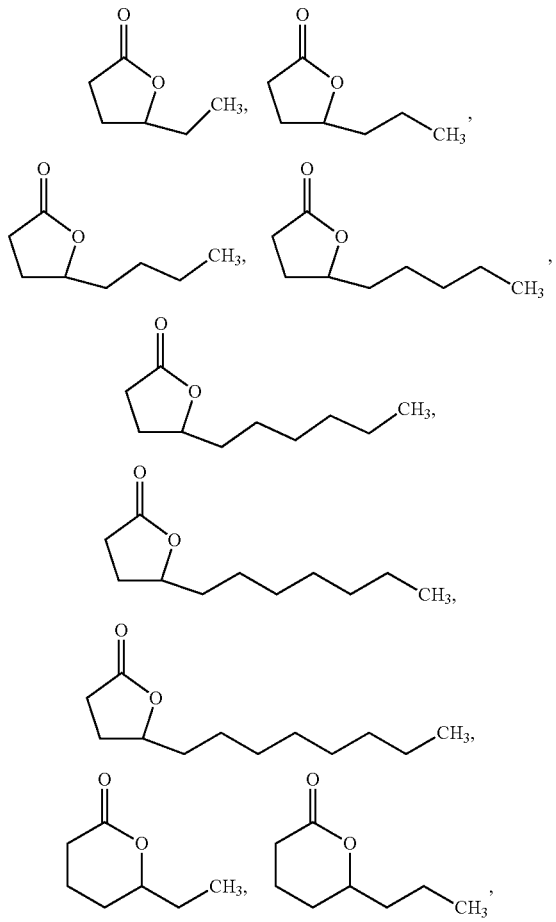

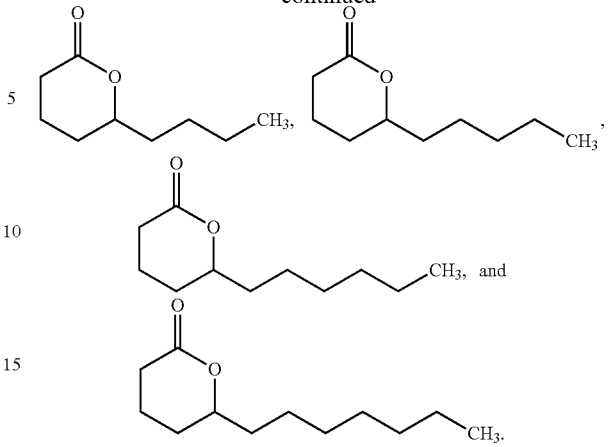

According to an embodiment of the present disclosure, the compound may be pyrolyzed at a temperature of 70° C. or higher; 80° C. or higher; 90° C. or higher; or 100° C. or higher, preferably 120° C. or higher; 150° C. or higher; 200° C. or higher; or more preferably 200° C. to 300° C. In addition, the compound may be pyrolyzed in an environment containing oxygen and/or moisture.

According to an embodiment of the present disclosure, the compound may be included in an amount of 0.0001 wt % or more; 0.001 wt % or more; 0.01 wt % or more; 0.1 wt % to 100 wt % (or less than 100 wt %); 0.1 wt % to 80 wt %; 0.0001 wt % to 60 wt %; 0.001 wt % to 50 wt %; 0.1 wt % to 30 wt %; 1 wt % to 20 wt %; 5 wt % to 20 wt %; or 5 wt % to 10 wt % of the composition. Preferably, the compound may be 0.0001 to 1 wt %. Within the range, it is possible to obtain a flavor developing function of the flavoring agent according to pyrolysis, and it is possible to provide a function capable of recognizing the fire by people by developing the flavor (e.g., volatile lactone and/or flavoring compound to be pyrolyzed by the compound of Formula 1) when exposed to a temperature that affects the pyrolysis of the compound by being exposed and/or close to the ignition point or directly burning and/or igniting the substrate.

According to an embodiment of the present disclosure, the base material (or base matrix) may be included in an amount of 1 wt % to 100 wt % (less than 100 wt %); 30 wt % to 99 wt %; 50 wt % to 99 wt %; 60 wt % to 90 wt %; 80 wt % to 90 wt %; 30 wt % to 60 wt %; or 30 wt % to 50 wt %, and may serve as a matrix capable of providing or controlling appropriate mechanical, physical and/or chemical properties according to the use of the composition. For example, when the base material includes two or more types, the mass ratio of the first component to the remaining components may be 1:0.01 to 100; 1:0.1 to 20; 1:0.1 to 10; or 1:0.1 to 5.

According to an embodiment of the present disclosure, the base material (or base matrix) may be appropriately selected according to the use of the composition, and may be, for example, a material applicable to wallpaper and/or paints. For example, the base material may be fiber, paper, pulp, wood flour, polymer resin, wood, starch powder, alginic acid, oil, wax, fatty acid, organic and/or inorganic or ceramic powder, but is not limited thereto. For example, the base material may be in the form of fibers, powders and the like.

According to an embodiment of the present disclosure, the organic and/or inorganic or ceramic powder may be chalk, perlite, vermiculite, diatomaceous earth, colloidal silica, oxide magnesium, magnesium sulfate, magnesium carbonate, diatomaceous earth powder, ocher powder, clay powder, rice hull powder, charcoal, waste shell powder, elvan, activated carbon powder, zeolite powder, activated white clay powder, silica, titanium dioxide, etc., which may be used as a base material or functional filler depending on the content.

According to an embodiment of the present disclosure, the oil may be vegetable oil, petroleum oil (e.g., paraffinic oil, mineral oil), animal oil, fatty acid (e.g., animal fat having 1 to 50 carbon atoms, vegetable fat having 1 to 50 carbon atoms, saturated fatty acid having 1 to 50 carbon atoms, unsaturated fatty acid having 1 to 50 carbon atoms (e.g., mono- or poly-unsaturated fatty acid)), and the like, but is not limited thereto. The wax is made of higher fatty acid or higher alcohol, and may be animal wax, vegetable wax, synthetic wax, petroleum wax, etc., and for example, paraffin wax, lanolin wax, carnauba wax, beeswax, PE wax, PP wax, etc., but is not limited thereto.

According to an embodiment of the present disclosure, the starch powder may be vegetable starch, modified starch, and the like. For example, the vegetable starch may include corn starch, potato starch, sweet potato starch, tapioca starch, and cassava starch; modified starch, and the like. For example, the modified starch may include oxidized starch, acetylated distarch adipate, acetylated distarch phosphate, starch sodium octenyl succinate, distarch phosphate, mono-starch phosphate, phosphated distarch phosphate, starch acetate, hydroxypropyl distarch phosphate, hydroxypropyl starch, etc., but is not limited thereto.

According to an embodiment of the present disclosure, the polymer resin may be cellulose-based resin, polylactic acid (PLA), polyhydroxy alkanoate (PHA), polyvinyl acetate resin, PVC, TPU, EVA, PP, PE (low density, high density), PET, polyvinyl chloride (PVC) or the like, or may be liquid resin. For example, the polymer resin may have a binder function. For example, the cellulose-based resin provides a polymer matrix, and may include, for example, methyl cellulose, ethyl cellulose, carboxy methyl cellulose, carboxy ethyl cellulose, hydroxy methyl cellulose, hydroxy ethyl cellulose, hydroxy propyl cellulose, hydroxy propyl cellulose, hydroxypropylmethylcellulose, hydroxyethylm-ethylcellulose, agar, carboxymethylcellulose sodium (CMC), etc., but is not limited thereto. For example, the cellulose-based resin may be nano-fibrillized cellulose (e.g., thickness: 20 μm to 300 μm).

According to an embodiment of the present disclosure, the fibers may include short fibers, long fibers, fabrics or pulverized products of fabrics, non-woven fabrics, felts, etc., which may be made of synthetic component yarns or/and natural component yarns. For example, the fibers may be natural fibers of hemp, flax, ramie, kenaf, jute, cotton, banana, fiber, banana fiber, pulp fiber, bamboo fiber, and the like. For example, the long fibers may include PLA long fiber and aliphatic polyester copolymer long fiber. The aliphatic polyester copolymer may be polyethylene succinate, polyethylene adipate, polyethylene azelate, polybutylene oxalate, polybutylene succinate, polybutylene adipate, polybutylene succinate adipate, polybutylene sebacate, etc., but is not limited thereto.

According to an embodiment of the present disclosure, the solvent is included in the remaining amount or an amount of 1 to 99 wt % by weight of the composition; 10 to 90 wt %; 10 to 80 wt %; 10 to 60 wt %; or 10 to 30 wt %.

The solvent may be water, a water-soluble organic solvent, or an oil-soluble organic solvent, and the solvent may be appropriately selected depending on the use, preferably applied without limitation as long as it is applicable to the wallpaper or paint. For example, the solvent may be an alcohol having 1 to 5 carbon atoms, water, a glycol-based solvent, etc., but is not limited thereto. For example, the glycol-based solvent may be ethylene glycol butyl ether, ethylene glycol, ethylene glycol monoacetate, diethylene glycol, diethylene glycol acetate, tetraethylene glycol, propylene glycol, propylene glycol monomethyl ether, trimethylene glycol, and the like.

According to an embodiment of the present disclosure, the composition may further include additives such as solvents, binding agents, binders, rubbers (natural rubber, epoxy-modified natural rubber and synthetic rubber), surfactants, diluents, disintegrants, lubricants, flavoring agents, colorants, preservatives, antioxidants, emulsifiers, stabilizers, flavor enhancers, foaming agents, fillers, antibacterial agents, plasticizers, wetting agents (e.g., glycerin or propylene glycol), and acetate compounds, depending on the use, and the additives may be selected from those known in the art, and are not specifically mentioned in the present disclosure.

According to an embodiment of the present disclosure, the composition may be prepared in various phases, for example, solids (e.g., powder, crystal, flake, pulverized material), slurry, suspension, paste, gel, liquid, emulsion or aerosol. For example, the composition may be molded, mixed into a desired product, or applied by methods known in the art such as applying (printing), dipping, spraying, and/or coating, etc., which is not specifically mentioned in the present disclosure.

According to an embodiment of the present disclosure, the composition may be molded in the form of a film, a sheet, or the like, or applied to a substrate by coating, dipping, printing, applying, or the like. The substrate may be applied without limitation as long as the composition is applicable, and for example, may be concrete, reinforced concrete, cement molding, brick, plywood, wood, gypsum board, tile, stone, sink, furniture, wallpaper, etc., when used as a building structure and interior material, and may be applied to electronic products, machinery and equipment. etc.

According to an embodiment of the present disclosure, the composition may be used as a paint finishing composition for architecture, interior accessories, etc., and may be applied to, for example, sofas, windows, doors, furniture, wallpaper (e.g., interior sheets), and the like. Also, for example, the composition may be coated on wallpaper base paper.

According to an embodiment of the present disclosure, the interior products or accessories may correspond to interior and exterior materials for industries such as construction, home use, automobiles, airlines, ships, trains, and the like. For example, the interior products or accessories may be finishing materials for automobiles, airlines, trains, and the like.

According to an embodiment of the present disclosure, the composition can be used as wallpaper and/or paint, and for example, the wallpaper may be a wallpaper sheet or film molded from the composition, and, for example, the wallpaper may be in a form dried and finished by applying liquid wallpaper (e.g., paint wallpaper).

According to an embodiment of the present disclosure, the paint may be a water-soluble/oil-soluble paint. For example, the paint may provide a wallpaper feel after applied on a substrate.

According to an embodiment of the present disclosure, the wallpaper and/or paint includes a compound represented by Formula 1 according to the present disclosure. The "compound represented by Formula 1" according to the present disclosure is pre-included as an additive when manufacturing wallpaper to manufacture wallpaper, or included as an additive in the paint so that the "compound represented by Formula 1" may be applied together when the paint is applied to walls, trees, and furniture. At this time, when the heat from the fire is transmitted, the flavorant component (e.g., lactone, menthol) in the "compound represented by Formula 1" is pyrolyzed at a certain high temperature (e.g., about 200 to 300° C.) to be developed. At this time, the volatile flavorant component diffuses from a part close to the flame of the building where the fire occurred and spreads throughout the building, so that people far from the fire smell unique lactone/menthol flavor to recognize that the fire has occurred. Usually, only when wallpaper, furniture, etc. are burned at a high temperature by the fire, soot and burned products spread together with smoke, but if there is a condition where there are components to be pyrolyzed, the fire can be recognized earlier.

As an example of the present disclosure, the paint may be used for building structures, interior products, accessories, electronic products, automobiles, airlines, trains, and the like. The interior product may be used for the above-mentioned home and industrial parts.

In an example of the present disclosure, the thickness of the wallpaper may be 0.1 mm or more; 0.1 mm to 5 mm; 0.1 mm to 3 mm; 0.1 mm to 2 mm; 0.1 mm to 1 mm; or 1 mm to 2 mm.

As an example of the present disclosure, the wallpaper may consist of a single layer or multiple layers, and may include, for example, a base sheet, a resin layer, a printing layer, and the like, but is not limited thereto. In addition, the composition according to the present disclosure may be sprayed, printed and/or coated on the base paper of the wallpaper.

Hereinafter, the present disclosure will be described in more detail with reference to examples and comparative examples. However, the following examples are just illustrative of the present disclosure, and the contents of the present disclosure are not limited to the following examples.

Example 1

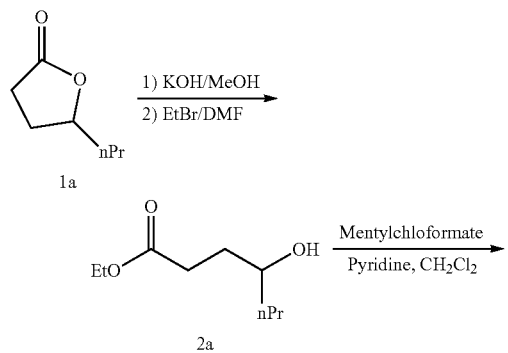

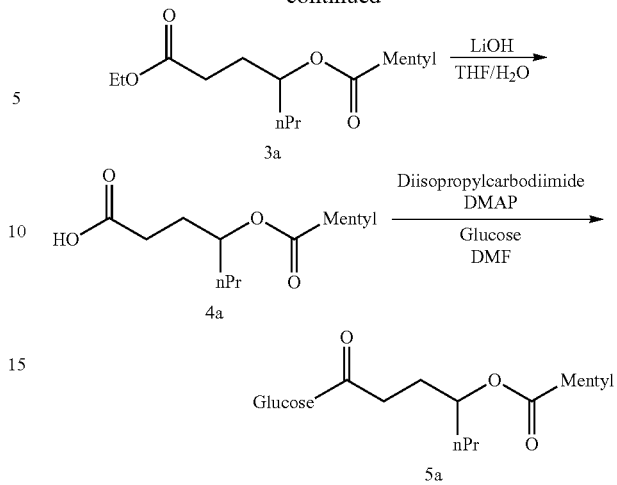

(1-1) Synthesis of ethyl 4-hydroxyheptanoate (2a)

20 g (0.15 mol) of γ-heptalactone was dissolved in 100 mL of methanol slowly added with 11.17 g (0.16 mol, 1.05 eq.) of KOH while stirring, and reacted at room temperature for 12 hours. The reaction solution was concentrated under reduced pressure, added with 80 mL of DMF, added with 17 g (0.15 mol, 1 eq.) of bromoethane while stirring, and then reacted for 12 hours. The reaction solution was added with 100 mL of water, extracted with ethyl acetate, and washed with water and salt water. The organic layer was dried with $MgSO_4$ and then concentrated under reduced pressure to obtain 18.1 g (66.7%, 2 steps) of a target product 2a.

$^1$H NMR ($CDCl_3$, 400.13 MHz); δ8.01 (s, 1H, —OH), 4.12 (q, 2H, J=8 Hz, COO—$CH_2$—), 3.63 (m, 1H, CH—O), 2.42 (m, 2H, CO—$CH_2$), 1.81~0.92 (m, 12H, alkyl)

(1-2) Synthesis of ethyl 4-(mentylcarbonyloxy)heptanoate (3a)

18 g (0.1 mol) of ethyl 4-hydroxyheptanoate (2a) was dissolved in 120 mL of THF, added with 16 g (0.2 mol, 2 eq.) of pyridine, cooled with ice water, and slowly dropped with 23 g (0.1 mol, 1 eq.) of mentyl chloroformate in a 20 mL THF solution while stirring. After 1 hour, the reaction solution was heated to room temperature and reacted overnight, and then added with water and extracted with ethyl acetate. The organic layer was washed with dilute hydrochloric acid, a saturated sodium bicarbonate solution and salt water, and then dried with $MgSO_4$ and concentrated under reduced pressure to obtain 30 g (yield 81%) of a target product 3a as a yellow liquid.

$^1$H NMR ($CDCl_3$, 400.13 MHz); δ4.74 (7tet, 1H, J=4 Hz, —COOCH—), 4.51 (td, 1H, J=9, 4 Hz, COO—CH—), 4.12 (q, 2H, J=8 Hz, COO—$CH_2$—), 2.36 (m, 2H, CO—$CH_2$—), 1.93~0.79 (m, 30H, alkyl)

(1-3) Synthesis of 4-(mentylcarbonyloxy)heptanoic acid (4a)

25 g (68.5 mmol) of ethyl 4-(mentylcarbonyloxy)heptanoate (3a) was dissolved in 100 mL of THF and 30 mL of distilled water, and added with 4.2 g (102.4 mmol, 1.5 eq.) of lithium hydroxide monohydrate and reacted at room temperature for 12 hours. The reaction solution was added with 50 mL of distilled water and extracted with ether. The water layer was adjusted to pH 3 by adding thick hydrochloric acid and then extracted with ethyl acetate. The organic layer was washed with salt water, dried with MgSO$_4$, and concentrated under reduced pressure to obtain 21.8 g (yield: 81%) of a target product 4a as a yellow liquid.

$^1$H NMR (CDCl$_3$, 400.13 MHz); δ4.76 (m, 1H, —COOCH—), 4.52 (td, 1H, J=9, 4 Hz, COO—CH—), 4.11 (q, 2H, J=8 Hz, COO—CH$_2$—), 2.42 (m, 2H, CO—CH$_2$—), 1.99~0.82 (m, 27H, alkyl)

(1-4) Synthesis of glucosyl-(4-mentylcarbonyloxy)heptanoate (5a)

3 g (9.1 mmol) of 4-(mentylcarbonyloxy)heptanoic acid (4a) was dissolved in 20 mL of DMF, and added with 3.7 g (20.5 mmol, 2.2 eq.) of glucose. While stirring at room temperature, 1.7 g (13.4 mmol, 1.5 eq.) of diisopropylcarbodiimide and 0.05 g (cat.) of DMAP were sequentially added thereto, and then reacted at room temperature for 12 hours. The reactant was added with distilled water and extracted with ethyl acetate. The organic layer was washed with dilute hydrochloric acid, a saturated sodium bicarbonate solution and salt water, respectively, dried with MgSO$_4$, and concentrated under reduced pressure. The mixture was subjected to silica gel column chromatography using a mixed solvent (6:1) of methylene chloride and methanol to obtain 0.6 g (yield: 13%) of a target product 5a.

$^1$H NMR (CDCl$_3$, 400.13 MHz); δ5.30~3.54 (m, 13H, glucose, —COOCH, —COOCH), 2.45 (m, 2H, CO—CH$_2$—), 2.03~0.78 (m, 27H, alkyl).

2. Synthesis of glucosyl-(4-mentylcarbonyloxy)nonanoate (5b)

[Reaction Formula 2]

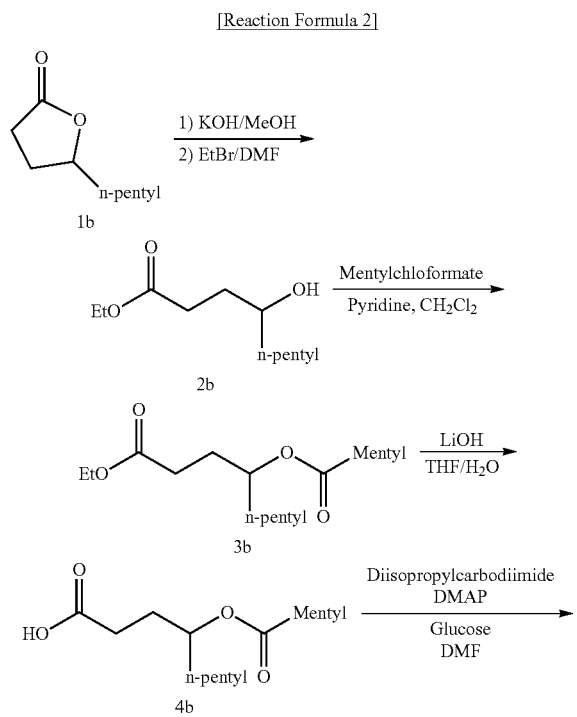

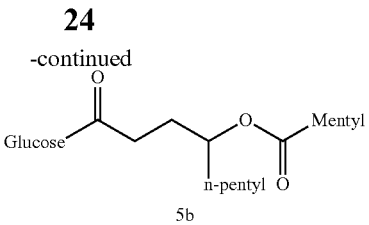

(2-1) Synthesis of ethyl 4-hydroxynonanoate (2b)

20 g (0.13 mol) of γ-nonalactone was dissolved in 100 mL of methanol, slowly added with 9.18 g (0.14 mol, 1.05 eq.) of KOH while stirring, and reacted at room temperature for 12 hours. The reaction solution was concentrated under reduced pressure, added with 80 mL of DMF, added with 14 g (0.13 mol, 1 eq.) of bromoethane while stirring, and then reacted for 12 hours. The reaction solution was added with 100 mL of water, extracted with ethyl acetate, and washed with water and salt water. The organic layer was dried with MgSO$_4$ and then concentrated under reduced pressure to obtain 24 g (93%, 2 steps) of a target product 2b.

(2-2) Synthesis of ethyl 4-(mentylcarbonyloxy)nonanoate (3b)

24 g (0.12 mol) of ethyl 4-hydroxyundecanoate (2) was dissolved in 120 mL of THF, added with 18 g (0.42 mol, 2 eq.) of pyridine, cooled with ice water, and slowly dropped with 26 g (0.12 mol, 1 eq.) of mentyl chloroformate in a 30 mL THF solution while stirring. After 1 hour, the reaction solution was heated to room temperature and reacted overnight, and then added with water and extracted with ethyl acetate. The organic layer was washed with dilute hydrochloric acid, a saturated sodium bicarbonate solution and salt water, and then dried with MgSO$_4$ and concentrated under reduced pressure to obtain 34 g (yield 74.5%) of a target product 3b as a yellow liquid.

$^1$H NMR (CDCl$_3$, 400.13 MHz); δ4.74 (7tet, 1H, J=4 Hz, —COOCH—), 4.51 (td, 1H, J=9, 4 Hz, COO—CH—), 4.12 (q, 2H, J=8 Hz, COO—CH$_2$—), 2.36 (m, 2H, CO—CH$_2$—), 1.93~0.79 (m, 23H, alkyl)

(2-3) Synthesis of 4-(mentylcarbonyloxy)nonanoic acid (4b)

11.5 g (29.9 mmol) of ethyl 4-(mentylcarbonyloxy)nonanoate (3) was dissolved in 50 mL of THF and 20 mL of distilled water, and added with 2 g (48.7 mmol, 1.6 eq.) of lithium hydroxide monohydrate and reacted at room temperature for 12 hours. The reaction solution was added with 50 mL of distilled water and extracted with ether. The water layer was adjusted to pH 3 by adding thick hydrochloric acid and then extracted with ethyl acetate. The organic layer was washed with salt water, dried with MgSO$_4$, and concentrated under reduced pressure to obtain 8.6 g (yield: 80%) of a target product 4b as a yellow liquid.

$^1$H NMR (CDCl$_3$, 400.13 MHz); δ4.75 (m, 1H, —COOCH—), 4.49 (m, 1H, COO—CH—), 2.04 (m, 2H, CO—CH$_2$—), 1.93~0.79 (m, 31H, alkyl)

(2-4) Synthesis of glucosyl-(4-mentylcarbonyloxy)nonanoate (5b)

6.6 g (24.1 mmol) of 4-(mentylcarbonyloxy)nonanoic acid (4b) was dissolved in 30 mL of DMF, and added with 13 g (72.1 mmol, 3eq.) of glucose. While stirring at room temperature, 3.4 g (26.9 mmol, 1.2 eq.) of diisopropylcarbodiimide and 0.05 g (cat.) of DMAP were sequentially added thereto, and reacted at room temperature for 12 hours. The reactant was added with distilled water and extracted with ethyl acetate. The organic layer was washed with dilute hydrochloric acid, a saturated sodium bicarbonate solution and salt water, respectively, dried with MgSO$_4$, and concentrated under reduced pressure. The mixture was subjected to silica gel column chromatography using a mixed solvent (8:1) of methylene chloride and methanol to obtain 2 g (yield 16%) of a target product 5b.

$^1$H NMR (CDCl$_3$, 400.13 MHz); δ5.57~3.35 (m, 13H, glucose, —COOCH, —COOCH), 2.43 (m, 2H, CO—CH$_2$—), 2.03~0.78 (m, 31H, alkyl).

3. Synthesis of glucosyl-(5-mentylcarbonyloxy)decanoate (6c)

[Reaction Formula 3]

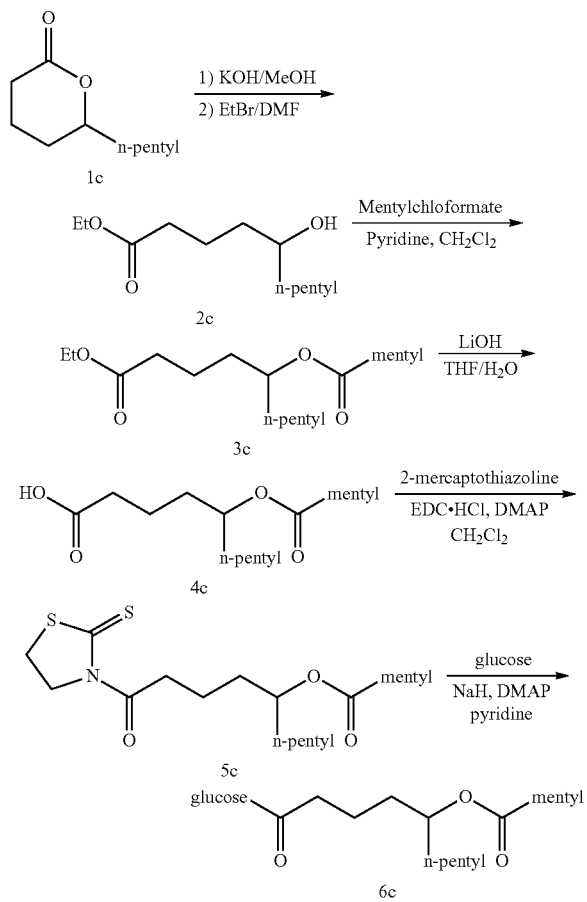

(3-1) Synthesis of ethyl 5-hydroxydecanoate (2c)

10 g (58.7 mmol) of δ-decalactone was dissolved in 50 mL of methanol, slowly added with 4.2 g (64.7 mmol, 1.05 eq.) of KOH while stirring, and reacted at room temperature for 12 hours. The reaction solution was concentrated under reduced pressure, added with 40 mL of DMF, added with 6.4 g (58.7 mmol, 1 eq.) of bromoethane while stirring, and then reacted for 12 hours.

The reaction solution was added with 100 mL of water, extracted with ethyl acetate, and washed with water and salt water. The organic layer was dried with MgSO$_4$ and then concentrated under reduced pressure to obtain 7.6 g (60%, 2 steps) of a target product 2c.

(3-2) Synthesis of ethyl 5-(mentylcarbonyloxy)decanoate (3c)

7.5 g (34.6 mmol) of ethyl 4-hydroxynonanoate (3c) was dissolved in 50 mL of THF, added with 5.3 g (69.2 mmol, 2 eq.) of pyridine, cooled with ice water, and slowly dropped with 8.3 g (37.9 mmol, 1.1 eq.) of mentyl chloroformate in a 20 mL THF solution while stirring. After 1 hour, the reaction solution was heated to room temperature and reacted overnight, and then added with water and extracted with ethyl acetate. The organic layer was washed with dilute hydrochloric acid, a saturated sodium bicarbonate solution and salt water, respectively, dried with MgSO$_4$, and concentrated under reduced pressure. The mixture was subjected to silica gel column chromatography using a mixed solvent (7:1) of n-hexane and ethyl acetate to obtain 4.5 g (yield 32.6%) of a target product 3c.

$^1$H NMR (CDCl$_3$, 400.13 MHz); δ4.72 (m, 1H, —COOCH—), 4.52 (m, 1H, COO—CH—), 4.12 (q, 2H, J=8 Hz, COO—CH$_2$—), 2.31 (t, 2H, J=8 Hz, CO—CH$_2$—), 2.08~0.86 (m, 27H, alkyl), 0.79 (d, 6H, J=8 Hz, —CH$_3$).

(3-3) Synthesis of 5-(mentylcarbonyloxy)decanoic acid (4c)

2.7 g (6.8 mmol) of ethyl 4-(mentylcarbonyloxy)nonanoate (3) was dissolved in 20 mL of THF and 10 mL of distilled water, and added with 0.42 g (10.2 mmol, 1.5 eq.) of lithium hydroxide monohydrate and reacted at room temperature for 12 hours. The reaction solution was added with 10 mL of distilled water and extracted with ether. The water layer was adjusted to pH 3 by adding thick hydrochloric acid and then extracted with ethyl acetate. The organic layer was washed with salt water, dried with MgSO$_4$, and concentrated under reduced pressure to obtain 2.1 g (yield: 78%) of a target product 4c as a yellow liquid.

$^1$H NMR (CDCl$_3$, 400.13 MHz); δ4.72 (m, 1H, —COOCH—), 4.51 (td, 1H, J=8, 4 Hz, COO—CH—), 4.11 (q, 2H, J=8 Hz, COO—CH$_2$—), 2.38 (m, 2H, CO—CH$_2$—), 2.06~0.78 (m, 33H, alkyl)

(3-4) Synthesis of 5-isopropyl-2-methylcyclohexyl (1-oxo-1-(2-thioxothiazolidin-3-yl)decan-5-yl) carbonate (5c)

1.9 g (5.1 mmol) of 5-(mentylcarbonyloxy)decanoic acid (4c) was dissolved in 20 mL of dried dichloromethane, added with 0.73 g (6.1 mmol, 1.2 eq.) of 2-mercaptothiazoline, cooled with ice water, and slowly added with 1.2 g (6.1 mmol, 1.2 eq.) of EDC·HCl and 50 mg of DMAP while stirring and reacted. After 1 hour, the reaction solution was heated to room temperature and reacted overnight, and then added with water and extracted with dichloromethane. The organic layer was washed with dilute hydrochloric acid, a saturated sodium bicarbonate solution and salt water, respectively, dried with MgSO$_4$, and concentrated under reduced pressure. The mixture was subjected to silica gel column chromatography using a mixed solvent (3:1) of n-hexane and ethyl acetate to obtain 2.1 g (yield 87.5%) of a target product 5c.

¹H NMR (CDCl₃, 400.13 MHz); δ4.71 (m, 1H, —COOCH—), 4.57 (t, 2H, J=8 Hz, N—CH₂), 4.51 (m, 1H, COO—CH—), 4.11 (q, 2H, J=8 Hz, COO—CH₂—), 3.28 (t, 2H, J=8 Hz, S—CH₂), 3.21 (m, 2H, CO—CH₂—), 2.04~0.79 (m, 33H, alkyl).

(3-5) Synthesis of glucosyl-(5-mentylcarbonyloxy)decanoate (6c)

2.2 g (4.7 mmol) of 5-isopropyl-2-methylcyclohexyl (1-oxo-1-(2-thioxothiazolidin-3-yl)decan-5-yl) carbonate (5c) was dissolved in 20 mL of pyridine and added with 2.5 g (14.1 mmol, 3eq.) of glucose. While stirring at room temperature, 93 mg (2.4 mmol, 0.5 eq.) of sodium hydride (60%) and 0.03 g (cat.) of DMAP were sequentially added thereto, and then reacted at room temperature for 12 hours. The reactant was added with 0.5 mL of acetic acid, added with saturated salt water, and then extracted with ethyl acetate. The organic layer was dried with MgSO₄ and concentrated under reduced pressure. The mixture was subjected to silica gel column chromatography using a mixed solvent (8:1) of methylene chloride and methanol to obtain 0.55 g (yield 22%) of a target product 6c.

¹H NMR (CDCl₃, 400.13 MHz); δ5.57~3.15 (m, 13H, glucose, —COOCH, —COOCH), 2.36 (m, 2H, CO—CH₂—), 2.05~0.80 (m, 33H, alkyl).

Synthesis of glucosyl-(4-mentylcarbonyloxy)undecanoate (6d)

[Reaction Formula 4]

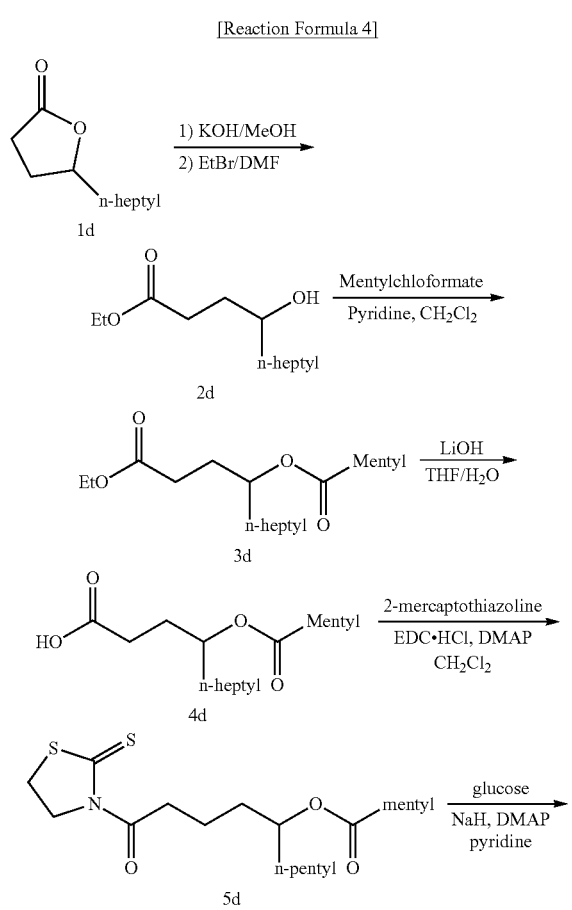

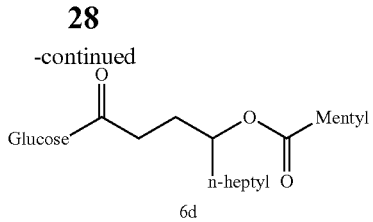

(4-1) Synthesis of ethyl 4-hydroxyundecanoate (2d)

10 g (54.2 mmol) of 7-undecalactone was dissolved in 50 mL of methanol, slowly added with 3.9 g (56.9 mmol, 1.05 eq.) of KOH while stirring, and reacted at room temperature for 12 hours. The reaction solution was concentrated under reduced pressure, added with 50 mL of DMF, added with 5.9 g (54.2 mmol, 1 eq.) of bromoethane while stirring, and then reacted for 12 hours.

The reaction solution was added with 80 mL of water, extracted with ethyl acetate, and washed with water and salt water. The organic layer was dried with MgSO₄ and then concentrated under reduced pressure to obtain 10.7 g (85.6%, 2 steps) of a target product 2d.

¹H NMR (CDCl₃, 400.13 MHz); δ4.12 (q, 2H, J=8 Hz, COO—CH₂—), 3.59 (m, 1H, CH—O), 2.43 (m, 2H, CO—CH₂), 1.81~0.92 (m, 20H, alkyl)

(4-2) Synthesis of ethyl 4-(mentylcarbonyloxy)undecanoate (3d)

11 g (47.7 mmol) of ethyl 4-hydroxyundecanoate (2d) was dissolved in 60 mL of THF, added with 6.8 g (95.5 mmol, 2 eq.) of pyridine, cooled with ice water, and slowly dropped with 10.5 g (47.7 mmol, 1 eq.) of mentyl chloroformate in a 20 mL THF solution while stirring. After 1 hour, the reaction solution was heated to room temperature and reacted overnight, and then added with water and extracted with ethyl acetate. The organic layer was washed with dilute hydrochloric acid, a saturated sodium bicarbonate solution and salt water, respectively, and then dried with MgSO₄ and concentrated under reduced pressure to obtain 8.3 g (yield 42.1%) of a target product 3d as a yellow liquid.

¹H NMR (CDCl₃, 400.13 MHz); δ4.74 (7tet, 1H, J=4 Hz, —COOCH—), 4.51 (td, 1H, J=9, 4 Hz, COO—CH—), 4.12 (q, 2H, J=8 Hz, COO—CH₂—), 2.36 (m, 2H, CO—CH₂—), 1.93~0.79 (m, 23H, alkyl)

(4-3) Synthesis of 4-(mentylcarbonyloxy)undecanoic acid (4d)

8.3 g (19.4 mmol) of ethyl 4-(mentylcarbonyloxy)undecanoate (3d) was dissolved in 30 mL of THF and 20 mL of distilled water, and added with 1.2 g (29.1 mmol, 1.5 eq.) of lithium hydroxide monohydrate and reacted at room temperature for 12 hours. The reaction solution was added with 20 mL of distilled water and extracted with ether. The water layer was adjusted to pH 3 by adding thick hydrochloric acid and then extracted with ethyl acetate. The organic layer was washed with salt water, dried with MgSO₄ and concentrated under reduced pressure. The mixture was subjected to silica gel column chromatography using a mixed solvent (8:1) of n-hexane and ethyl acetate to obtain 6.8 g (yield 91.8%) of a target product 4d.

¹H NMR (CDCl₃, 400.13 MHz); δ4.75 (m, 1H, —COOCH—), 4.51 (m, 1H, COO—CH—), 2.43 (m, 2H, CO—CH₂—), 2.17~0.78 (m, 35H, alkyl)

(4-4) Synthesis of 5-isopropyl-2-methylcyclohexyl (1-oxo-1-(2-thioxothiazolidin-3-yl)dodecan-5-yl) carbonate (5d)

9.1 g (23.6 mmol) of 5-(mentylcarbonyloxy)undecanoic acid (4d) was dissolved in 50 mL of dried dichloromethane, added with 3 g (24.8 mmol, 1.05 eq.) of 2-mercaptothiazoline, cooled with ice water, and slowly added with 5 g (25.9 mmol, 1.1 eq.) of EDC·HCl and 20 mg of DMAP while stirring and reacted. After 1 hour, the reaction solution was heated to room temperature and reacted overnight, and then added with water and extracted with dichloromethane. The organic layer was washed with dilute hydrochloric acid, a saturated sodium bicarbonate solution and salt water, respectively, and then dried with $MgSO_4$ and concentrated under reduced pressure to obtain 10.9 g (yield 92%) of a target product 5d.

$^1$H NMR ($CDCl_3$, 400.13 MHz); δ4.71 (m, 1H, —COOCH—), 4.57 (t, 2H, J=8 Hz, N—$CH_2$), 4.51 (m, 1H, COO—CH—), 4.11 (q, 2H, J=8 Hz, COO—$CH_2$—), 3.28 (t, 2H, J=8 Hz, S—$CH_2$), 3.21 (m, 2H, CO—$CH_2$—), 2.04~0.79 (m, 33H, alkyl).

(4-5) Synthesis of glucosyl-(4-mentylcarbonyloxy)undecanoate (6d)

4.9 g (12.7 mmol) of 4-(mentylcarbonyloxy)undecanoic acid was dissolved in 30 mL of dichloromethane, added with 3 g (25.2 mmol, 2 eq.) of thionyl chloride, and then refluxed for 2 hours. 6.9 g (3 eq.) of glucose and 4.9 g (5 eq.) of pyridine were added to a DMF solvent in another flask, and the reaction solution was slowly dropped while stirring at room temperature, and then reacted for 12 hours. The reaction solution was added with water and extracted with dichloromethane. The organic layer was washed with dilute hydrochloric acid, a saturated sodium bicarbonate solution, and salt water, respectively, dried with $MgSO_4$, concentrated under reduced pressure, and subjected to silica gel column chromatography (MC/MeOH, 10:1) to obtain 2.6 g (37.7% yield) of a target product (6d).

$^1$H NMR ($CDCl_3$, 400.13 MHz); δ5.23~3.35 (m, 13H, glucose, —COOCH, —COOCH), 2.43 (m, 2H, CO—$CH_2$—), 2.03~0.78 (m, 35H, alkyl).

5. Synthesis of glucosyl-(4-benzyloxycarbonyloxy)undecanoate (5e)

[Reaction Formula 5]

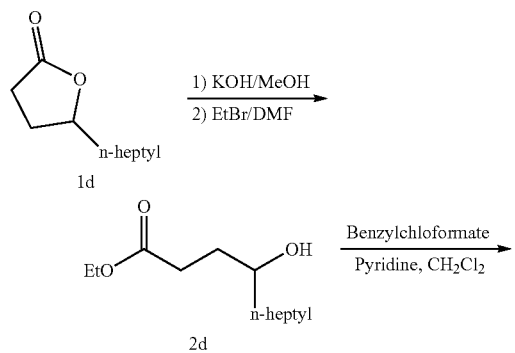

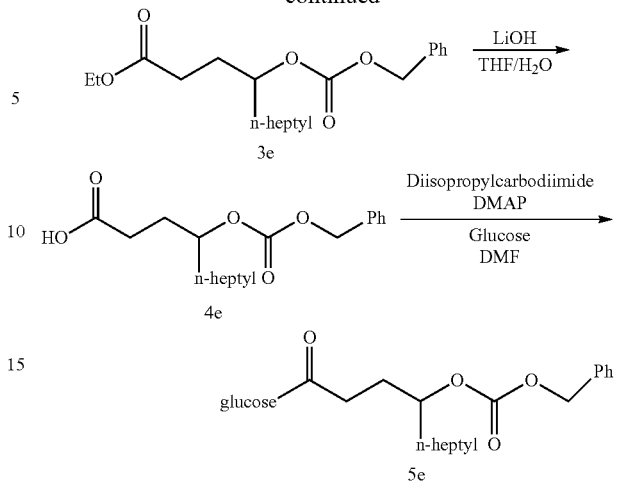

(5-1) Synthesis of ethyl 4-hydroxyundecanoate (2d)

10 g (54.2 mmol) of γ-undecalactone was dissolved in 50 mL of methanol, slowly added with 3.9 g (56.9 mmol, 1.05 eq.) of KOH while stirring, and reacted at room temperature for 12 hours. The reaction solution was concentrated under reduced pressure, added with 50 mL of DMF, added with 5.9 g (54.2 mmol, 1 eq.) of bromoethane while stirring, and then reacted for 12 hours.

The reaction solution was added with 80 mL of water, extracted with ethyl acetate, and washed with water and salt water. The organic layer was dried with $MgSO_4$ and then concentrated under reduced pressure to obtain 10.7 g (85.6%, 2 steps) of a target product 2d.

$^1$H NMR ($CDCl_3$, 400.13 MHz); δ4.12 (q, 2H, J=8 Hz, COO—$CH_2$—), 3.59 (m, 1H, CH—O), 2.43 (m, 2H, CO—$CH_2$), 1.81~0.92 (m, 20H, alkyl)

(5-2) Synthesis of ethyl 4-(benzyloxycarbonyloxy)undecanoate (3e)

Figure 24:
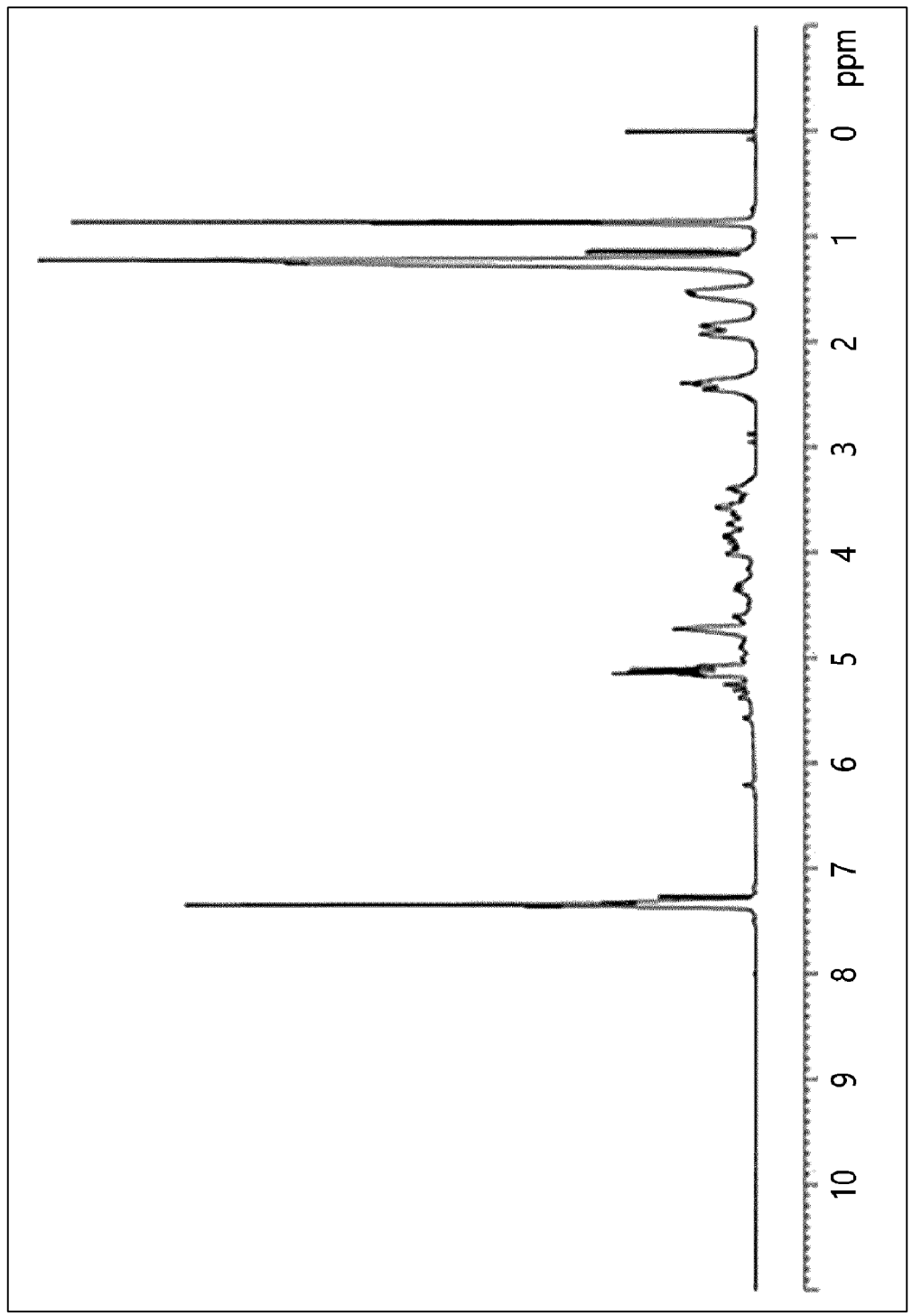
FIG. 24 illustrates results of NMR analysis of glucosyl-(4-benzyloxycarbonyloxy) nonanoate (5e) prepared in examples, according to an embodiment of the present disclosure.

8.3 g (36 mmol) of ethyl 4-hydroxyundecanoate (2d) was dissolved in 50 mL of THF, added with 5.5 g (72.3 mmol, 2 eq.) of pyridine, cooled with ice water, and slowly dropped with 6.1 g (35.3 mmol, 1 eq.) of benzylchloroformate in a 20 mL THF solution while stirring. After 1 hour, the reaction solution was heated to room temperature and reacted overnight, and then added with water and extracted with ethyl acetate. The organic layer was washed with dilute hydrochloric acid, a saturated sodium bicarbonate solution and salt water, respectively, and then dried with $MgSO_4$ and concentrated under reduced pressure to obtain 9.9 g (yield 75.6%) of a target product 3e as a yellow liquid. $^1$H NMR ($CDCl_3$, 400.13 MHz); δ7.37~7.34 (m, 5H, ph), 5.14 (m, 2H, O—$CH_2$-Ph), 4.12 (brs, 1H, O—CH—), 2.42 (m, 2H, CO—$CH_2$—), 1.90~0.79 (m, 21H, alkyl) (FIG. 24).

(5-3) Synthesis of 4-(benzyloxycarbonyloxy)undecanoic acid (4e)

10 g (27.5 mmol) of ethyl 4-(benzyloxycarbonyloxy) undecanoate (3e) was dissolved in 30 mL of THF and 20 mL of distilled water, and added with 1.7 g (41.4 mmol, 1.5 eq.) of lithium hydroxide monohydrate and reacted at room temperature for 12 hours. The reaction solution was added with 20 mL of distilled water and extracted with ether. The water layer was adjusted to pH 3 by adding thick hydrochloric acid and then extracted with ethyl acetate. The organic layer was washed with salt water, dried with $MgSO_4$, and concentrated under reduced pressure to obtain 8.2 g (yield: 89%) of a target product 4e.

$^1$H NMR ($CDCl_3$, 400.13 MHz); δ7.37~7.35 (m, 5H, ph), 5.14 (m, 2H, O—$CH_2$-Ph), 4.48 (m, 1H, O—CH—), 2.47 (m, 2H, CO—$CH_2$—), 1.90~0.79 (m, 21H, alkyl)

(5-4) Synthesis of glucosyl-(4-benzyloxycarbonyloxy)nonanoate (5e)

8 g (23.8 mmol) of 4-(benzyloxycarbonyloxy)undecanoic acid (4e) was dissolved in 30 mL of DMF, and added with 13 g (72.1 mmol, 3eq.) of glucose. While stirring at room temperature, 3.4 g (26.9 mmol, 1.1 eq.) of diisopropylcarbodiimide and 0.05 g (cat.) of DMAP were sequentially added thereto, and then reacted at room temperature for 12 hours. The reactant was added with distilled water and extracted with ethyl acetate. The organic layer was washed with dilute hydrochloric acid, a saturated sodium bicarbonate solution and salt water, respectively, dried with $MgSO_4$, and concentrated under reduced pressure. The mixture was subjected to silica gel column chromatography using a mixed solvent (8:1) of methylene chloride and methanol to obtain 0.3 g (yield 2.5%) of a target product 5e.

$^1$H NMR ($CDCl_3$, 400.13 MHz); δ7.37~7.34 (m, 5H, ph), 5.30~3.37 (m, 13H, glucose, —COOCH, —COOCH), 2.39 (m, 2H, CO—$CH_2$—), 1.92~0.84 (m, 17H, alkyl).

Experimental Example

A pyrolysis test was performed to confirm the pyrolytic behavior of the 6d compound (2C) when exposed to heat, which was observed by a commonly known pyrolysis-gas chromatography/mass spectrometry [Py-GC/MS] method. A pyrolyzer performed the [Double-Shot Pyrolyzer 2020iD] (Frontier Lab, Japan) in a system connected to the GC/MS (Agilent 6890 GC, USA/Aginelt 7890 MSD, USA) equipment. 2C was diluted in an ethyl alcohol solution at a concentration of 2.5%, and then 10 µl was loaded into a pyrolyzer sample cup and pyrolyzed. The pyrolysis temperature was specified as a temperature of the furnace of a double-shot pyrolyzer to control a temperature experienced by the sample, but a first pyrolysis temperature allowed the target compound (2C) in the sample cup to undergo pyrolysis by exposing a sample cup in which the sample was placed to the furnace at 80° C. for 30 seconds. Components generated by heat or volatilized by heat were immediately injected into an injector of GC/MS and separated. During GC/MS analysis after pyrolysis, the sample cup was removed from the furnace so as not to be affected by the pyrolysis temperature, and after the GC/MS analysis by the first pyrolysis was completed, the first used sample cup was subjected to pyrolysis again without injecting a new compound, and at this time, the pyrolysis temperature was 90° C. higher by 10° C. and the pyrolysis was performed for 30 seconds. Also, after the pyrolysis was completed, the sample cup was removed from the furnace so as not to be affected by the pyrolysis temperature. In this way, the pyrolysis test was performed while the temperature rose from 80° C., 90° C., and 100° C. to final 320° C. at the time of pyrolysis after loading the first sample into the sample cup. As a result, the pyrolytic characteristics of the compounds experienced while the pyrolysis temperature increased were separately observed for each temperature range. The results were illustrated in FIGS. 25 to 27.

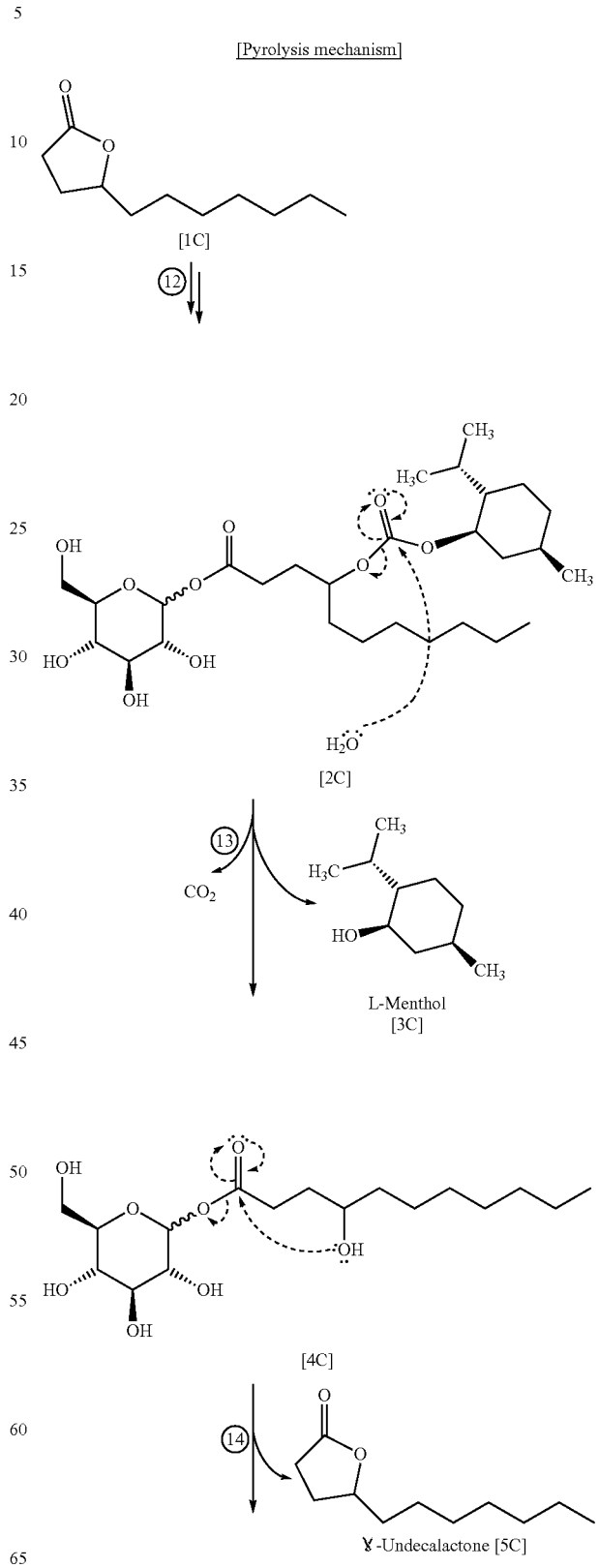

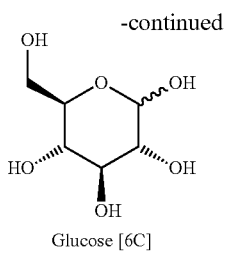

Glucose [6C]

Figure 25:
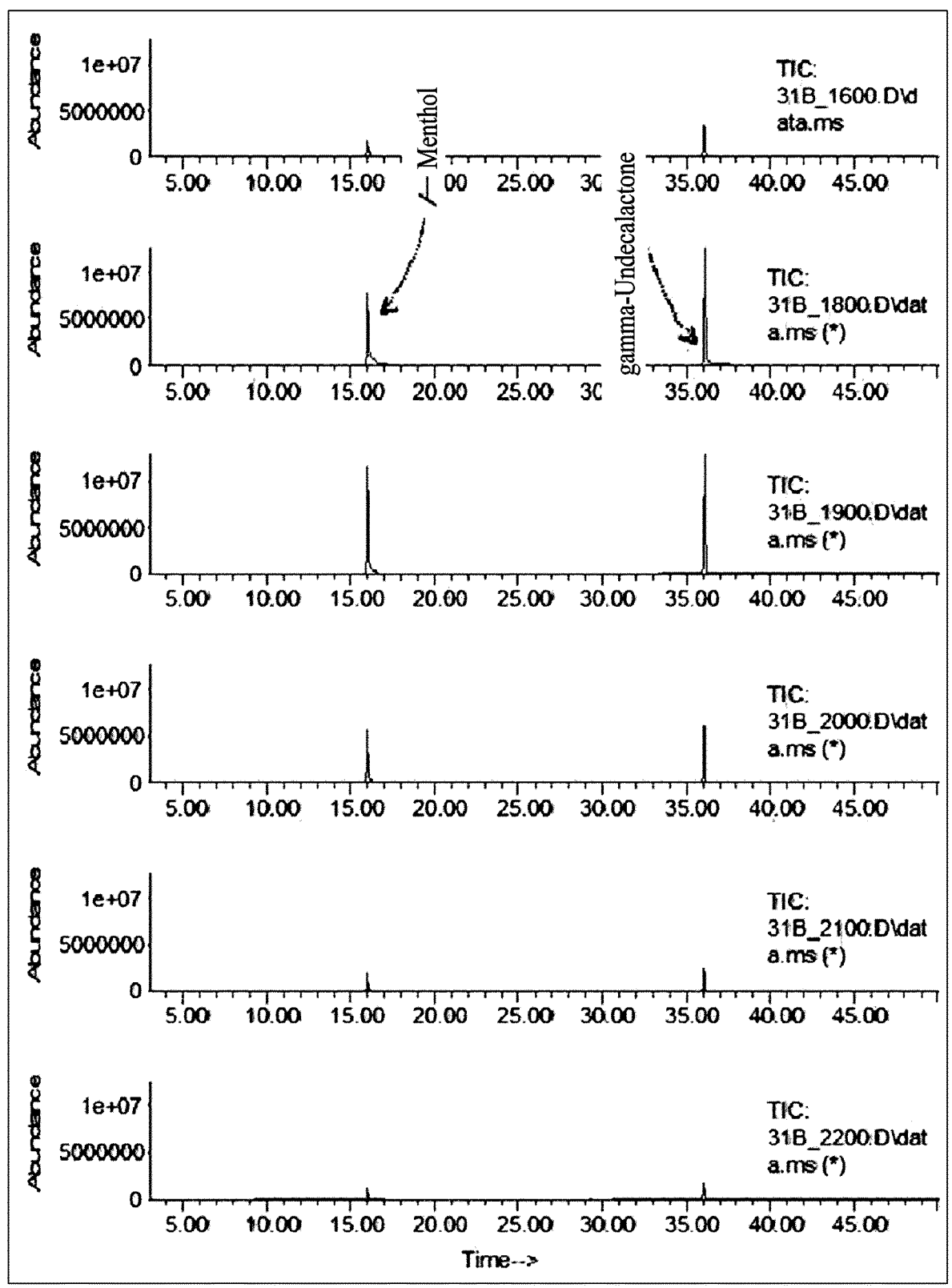
FIG. 25 illustrates thermal analysis results of the compounds prepared in examples, according to an embodiment of the present disclosure.
Figure 26:
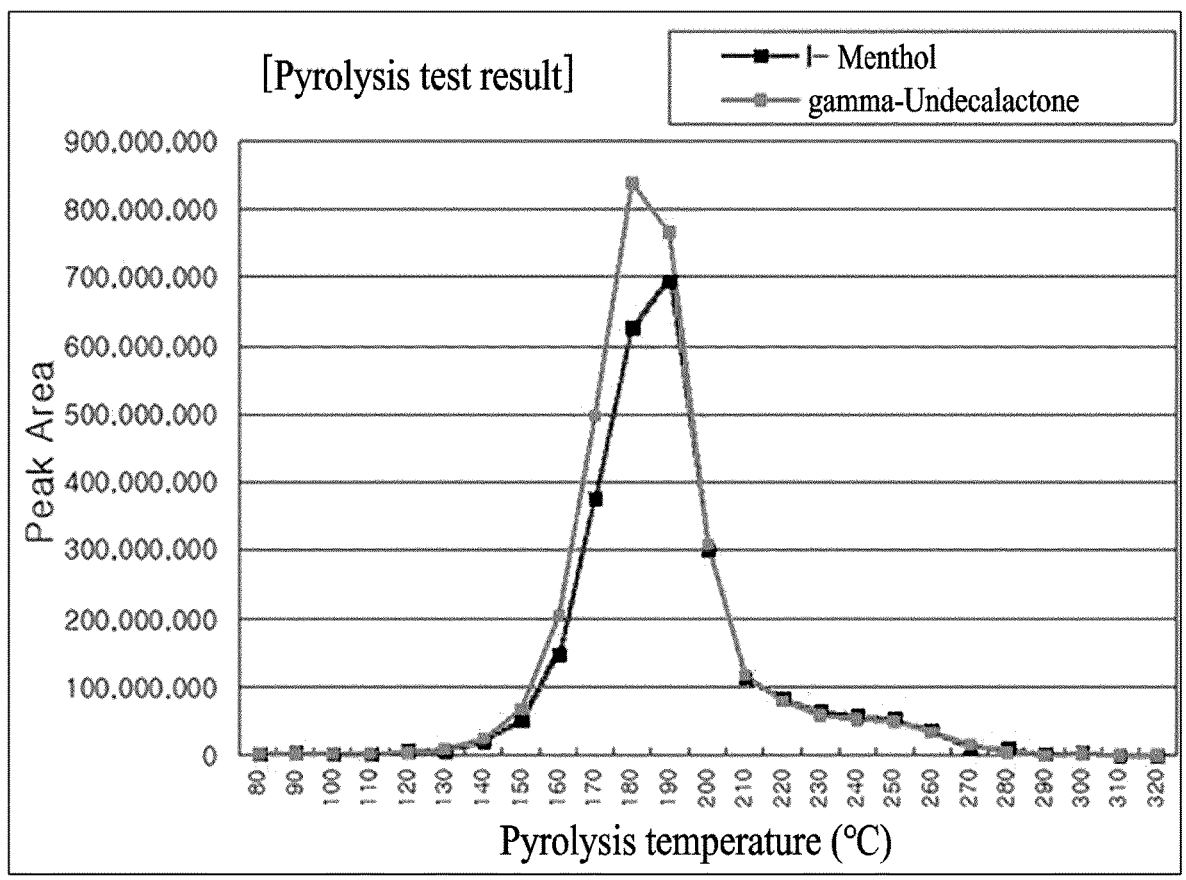
FIG. 26 illustrates a distribution of components according to a pyrolysis temperature of the compounds prepared in examples, according to an embodiment of the present disclosure.
Figure 27:
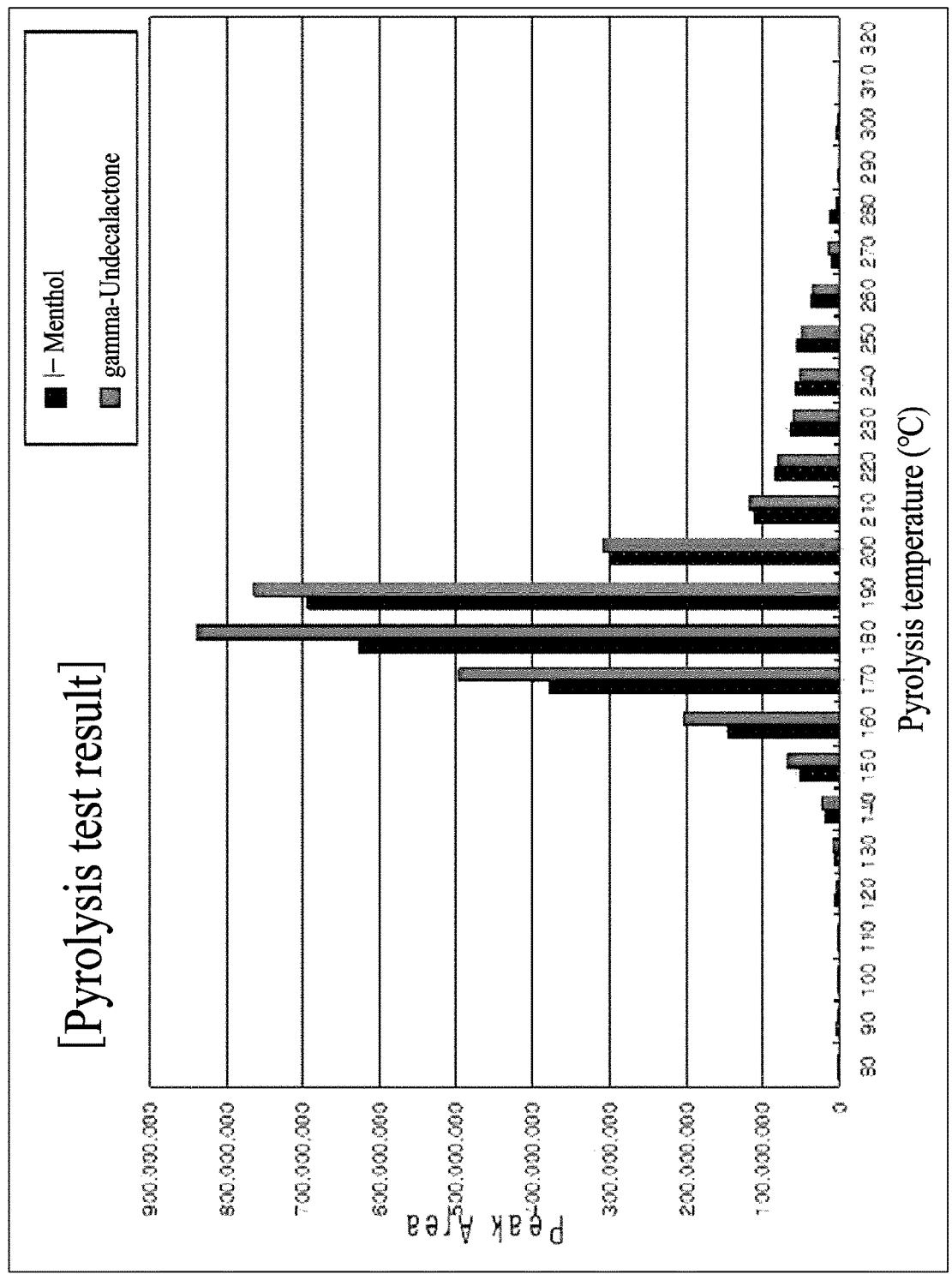
FIG. 27 illustrates a distribution of components according to a pyrolysis temperature of the compounds prepared in examples, according to an embodiment of the present disclosure.

In FIGS. 25 to 27, it can be confirmed that menthol and gamma-undecanolactone are decomposed at about 120° C., as a result of the pyrolysis test of the 2B compound.

That is, in the pyrolysis mechanism, lactone [1C, gamma-undecalactone] was ring-opened, and a hydroxyl group was linked with L-menthol by a carbonate linkage, and then linked with sugar (glucose) by ester to prepare the [2C] compound. After the [2C] compound was applied to a product matrix, while L-menthol ([3C]) and $CO_2$ were generated by heat, a [4C] compound with exposed hydroxyl groups was generated. The [4C] compound was also ring-closed (intramolecular esterification) by heat to generate gamma-undecalactone [5C]. In the [2C] state, the hydroxyl group was protected with a menthyl carbonate group, so that ring-closing (intramolecular esterification) may be prevented from occurring at room temperature. In addition, as a result of the pyrolysis test, it was confirmed that menthol was pyrolyzed and a lactone ring was generated at the same time.

Since compounds developing the pyrolytic flavorant components of the present disclosure are as follows and the temperature range in which lactone is produced by a pyrolytic behavior is known, when applied to a heated tobacco, the heating temperature is appropriately adjusted to control the degree and rate at which menthol and lactone were released from the compound 2C added to the medium and control uniform taste and flavor to be released even if the puffing is lasted under an optimal temperature condition.

Example 2

The target product (synthesized glucosyl-(4-mentylcarbonyloxy)heptanoate, 5a, 1 wt %) of a preparation example, a base matrix (natural long fibers, pulp and carboxymethyl cellulose (CMC), 15:50:5 (w/w), 90 wt %), and remaining water were mixed and coated and dried on a substrate to prepare a wallpaper sheet (about 2 mm thick). When the sheet was smelled at room temperature, it was confirmed that there was no smell of the flavoring compound used in the synthesis of the target product, but flavors (e.g., lactone flavor and menthol flavor used in the synthesis of the target product) were developed when the wallpaper sheet was burned.

Example 3

The target product (synthesized glucosyl-(4-mentylcarbonyloxy)nonanoate, 5b, 1 wt %) of a preparation example, a base matrix (natural long fibers, pulp and carboxymethyl cellulose (CMC), 15:50:5 (w/w), 90 wt %), and remaining water were mixed and coated and dried on a substrate to prepare a wallpaper sheet (about 2 mm thick). When the sheet was smelled at room temperature, it was confirmed that there was no smell of the flavoring compound used in the synthesis of the target product, but flavors (e.g., lactone flavor and menthol flavor used in the synthesis of the target product) were developed when the wallpaper sheet was burned.

Example 4

The target product (synthesized glucosyl-(5-mentylcarbonyloxy)decanoate, 6c, 1 wt %) of a preparation example, a base matrix (natural long fibers, pulp and carboxymethyl cellulose (CMC), 15:50:5 (w/w), 95 wt %), and remaining water were mixed and coated and dried on a substrate to prepare a wallpaper sheet (about 2 mm thick). When the sheet was smelled at room temperature, it was confirmed that there was no smell of the flavoring compound used in the synthesis of the target product, but flavors (e.g., lactone flavor and menthol flavor used in the synthesis of the target product) were developed when the wallpaper sheet was burned.

Example 5

The target product (synthesized glucosyl-(5-mentylcarbonyloxy)decanoate, 6c, 1 wt %) of a preparation example, a base matrix (natural long fibers, pulp and carboxymethyl cellulose (CMC), 15:50 to 60:5 (w/w), 80 wt %), propylene glycol, turpentine oil and remaining water were included to prepare a liquid paint composition. The liquid composition was painted on a concrete wall with a brush and dried to be finished with a wallpaper-like feel. The finished wall was smelled at room temperature, but there was no smell of the flavoring compound used in the synthesis of the target product. It was confirmed that flavors (e.g., lactone flavor and menthol flavor used in the synthesis of the target product) were developed on the wall when furniture was burnt and heated near the wall.

As described above, although the embodiments have been described by the restricted embodiments and the drawings, various modifications and variations can be made from the above description by those skilled in the art. For example, even if the described techniques are performed in a different order from the described method, and/or components described above are coupled or combined in a different form from the described method, or replaced or substituted by other components or equivalents, an appropriate result can be achieved. Therefore, other implementations, other embodiments, and equivalents to the appended claims fall within the scope of the claims to be described below.

The invention claimed is:

1. A wallpaper composition comprising:
   a compound represented by Formula 1 below; and
   a base material comprising at least one selected from the group consisting of fiber, pulp, cellulose-based resin and liquid resin,

[Formula 1]

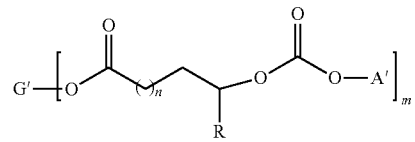

wherein in Formula 1,
n is an integer of 1 or 2,
R is a straight-chain or branched-chain alkyl group having 1 to 30 carbon atoms, a moiety A' is a moiety derived from a flavoring compound having at least one of an aromatic ring, an aliphatic ring and an aliphatic chain having a hydroxyl group (—OH), wherein the hydroxyl group participates in a carbonate linkage

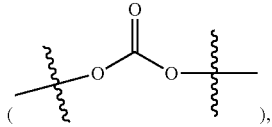

and the moiety A' corresponds to a flavoring compound excluding the hydroxyl group participating in the carbonate linkage, a moiety G' is a moiety derived from a sugar compound, wherein at least one of hydroxyl groups (—OH) linked to a ring of the sugar compound participates in an ester linkage

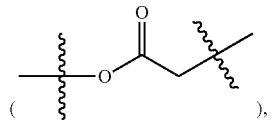 [SMILES: *CC(=O)O*]

G' corresponds to a sugar compound excluding the hydroxyl group participating in the ester linkage, and m is the number of

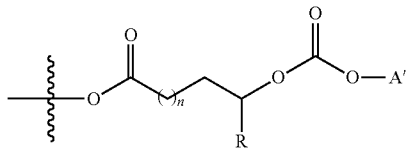

linked to the moiety G' by the ester linkage, and an integer of 1 to 8.

2. The wallpaper composition of claim 1, wherein the flavoring compound is selected from a cyclic monoterpene-based compound having a hydroxyl group, an acyclic monoterpene-based compound having a hydroxyl group, an aromatic compound of 6 to 10 carbon atoms having a hydroxyl group, and a non-aromatic cyclic compound of 5 to 6 carbon atoms having a hydroxyl group.

3. The wallpaper composition of claim 1, wherein the flavoring compound is selected from Formulas below:

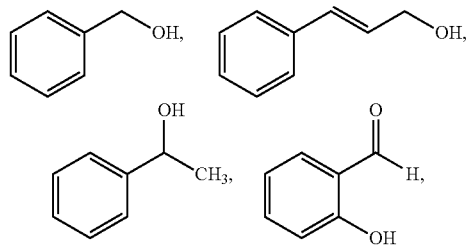

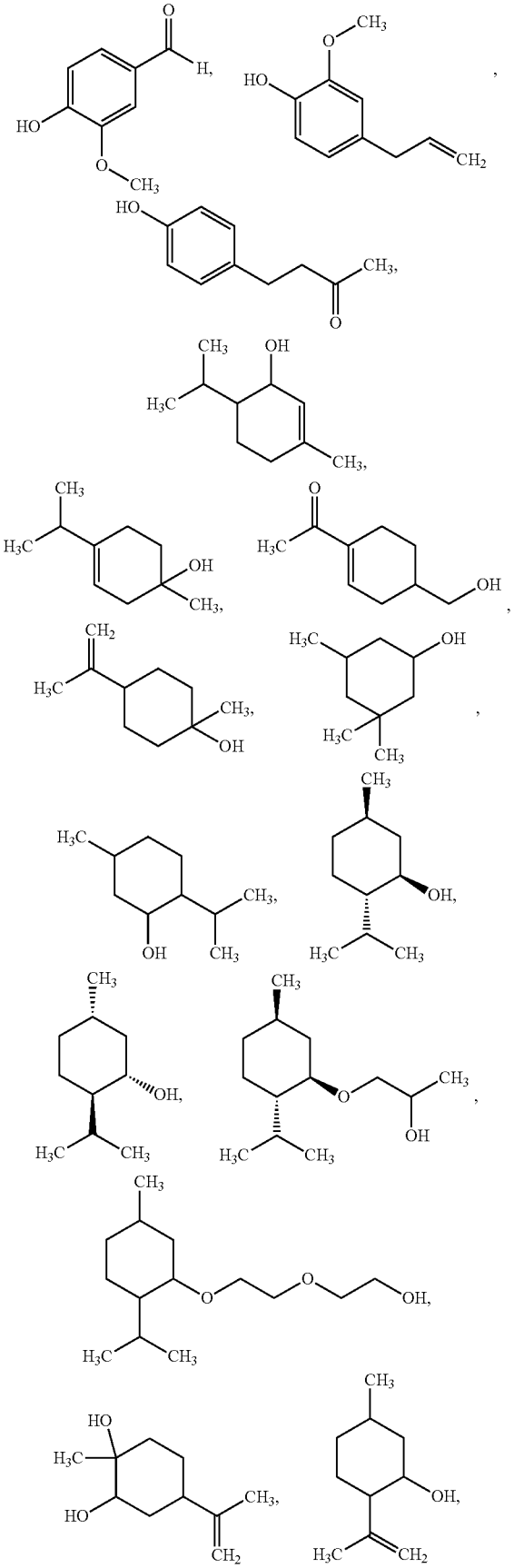

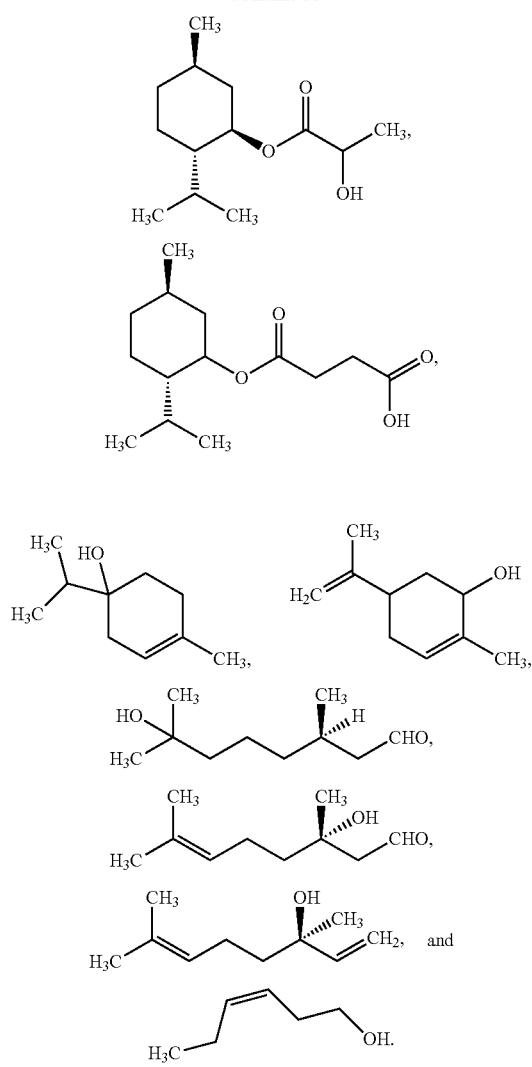
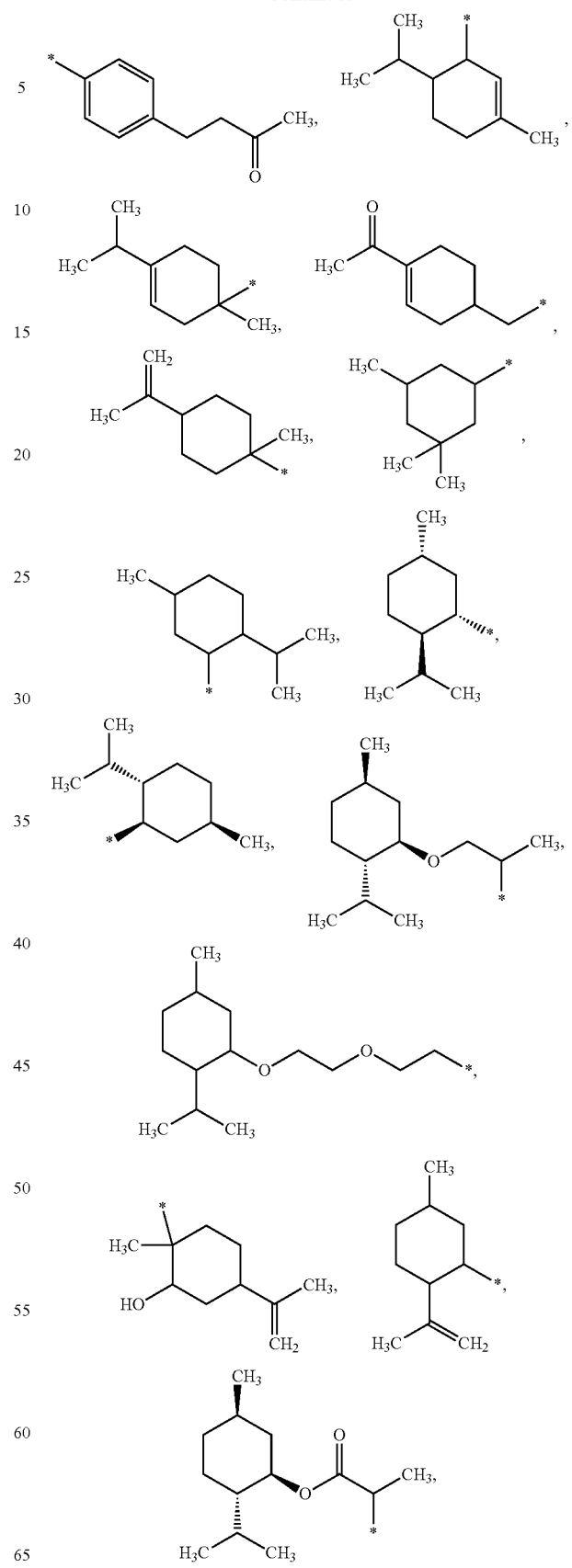
4. The wallpaper composition of claim 1, wherein the moiety A' is selected from Formulas below:
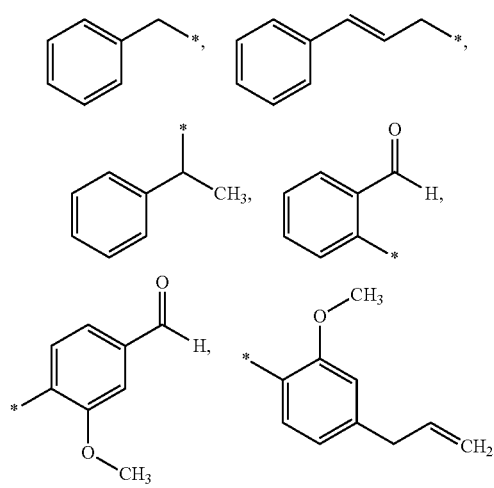

-continued

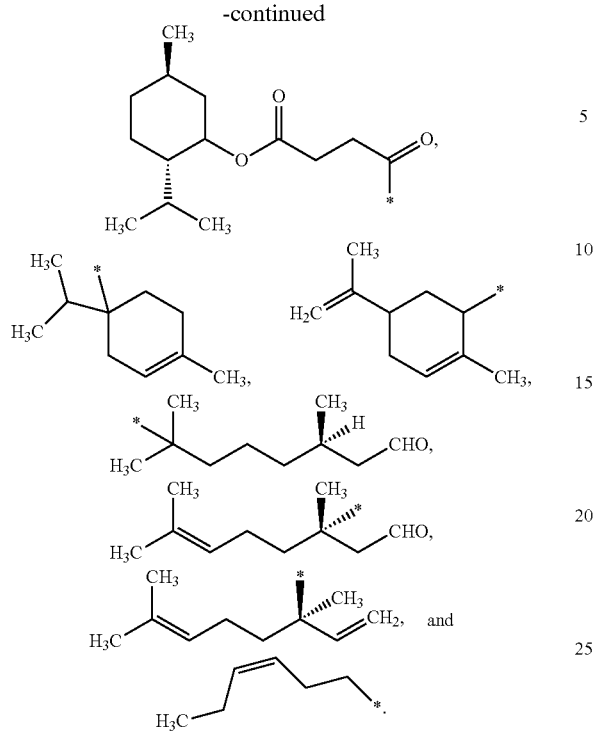

wherein * is an oxygen binding site in the carbonate linkage in Formula 1 above.

5. The wallpaper composition of claim 1, wherein the sugar compound is selected from tagatose, trehalose, galactose, rhamnose, cyclodextrin, maltodextrin, dextran, sucrose, glucose, ribulose, fructose, threose, arabinose, xylose, lyxose, allose, altrose, mannose, idose, lactose, maltose, invert sugar, isotrehalose, neotrehalose, palatinose or isomaltulose, erythrose, deoxyribose, glucose, idose, talose, erythrurose, xylulose, psicose, turanose, cellobiose, amylopectin, glucosamine, mannosamine, fucose, glucuronic acid, glucosan, gluco-lactone, abequose, galactosamine, isomalto-oligosaccharide, xylo-oligosaccharide, gentio-oligosaccharide, sorbose, nigero-oligosaccharide, palatinose oligosaccharide, fructooligosaccharide, maltotetraol, maltotriol, malto-oligosaccharide, lactulose, melibiose, raffinose, rhamnose and ribose.

6. The wallpaper composition of claim 1, wherein the flavoring agent is selected from Formulas 1-1 to 1-9 below:

[Formula 1-1]

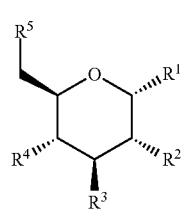

[Formula 1-2]

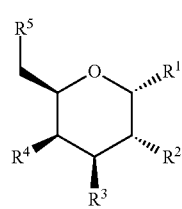

-continued

[Formula 1-3]

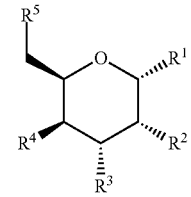

[Formula 1-4]

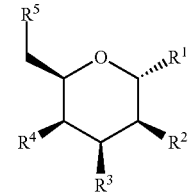

[Formula 1-5]

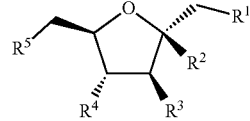

wherein in Formulas 1-1 to 1-5, $R^1$ to $R^5$ are each independently selected from a hydroxyl group (—OH) and

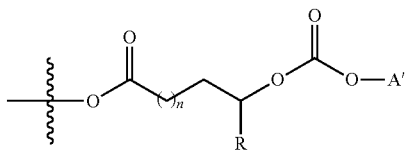

wherein n, R and A' are as defined in Formula 1,

[Formula 1-6]

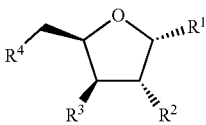

wherein $R^1$ to $R^4$ are each independently selected from a hydroxyl group (—OH) and

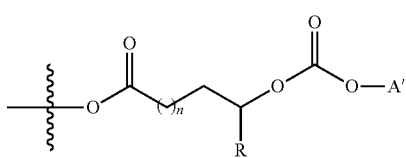

wherein n, R and A' are as defined in Formula 1,
[Formula 1-7]
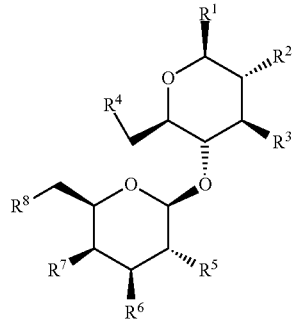
[Formula 1-8]
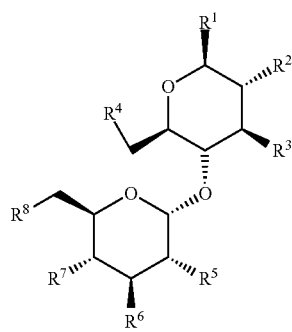
[Formula 1-9]
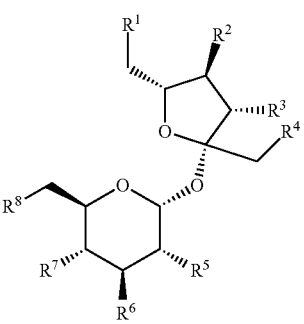
wherein in Formulas 1-7 to 1-9, $R^1$ to $R^8$ are each independently selected from a hydroxyl group (—OH) and
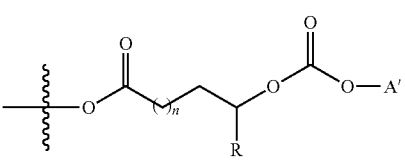
wherein n, R and A' are as defined in Formula 1.
7. The wallpaper composition of claim 1, wherein the compound is selected from Formulas 1-1-a to 1-9-a below:
[Formula 1-1-a]
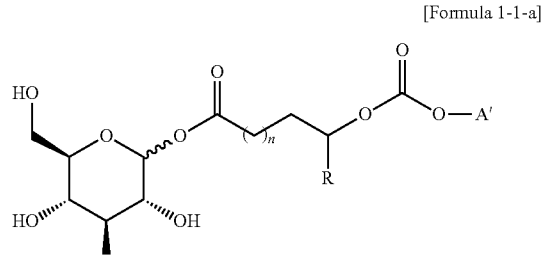
[Formula 1-2-a]
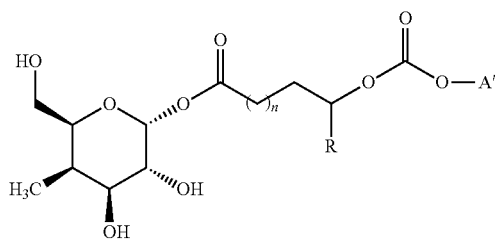
[Formula 1-3-a]
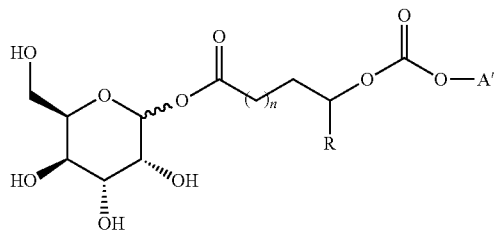
[Formula 1-4-a]
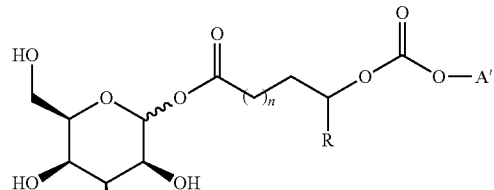
[Formula 1-5-a]
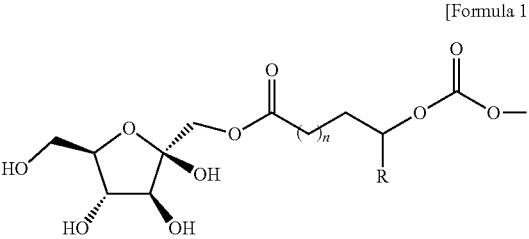
[Formula 1-6-a]
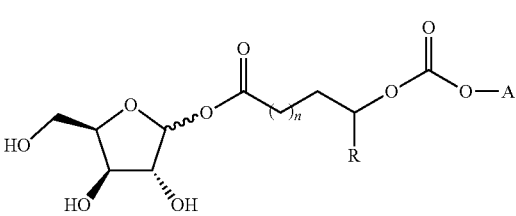

[Formula 1-7-a]

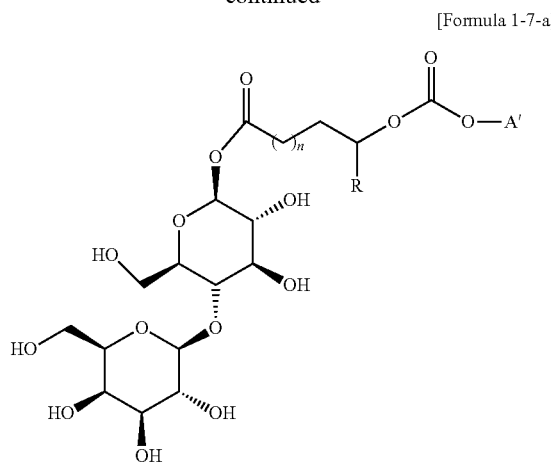

[Formula 1-8-a]

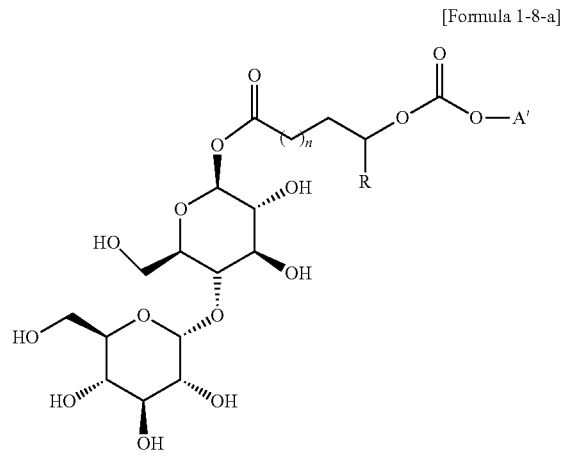

[Formula 1-9-a]

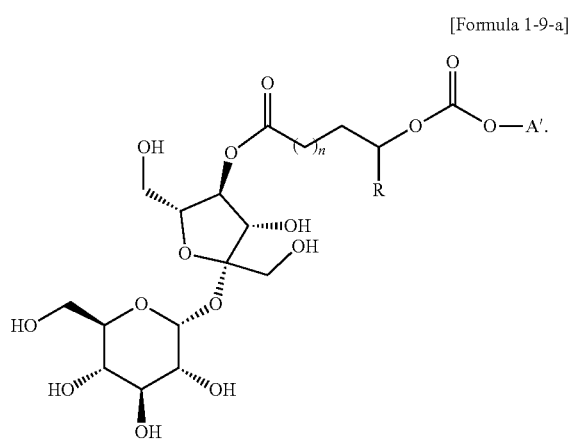

8. The wallpaper composition of claim 1, wherein the composition develops flavor during pyrolysis and is decomposed into the sugar compound, the flavoring compound, the lactone compound and carbon dioxide during pyrolysis.

9. The wallpaper composition of claim 8, wherein the lactone compound is decomposed into gamma lactone of Formula 2 below or delta lactone of Formula 3 below:

[Formula 2]

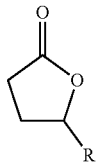

[Formula 3]

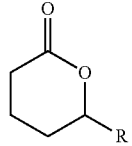

wherein R is a straight-chain or branched-chain alkyl group having 1 to 30 carbon atoms.

10. The wallpaper composition of claim 8, wherein the lactone compound is selected from Formulas below:

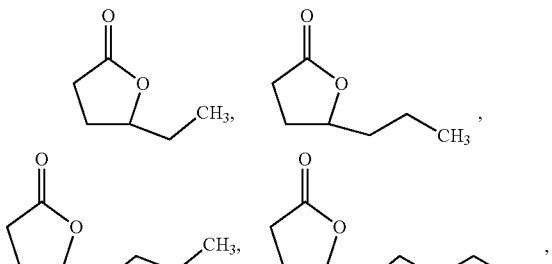

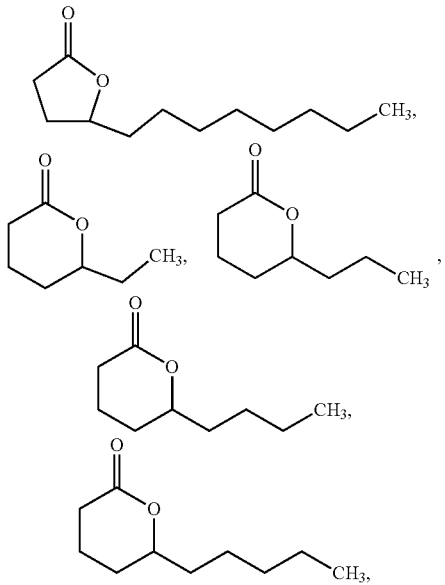

-continued

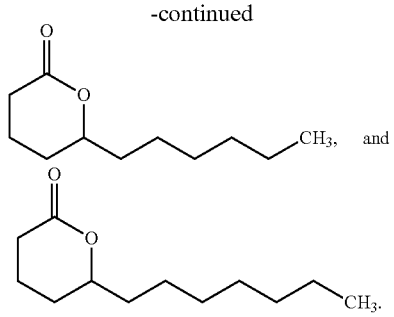

and

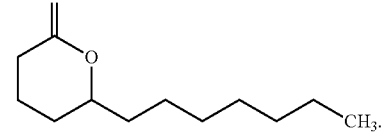

11. The wallpaper composition of claim 1, wherein the compound is pyrolyzed at a temperature of 80° C. or higher.

12. The wallpaper composition of claim 1, wherein the composition comprises at least one of water, a water-soluble organic solvent and a fat-soluble organic solvent.

13. The wallpaper composition of claim 1, wherein the wallpaper composition is solid, slurry, paste, gel, liquid, emulsion or aerosol.

14. A wallpaper manufactured with the composition of claim 1.

15. The wallpaper of claim 14, wherein the wallpaper is a paint wallpaper or a sheet-type wallpaper.

16. The wallpaper of claim 15, wherein the wallpaper releases flavor when burnt or exposed to an ignition temperature.

* * * * *